United States Patent
Kludas et al.

(10) Patent No.: US 8,024,144 B2
(45) Date of Patent: Sep. 20, 2011

(54) SURVEYING INSTRUMENT AND METHOD OF PROVIDING SURVEY DATA OF A TARGET REGION USING A SURVEYING INSTRUMENT

(75) Inventors: Torsten Kludas, Zottelstedt (DE); Axel Schünemann, Weimar (DE); Michael Vogel, Schliefreisen (DE)

(73) Assignee: Trimble Jena GmbH, Jena (DE)

( * ) Notice: Subject to any disclaimer, the term of this patent is extended or adjusted under 35 U.S.C. 154(b) by 500 days.

(21) Appl. No.: 11/991,432

(22) PCT Filed: Sep. 11, 2006

(86) PCT No.: PCT/EP2006/008817
§ 371 (c)(1),
(2), (4) Date: Mar. 4, 2008

(87) PCT Pub. No.: WO2007/031248
PCT Pub. Date: Mar. 22, 2007

(65) Prior Publication Data
US 2009/0138233 A1    May 28, 2009

Related U.S. Application Data

(60) Provisional application No. 60/716,338, filed on Sep. 12, 2005.

(51) Int. Cl.
*G06F 19/00* (2006.01)
(52) U.S. Cl. .......... 702/85; 382/100; 382/254; 382/275; 382/276; 715/273
(58) Field of Classification Search .................... 356/72, 356/124, 124.5, 256; 382/100, 254, 255, 382/275, 276, 385; 702/1, 85, 94, 95, 104, 702/127, 187, 189; 715/200, 273
See application file for complete search history.

(56) References Cited

U.S. PATENT DOCUMENTS
2,003,797 A * 6/1935 Arbuckle ...................... 356/122
(Continued)

FOREIGN PATENT DOCUMENTS
DE  10359415  7/2005
(Continued)

OTHER PUBLICATIONS

Kuntz,. E. "Kartennetzentwurfslehre: Grundlagen und Anwendungen", Karlsruhe, Germany, Wichmann, 1990, ISBN 3-87907-186-1.

(Continued)

*Primary Examiner* — Edward Cosimano
(74) *Attorney, Agent, or Firm* — Cooper & Dunham LLP

(57) ABSTRACT

A surveying instrument (11) comprises a telescope unit having imaging optics and an array of optical detector elements, orientation sensors detecting an orientation of the telescope unit, rotation drives for rotating the telescope unit about a horizontal and a vertical axis, a controllable distance-measuring unit, and a processing unit. The processing unit comprises a memory storing instructions and calibration data for relating the location of each optical detector element to a sighting direction and a processor for: obtaining target region data; obtaining projection surface data (133) representing a projection surface (135), acquiring a set of pixel data representing a two-dimensional image of a target region, transforming the set of pixel data to a set of projected image data representing a projection of the image to the projection surface using the calibration data, and storing the projected image data as surveying data.

49 Claims, 26 Drawing Sheets

U.S. PATENT DOCUMENTS

| | | | | |
|---|---|---|---|---|
| 2,557,698 | A * | 6/1951 | Sharp | 353/121 |
| 3,045,542 | A * | 7/1962 | Finkelstein | 352/69 |
| 3,520,611 | A * | 7/1970 | Picou | 356/72 |
| 3,533,696 | A * | 10/1970 | De Winter | 356/5.06 |
| 6,005,987 | A * | 12/1999 | Nakamura et al. | 382/294 |
| 6,928,194 | B2 * | 8/2005 | Mai et al. | 382/284 |
| 6,993,450 | B2 * | 1/2006 | Takemoto et al. | 702/153 |
| 7,384,158 | B2 * | 6/2008 | Ramachandran et al. | 353/70 |
| 7,623,224 | B2 * | 11/2009 | Vogel | 356/141.5 |
| 7,630,579 | B2 * | 12/2009 | Mai et al. | 382/284 |
| 7,633,610 | B2 * | 12/2009 | Walser | 356/141.5 |
| 7,830,501 | B2 * | 11/2010 | Kludas et al. | 356/139.1 |
| 7,925,114 | B2 * | 4/2011 | Mai et al. | 382/284 |
| 2002/0060784 | A1 | 5/2002 | Pack et al. | |
| 2002/0134151 | A1 | 9/2002 | Naruoka et al. | |
| 2003/0144813 | A1* | 7/2003 | Takemoto et al. | 702/153 |
| 2004/0057633 | A1* | 3/2004 | Mai et al. | 382/284 |
| 2004/0141157 | A1* | 7/2004 | Ramachandran et al. | 353/70 |
| 2005/0265631 | A1* | 12/2005 | Mai et al. | 382/284 |
| 2006/0192946 | A1* | 8/2006 | Walser | 356/144 |
| 2007/0104353 | A1* | 5/2007 | Vogel | 382/106 |
| 2008/0031490 | A1* | 2/2008 | Kobayashi | 382/101 |
| 2009/0109420 | A1* | 4/2009 | Kludas et al. | 356/3.01 |
| 2010/0020097 | A1* | 1/2010 | Mai et al. | 345/629 |
| 2010/0141775 | A1* | 6/2010 | Vogel | 348/187 |
| 2010/0209090 | A1* | 8/2010 | Kludas | 396/89 |

FOREIGN PATENT DOCUMENTS

| | | |
|---|---|---|
| EP | 1347267 | 9/2003 |
| EP | 1655573 | 5/2006 |
| GB | 2372656 | 8/2002 |
| WO | WO9834195 | 8/1998 |
| WO | WO2004028134 | 4/2004 |
| WO | WO2005017644 | 2/2005 |
| WO | WO2005059473 | 6/2005 |
| WO | WO 2007/048425 A1 * | 5/2007 |

OTHER PUBLICATIONS

Deumlich, F.; Staiger, R. "Instrumentenkunde der Vermessungstechnik", Herbert Wichmann Verlag (2002) pp. 206-208, including an English-language translation.

Henning, W. "Statistik in Geodäsie, Geoinformation und Bauwesen", Herbert Wichmann Verlag (2002) pp. 140-142, including an English-language translation.

Luhmann, T. "Nahbereichsphotogrammetrie: Grundlagen, Methoden und Anwendungen", Herbert Wichmann Verlag (2000) pp. 119-122, 385, 386, including an English-language translation.

Press, W.; Teukolsky, S.; Vetterling, W.; and Flannery, B. "Numerical Recipes in C, Second Edition", Cambridge University Press (1992) pp. 123-124.

English-language abstract of International Patent Publication No. WO 2005/017644, published Feb. 24, 2005, esp@cenet database.

English-language abstract of German Patent Publication No. DE 10359415, published Jul. 14, 2005, esp@cenet database.

* cited by examiner

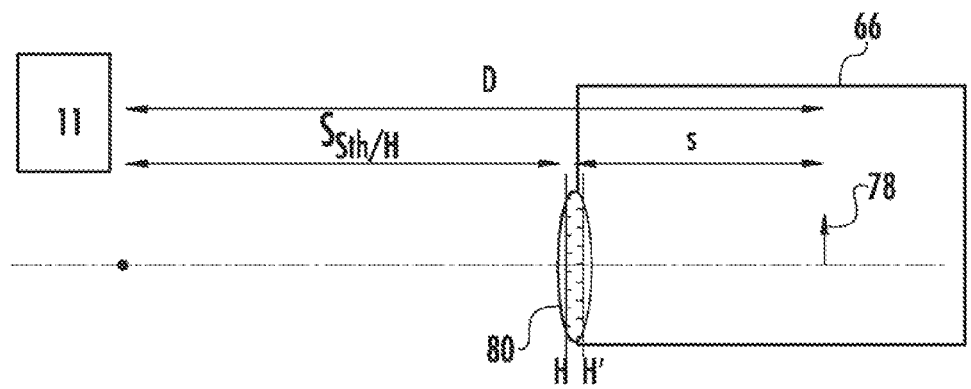
FIG. 14
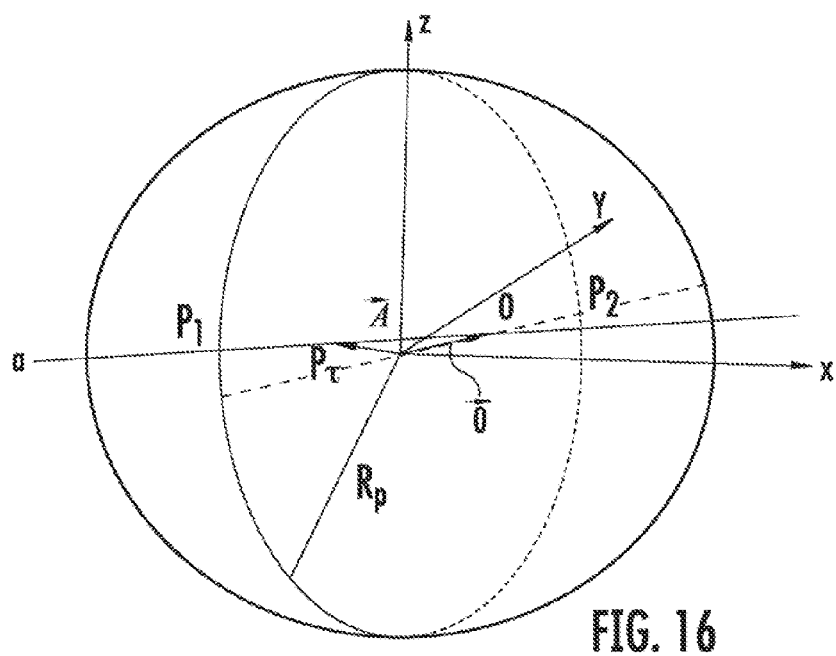
FIG. 15
FIG. 16

SURVEYING INSTRUMENT AND METHOD OF PROVIDING SURVEY DATA OF A TARGET REGION USING A SURVEYING INSTRUMENT

This application claims the benefit of U.S. Provisional Patent Application No. 60/716,338, filed on Sep. 12, 2005, the entire contents of which are incorporated herein by reference.

BACKGROUND OF THE INVENTION

1. Field of the Invention

The present invention relates to a method of providing survey data using a surveying instrument, means for performing the method and a corresponding surveying instrument.

2. Brief Description of the Related Art

Surveying often includes determination of angles or of positions of points, e.g. reflectors (triple reflectors) or targets in the terrain. Those angles or positions may be measured by surveying instruments such as theodolites or tacheometers.

Positions in space can be defined by coordinates in a suitable coordinate system. For example, the position of a point may be defined by its Cartesian coordinates which are defined with respect to a Cartesian coordinate system having three axes which are orthogonal to each other. For measuring positions, however, spherical coordinates are more appropriate. As shown in FIG. 1, the position of a point P may be defined in spherical coordinates by its distance d to the origin of an orthogonal coordinate system, an angle $\alpha$ between one of the horizontal axes of the coordinate system and a line connecting the origin of the coordinate system with a projection of the point P onto the horizontal plane and finally a vertical angle $\theta$ between the coordinate system axis orthogonal to the horizontal plane and a line connecting the origin of the coordinate system and the point. As well known in the art, Cartesian coordinates can be transformed into spherical coordinates and vice versa.

Surveying instruments such as theodolites or tacheometers, also known as tachymeters or total stations, make use of spherical coordinates. As schematically shown in FIG. 1, known theodolites or tacheometers comprise a telescope 1 which is rotatable about a vertical axis 2 which is fixed to a base element 3 of the theodolite or tacheometer and a tilting axis 4, also termed horizontal axis, which is rotated with rotation of a telescope 1 about the vertical axis 2. Angles of rotation about the vertical axis 2 and angles of tilting about the tilting axis can read from a corresponding horizontal circle 5 and a vertical circle 6.

In an ideal tacheometer as shown in FIG. 1, the tilting axis 4 is orthogonal to the vertical axis 2 and both axes intersect in one point. Further, a line of the sight 7 of the telescope 1, also called sighting axis or sight axis, is orthogonal to the tilting axis 4 and further runs through the intersection point of the tilting axis 4 and the vertical axis 2.

For measuring the position of a point, ideally, the tacheometer is oriented such that the vertical axis 2 is perfectly perpendicular, i.e. it points in the direction of gravity. Then, a spherical coordinate system can be defined by a plane orthogonal to the vertical axis 2, the origin being the intersection point of the of the tilting axis 4 and by the vertical axis 2. By the horizontal circle 5 one axis of the coordinate system can be defined which is fixed with respect to the base element 3. For measuring the above-mentioned angles $\alpha$ and $\theta$, the sighting axis 7 of a telescope 1 is directed to the point to be measured by rotating the telescope 1 about the vertical axis 2 and tilting the telescope 1 about the tilting axis 4. The angle $\alpha$ can than be read from the horizontal circle and the angle $\theta$ from the vertical circle 6. For measuring the distance of a target point from the instrument a tacheometer has a distance measuring unit which allows measurement of the distance of a target point sighted at from the instrument. Knowing the distance of the point from the instrument, the Cartesian coordinates can be easily obtained.

Video-tacheometers differ from traditional tacheometers in that they comprise a camera which may for example replace the whole telescope or just the eyepiece of the telescope or may be provided in addition to the telescope. As schematically shown in FIG. 2, the camera 8 comprises an optical system 9 and an image sensor 10. The optical system 9 forms images of points in a scene on the image sensor 10. A point P to be measured is thus imaged onto a certain position P' on the image sensor 10. The image sensor 10 comprises an array of photo-detector elements 10' which are responsive to the image formed on the sensor and produce respective detection signals.

If known tacheometers or even video-tacheometers are used to survey a target region the telescope unit has to be redirected to all points of interest in the target region separately to obtain survey data about the target region. Thus, surveying of a target region, in particular of given objects in a target region, can be quite time consuming.

It has been found that the conventional method of providing survey data and the conventional surveying instrument could still be improved to obtain survey data more rapidly and comfortably.

SUMMARY OF THE INVENTION

The present invention has been accomplished taking the above problems into consideration.

Embodiments of the present invention provide a surveying instrument that provides survey data more rapidly and comfortably. Further embodiments of the present invention provide a surveying instrument that provides a panoramic image in an easy way with increased accuracy.

Furthermore, embodiments of the present invention provide a method of providing survey data using a surveying instrument that provides the survey data more rapidly and comfortably. Further embodiments of the present invention provide a method of providing a panoramic image in an easy way with increased accuracy.

According to embodiments of the present invention, a surveying instrument comprises a distance-measuring unit to produce distance data representing a distance between the distance-measuring unit and an object to be surveyed along a measuring direction of the distance measuring unit, the distance-measuring unit being mounted for rotation about a horizontal and a vertical axis, orientation sensors to produce orientation data representing an orientation of the distance-measuring unit about the horizontal and vertical axes, a telescope unit to generate image data pertaining to a two-dimensional image of the object, the telescope unit having a defined spatial relation with respect to the distance-measuring unit, and a processing unit. Said processing unit is configured to control the telescope unit to produce image data, control the distance-measuring unit to produce distance data for at least three different locations at the object, the distance data being received by the processing unit together with corresponding orientation data, obtain surface data representing a surface defined by the distance data and orientation data associated with the at least three different locations at the object, and transform the image data into projected image data representing a projection of the image to the surface based on the surface data.

Thus, in these embodiments the surveying instrument determines the surface to which the image data are projected by measurement of distance and position of at least three locations at the object. The position of the locations is calculated based on the orientation of the distance-measuring unit.

With respect to the present patent application, it is emphasized that the term "projection" is not restricted to a graphical or physical projection but should be understood as "transformation". Furthermore, the measuring direction of the distance measuring unit may correspond to an optical axis or central pixel of an optical detector of the telescope unit, for example.

According to exemplary embodiments, the instrument further comprises an interface for user selection of the different locations at the object in the two-dimensional image of the object. Alternatively, the instrument might predefine the different locations at the object to describe a trihedral, for example.

According to an exemplary embodiment, the processing unit is further configured to at least one of store and transmit to a receiving device at least the projected image data together with information regarding the distance of the surface as surveying data. Even additional information such as shape and/or orientation of the surface might be stored and transmitted by the processing unit, for example.

According to an exemplary embodiment, the surface is one of a plane, a sphere and a cylinder. It is obvious that a measurement of three locations is sufficient to perfectly define location and orientation of a plane in a three-dimensional space, for example. If measurement of more than three locations is performed to define a plane, accuracy of the definition of the plane may be increased by known correction methods. Measurement of four locations is sufficient to define location and orientation of a sphere in a three-dimensional space, for example. A freeform surface is described by measurement of an even higher number of locations, for example. Regarding the freeform surface, the number of locations depends on the intended accuracy and complexity of the surface, for example.

According to embodiments of the present invention a surveying instrument comprises a distance-measuring unit to produce distance data representing a distance between the distance-measuring unit and an object to be surveyed along a measuring direction of the distance measuring unit, a telescope unit to generate image data pertaining to a two-dimensional image of the object, the telescope unit having a defined spatial relation with respect to the distance-measuring unit, and a processing unit. Said processing unit is configured to control the telescope unit to produce image data, control the distance-measuring unit to produce distance data, obtain surface data representing a plane, wherein a location of the plane is selected based on the distance data and the plane has an orientation selected by image processing by identifying and analyzing at least one oval and lozenge element at the object in the two-dimensional image of the object, and transform the image data into projected image data representing a projection of the image to the plane based on the surface data.

Thus, in these embodiments the surveying instrument determines the surface to which the image data are projected by picture processing. The location at the object at which the distance between the distance-measuring unit and the object is measured may be used as a break-over point when adjusting orientation of the plane in three-dimensional space, for example. Alternatively, orientation of the plane might be determined first and the plane might be arranged at the measured distance afterwards. Identifying at least one oval or lozenge element and determining the required deformation to project the oval to a circle or the lozenge element to a rectangle may be performed during picture processing, for example.

According to exemplary embodiments, the instrument further comprises an interface for user selection of at least one oval and lozenge element at the object in the two-dimensional image, the processing unit being configured to use the selected element for selection of an orientation of the plane.

According to an exemplary embodiment, the processing unit is further configured to at least one of store and transmit to a receiving device at least the projected image data together with information regarding the distance of the plane as surveying data. Even additional information such as orientation of the plane might be stored and transmitted by the processing unit, for example.

According to an exemplary embodiment, the distance-measuring unit is mounted for rotation about a horizontal and a vertical axis, the instrument further comprises orientation sensors to produce orientation data representing an orientation of the distance-measuring unit about the horizontal and vertical axes, and the processing unit is further configured to control the distance-measuring unit to produce distance data for different locations at the object, the distance data being received by the processing unit together with corresponding orientation data. The different locations might be predefined in the instrument or input by a user via a user interface by displaying the two-dimensional image to the user and allowing the user to select the desired locations in the two-dimensional image of the object, for example.

According to embodiments of the present invention, a surveying instrument comprises a distance-measuring unit to produce distance data representing a distance between the distance-measuring unit and an object to be surveyed along a measuring direction of the distance measuring unit, a telescope unit to generate image data pertaining to a two-dimensional image of the object, the telescope unit having a defined spatial relation with respect to the distance-measuring unit, an interface for receiving three-dimensional-data of the object, and a processing unit. Said processing unit is configured to control the telescope unit to produce image data, control the distance-measuring unit to produce distance data, obtain surface data representing a surface, wherein a location of the surface is selected based on the distance data and the surface has a shape as defined in the three-dimensional-data, and transform the image data into projected image data representing a projection of the image to the surface based on the surface data.

Thus, in these embodiments the surveying instrument determines the surface to which the image data are projected by using external three-dimensional data such as CAD-data or a digital terrain model, for example.

According to exemplary embodiments, the processing unit is further configured to select an orientation of the surface by image processing by identifying and analyzing at least one same characteristic element contained in both the three-dimensional-data and the image data.

According to an exemplary embodiment, the distance-measuring unit is mounted for rotation about a horizontal and a vertical axis, the instrument further comprises orientation sensors to produce orientation data representing an orientation of the distance-measuring unit about the horizontal and vertical axes, the processing unit is further configured to control the distance-measuring unit to produce distance data for at least three different locations at the object, the distance data being received by the processing unit together with corresponding orientation data, and the processing unit is further configured to determine an orientation of the surface by using the distance data and orientation data associated with the at least three different locations at the object.

The different locations at the object might be predefined in the instrument or input by a user via a user interface by displaying the two-dimensional image of the object to the user and allowing the user to select the desired locations in the two-dimensional image, for example. Alternatively, said different locations might be automatically determined based on the three-dimensional data, for example.

According to exemplary embodiments, the processing unit is further configured to at least one of store and transmit to a receiving device at least the projected image data together with information regarding the distance of the surface as surveying data. Even additional information such as shape and/or orientation of the surface might be stored and transmitted by the processing unit, for example.

According to exemplary embodiments, the processing unit is further configured to recognize a user-selected point in the projection of the image represented by the projected image data and to determine the position of the selected point at the object. Thus, the projected image may be used for measuring distances at the object, for example.

According to exemplary embodiments, the telescope unit is mounted for rotation about a horizontal and a vertical axis. The telescope further comprises orientation sensors to produce orientation data representing an orientation of the telescope unit about the horizontal and vertical axes. The processing unit is further configured to determine directions in which image data are to be obtained, the directions identifying plural two-dimensional partial images of a target region so that the plural partial images cover the target region, control the telescope unit to acquire partial image data in each direction, the partial image data being received by the processing unit together with corresponding orientation data, obtain panoramic surface data representing a panoramic surface, wherein the panoramic surface has a shape that is selected from a group consisting of a cone, a cylinder and a sphere, transform the partial image data for each direction to a set of projected partial image data, each representing a projection of the respective partial image data to the panoramic surface, and generate panoramic image data representing a panoramic image of the target region projected to the panoramic surface based on the set of projected partial image data and the orientation data corresponding to the respective projected partial image data.

Thus, the surveying instrument may be used to generate panoramic images. In the above exemplary embodiment, the instrument is located in the center of the projection of the respective partial image data to the panoramic surface. The shape of said panoramic surface may be stored in the instrument. The panoramic surface may be located at a predefined distance or at a measured distance between the distance-measuring unit and the object to be surveyed, for example. It is obvious that the telescope unit and the distance measuring unit may be located in a common casing and use the same orientation sensors, for example. Alternatively, the telescope unit and the distance measuring unit may be located in separate casings and use the same or separate orientation sensors, for example.

According to an exemplary embodiment, the processing unit is further configured to at least one of store and transmit to a receiving device the obtained panoramic image data as surveying data. Even additional information such as information regarding the distance and/or shape of the surface might be stored and transmitted by the processing unit, for example.

According to embodiments of the present invention a surveying instrument comprises a telescope unit to generate image data pertaining to a two-dimensional image of an object to be surveyed, the telescope unit being mounted for rotation about a horizontal and a vertical axis, orientation sensors to produce orientation data representing an orientation of the telescope unit about the horizontal and vertical axes, and a processing unit. Said processing unit is configured to determine directions in which image data are to be obtained, the directions identifying plural two-dimensional partial images of a target region so that the plural two-dimensional partial images cover the target region, control the telescope unit to acquire partial image data in each direction, the partial image data being received by the processing unit together with corresponding orientation data, obtain panoramic surface data representing a panoramic surface, wherein the panoramic surface has a shape that is selected from a group consisting of a cone, a cylinder and a sphere, transform the partial image data for each direction to a set of projected partial image data, each representing a projection of the respective partial image data to the panoramic surface and generate panoramic image data representing a panoramic image of the target region projected to the panoramic surface based on the set of projected partial image data and the orientation data corresponding to the respective projected partial image data.

Thus, the surveying instrument may be used to generate panoramic images. In the above embodiment, the instrument is located in the center of the projection of the respective partial image data to the panoramic surface. The shape of said panoramic surface may be stored in the instrument.

According to an exemplary embodiment, the instrument further comprises a distance-measuring unit to produce distance data representing a distance between the instrument and an object to be surveyed along a measuring direction of the distance measuring unit, the distance-measuring unit having a defined spatial relation with respect to the telescope unit. The processing unit is further configured to control the distance-measuring unit to produce distance data for at least one location at the object to obtain a location of the surface based on the distance data.

Thus, the panoramic surface may be located at a measured distance between the distance-measuring unit and the object to be surveyed, for example. Alternatively, the panoramic surface may be located at a predefined distance, for example. It is obvious that the telescope unit and the distance measuring unit may be located in a common casing and use the same orientation sensors, for example. Alternatively, the telescope unit and the distance measuring unit may be located in separate casings and use the same or separate orientation sensors, for example.

According to an exemplary embodiment, the processing unit is adapted to at least one of store and transmit to a receiving device the generated panoramic image data as surveying data. Even additional information such as information regarding the distance and/or shape of the surface might be stored and transmitted by the processing unit, for example.

According to exemplary embodiments, the processing unit is further adapted to determine the directions such that the two-dimensional partial images overlap, and to adjust the pixel data in at least one of the partial image data and the projected partial image data of at least one of the two-dimensional partial images in the overlap region by using the pixel data of the partial image data or the projected partial image data of the projected partial images in the overlap region, respectively.

According to exemplary embodiments, the instrument further comprises rotation drives for rotating at least one of the distance-measuring unit and the telescopic unit about the horizontal and vertical axes, and the processing unit is adapted to control the rotation drives to rotate the distance-measuring unit and the telescope unit, respectively, into determined directions.

According to exemplary embodiments, the instrument comprises at least one of an interface for a display unit and a pointing device and an interface for a touch-screen, for displaying at least one of the two-dimensional image and the projection of the image on the display unit and the touch-screen, respectively, and for selecting locations at the object in the two-dimensional image and the projection of the image, respectively, and the processing unit is further adapted to read the position of the pointing device, and a position defined by touching the touch-screen, respectively, to calculate an orientation of at least one of the distance-measuring unit and the telescope unit such that the measuring direction of the distance-measuring unit and the telescope unit, respectively, points to a location at the object corresponding to the read position, and to control the rotation drives to move the distance-measuring unit and the telescope unit, respectively, into the calculated orientation.

According to exemplary embodiments, the processing unit comprises a memory storing instructions and a processor.

According to exemplary embodiments, the telescope unit has imaging optics and an array of optical detector elements, each detector element having a location in the array and being responsive to an image projected on the array by the imaging optics to generate data of a pixel representing a point of the image, and the processing unit stores calibration data for relating the location of each optical detector element to an optical path.

According to exemplary embodiments, the processing unit is adapted to transform the image data into projected image data by analytically detecting intersections between the optical path of each optical detector element and the surface represented by the surface data and the panoramic surface represented by the panoramic surface data, respectively, based on the calibration data, and storing each pixel value of the two-dimensional image to the detected intersection at the surface and the panoramic surface respectively.

According to exemplary embodiments, the instrument comprises an interface for at least one of a display unit and a touch-screen for displaying digital images, and the processing unit is adapted to display at least one of the two-dimensional image and the projection of the image on the display unit and the touch-screen, respectively.

According to exemplary embodiments, for selecting locations at the object in the two-dimensional image or the projection of the image, an interface for a pointing device is provided or the display interface is an interface for a touch-screen, and the processing unit is adapted for reading data defining at least one pixel representing a point in the displayed image defined by the position of the pointing device or touching of the touch-screen.

According to exemplary embodiments, the processing unit is adapted to acquire target region data representing the target region by reading user inputs defining directions limiting the target region and/or positions in the two-dimensional image or in the projection of the image and preferably an extent of the target region.

According to exemplary embodiments, the processing unit is adapted for reading two positions in the displayed projection of the image selected by the pointing device or by touching the touch-screen, determining a distance between two locations at the object corresponding to the selected locations in the projection of the image and displaying the determined distance or a value calculated from the determined distance.

According to exemplary embodiments, the processing unit is further adapted for reading three positions in the displayed projection of the image selected by the pointing device or by touching the touch-screen, determining an angle between two lines defined by corresponding locations at the object and displaying the determined angle or a value calculated from the determined angle.

According to exemplary embodiments, the processing unit is adapted for displaying additional information obtained by or stored in the processing unit on the display unit.

According to exemplary embodiments, the processing unit is adapted for storing survey data representing locations in the target region already surveyed, and displaying a mark on the display unit representing at least one of the surveyed locations.

According to exemplary embodiments, the processing unit is adapted for acquiring coordinate data representing locations to be surveyed, and displaying a mark on the display unit representing at least one point still to be surveyed.

According to embodiments of the present invention, a method of providing survey data using a surveying instrument comprises steps of generating image data pertaining to a two-dimensional image of an object to be surveyed, producing distance data representing a distance between the surveying instrument and the object along a measuring direction of the surveying instrument for at least three different locations at the object together with corresponding orientation data representing an orientation of the surveying instrument about horizontal and vertical axes, obtaining surface data representing a surface defined by the distance data and orientation data associated with the at least three different locations at the object, and transforming the image data into projected image data representing a projection of the image to the surface based on the surface data.

According to embodiments of the present invention, a method of providing survey data using a surveying instrument comprises steps of generating image data pertaining to a two-dimensional image of an object to be surveyed, producing distance data representing a distance between the surveying instrument and the object along a measuring direction of the surveying instrument, obtaining surface data representing a plane, by selecting a location of the plane based on the distance data and by selecting an orientation of the plane by image processing by identifying and analyzing at least one oval and lozenge element at the object in the two-dimensional image of the object, and transforming the image data into projected image data representing a projection of the image to the plane based on the surface data.

According to embodiments of the present invention, a method of providing survey data using a surveying instrument comprises steps of generating image data pertaining to a two-dimensional image of an object to be surveyed, producing distance data representing a distance between the surveying instrument and the object along a measuring direction of the surveying instrument, receiving three-dimensional-data of the object, obtaining surface data representing a surface, by selecting a location of the surface based on the distance data and selecting a shape of the surface as defined in the three-dimensional-data, and transforming the image data into projected image data representing a projection of the image to the surface based on the surface data.

According to an exemplary embodiment the method further comprises the step of determining an orientation of the surface by image processing by identifying and analyzing at least one same characteristic element contained in both the three-dimensional-data and the image data.

According to an exemplary embodiment the method further comprises the steps of producing distance data for at least three different locations at the object together with corresponding orientation data representing an orientation of the surveying instrument about horizontal and vertical axes, and determining an orientation of the surface by using the distance data and orientation data associated with the at least three different locations at the object.

According to exemplary embodiments the method further comprises the steps of recognizing a user-selected point in the projection of the image represented by the projected image data, and determining the position of the selected point at the object.

According to embodiments of the present invention, a method of providing survey data using a surveying instrument comprises steps of determining directions in which partial image data each pertaining to a two-dimensional partial image of an object to be surveyed are to be obtained, the directions identifying plural two-dimensional partial images of a target region at the object so that the plural two-dimensional partial images cover the target region, generating partial image data in each direction together with corresponding orientation data representing an orientation of the surveying instrument about horizontal and vertical axes, obtaining panoramic surface data representing a panoramic surface, by selecting a shape of the panoramic surface from a group consisting of a cone, a cylinder and a sphere, transforming the partial image data for each direction to a set of projected partial image data, each representing a projection of the respective partial image data to the panoramic surface, and generating panoramic image data representing a panoramic image of the target region projected to the panoramic surface based on the set of projected partial image data and the orientation data corresponding to the respective projected partial image data.

According to an exemplary embodiment the method further comprises the steps of determining the directions such that the two-dimensional partial images overlap in an overlap region, and adjusting the pixel data in at least one of the partial image data and the projected partial image data of at least one of the two-dimensional partial images in the overlap region by using the pixel data of the partial image data or the projected partial image data of the projected partial images in the overlap region, respectively.

According to exemplary embodiments the telescope unit has imaging optics and an array of optical detector elements, each detector element having a location in the array and being responsive to an image projected on the array by the imaging optics to generate data of a pixel representing a point of the image, the allocation of each optical detector element to an optical path being stored in calibration data, and the step of transforming the image data into projected image data is performed by analytically detecting intersections between an optical path of each optical detector element and the surface represented by the surface data and the panoramic surface represented by the panoramic surface data, respectively, based on the calibration data, and storing each pixel value of the two-dimensional image to the detected intersection at the surface and the panoramic surface, respectively.

According to an exemplary embodiment the method further comprises the steps of reading two positions selected by a user in the displayed projection of the image, determining a distance between two locations at the object corresponding to the selected locations in the projection of the image, and displaying the determined distance or a value calculated from the determined distance.

According to an exemplary embodiment the method further comprises the steps of reading three positions in the displayed projection of the image selected by a user, determining an angle between two lines defined by corresponding locations at the object, and displaying the determined angle or a value calculated from the determined angle.

According to embodiments of the present invention, a computer program for a processing unit of a surveying instrument is provided, wherein the computer program is adapted to allow the surveying instrument to perform the above described method.

According to embodiments of the present invention, a computer readable storage medium is provided, the medium storing the above computer program.

According to embodiments of the invention a processing unit is provided which is to be used with a surveying instrument or is part of the surveying instrument, the surveying instrument comprising a telescope unit being mounted for controllable rotation about a horizontal and a vertical axis, and having imaging optics and an array of optical detector elements, each detector element having a location in the array and being responsive to an image projected on the array by the imaging optics to generate data of a pixel representing a point of the image the instrument further comprising orientation sensors to produce orientation signals representing an orientation of the telescope unit and controllable rotation drives for rotating the telescope unit about the horizontal and vertical axes, the processing unit comprising a memory storing instructions and calibration data relating the location of each optical detector element to a sighting direction and a processor responsive to the instructions to perform the following operations when the processing unit is connected to the surveying instrument: obtaining target region data representing a target region to be surveyed, obtaining projection surface data representing a projection surface, acquiring a set of pixel data produced by the optical detector array representing a two-dimensional image of at least a part of the target region, transforming the set of pixel data to a set of projected image data representing a projection of the image to the projection surface using the calibration data, and storing and/or transmitting to a receiving device at least the projected image data as surveying data.

According to embodiments of the invention a surveying instrument is provided, the surveying instrument comprising a telescope unit being mounted for controllable rotation about a horizontal and a vertical axis, and having imaging optics and an array of optical detector elements, each detector element having a location in the array and being responsive to an image projected on the array by the imaging optics to generate data of a pixel representing a point of the image the instrument further comprising orientation sensors to produce orientation signals representing an orientation of the telescope unit and controllable rotation drives for rotating the telescope unit about the horizontal and vertical axes, and a processing unit, the processing unit being connected to the drives, the orientation sensors and the rotation drives.

According to embodiments of the invention a method of providing survey data of a target region using a surveying instrument is provided, the surveying instrument comprising a telescope unit being mounted for controllable rotation about a horizontal and a vertical axis and having imaging optics and an array of optical detector elements, each detector element having a location in the array and being responsive to an image projected on the array by the imaging optics to generate data of a pixel representing a point of the image the instrument further comprising orientation sensors to produce orientation signals representing an orientation of the telescope unit and controllable rotation drives for rotating the telescope unit about the horizontal and vertical axes, the method comprising the steps: obtaining target region data representing a target region to be surveyed, obtaining projection surface data representing a projection surface, acquiring a set of pixel data of pixels representing a two-dimensional image of at least a part of the target region, transforming the set of pixel data to a set of projected image data representing a projection of the image to the projection surface using the calibration data, and storing and/or transmitting to a receiving device at least the projected image data as surveying data.

According to embodiments of the invention a computer program for a processing unit connected to a surveying instrument or a processing unit of a surveying instrument is provided, the processing unit comprising a memory storing calibration data and a processor, the surveying instrument comprising a telescope unit being mounted for controllable rotation about a horizontal and a vertical axis, and having imaging optics and an array of optical detector elements, each detector element having a location in the array and being responsive to an image projected on the array by the imaging optics to generate data of a pixel representing a point of the image the instrument further comprising orientation sensors to produce orientation signals representing an orientation of the telescope unit and controllable rotation drives for rotating the telescope unit about the horizontal and vertical axes, the computer program comprising instructions for obtaining target region data representing a target region to be surveyed, obtaining projection surface data representing a projection surface, acquiring a set of pixel data produced by the optical detector array representing a two-dimensional image of at least a part of the target region, transforming the set of pixel data to a set of projected image data representing a projection of the image to the projection surface using the calibration data, and storing and/or transmitting to a receiving device at least the projected image data as surveying data when the instructions are carried out by the processor.

In particular, the instructions of the computer program and the instructions in the processing unit can be adapted to perform the method according to the invention if the instructions are carried out by the processor.

Embodiments of the invention use a surveying instrument which comprises the telescope unit. The telescope unit is rotatable about the horizontal axis and the vertical axis. As common in the art the term vertical axis means an axis that needs to be vertical only in the case that the surveying instrument is suitably set up. The horizontal axis which is also termed tilting axis is orthogonal to the vertical axis up to a tilting axis error. The telescope unit may be mounted on an alidade such that it can be tilted about the horizontal axis. The alidade and with it the telescope unit can then be rotatable about the vertical axis. The alidade itself may be mounted for rotation about the vertical axis on a suitable base element relative to which an instrument coordinate system can be defined.

The telescope unit can be rotated in a controlled manner about the vertical and horizontal axis by the drives, e.g. electric motors that are controlled by a suitable control unit. The orientation of the telescope unit can be defined by vertical and horizontal angles of rotation about the vertical and horizontal axis, respectively. Preferably, the angles are defined relative to predetermined directions.

The orientations sensors serve to measure the orientation of the telescope unit and produce corresponding orientation signals. In particular, the orientation sensor may comprise angle sensors for measuring the vertical and horizontal angles of rotation and for producing corresponding orientation signals.

The telescope unit comprises imaging optics which image an area of interest to be surveyed on the array of the detector elements. The detector elements are sensitive to optical radiation, in particular visible radiation, i.e. light, and may preferably be color sensitive. In particular, CCD- or CMOS-detector arrays may be used.

The imaging optics may comprise telescope optics offering a desired magnification of objects in the area of interest. However, it is also possible, that the imaging optics are designed to offer a wide field of view suitable for a finder camera. In particular in this case, the telescope unit may comprise a telescope with an eyepiece for sighting target points in a conventional manner. The imagining optics may be part of the telescope or may be separate from the telescope.

The telescope unit comprises further the distance-measuring device that serves to measure a distance between the device and a particular point sighted and to produce corresponding distance signals. Preferably, the distance measuring unit is suited reflectorless measurements of distances of arbitrary reflecting objects and not only of given cooperative targets such as special reflectors having a particularly high reflectivity.

The distance-measuring device has a defined special relation with respect to the telescope unit 16. Thus, orientation of the distance-measuring device about horizontal and vertical axes explicitly or implicitly is determined by the graduated horizontal circle 24 and the graduated vertical circle 26. Alternatively, the distance-measuring device may use separate orientation sensors for producing orientation data representing an orientation of the distance-measuring device about horizontal and vertical axes.

The surveying instrument may further comprise a device-control computer or device-control unit having a processor and physical and/or software interfaces for connection to the drives and orientation sensors. The device-control computer may be adapted to process or evaluate measured data. As well a separate evaluation unit may be provided for that purpose.

The processing unit may be integrated into the surveying instrument or separate from the surveying instrument. In the latter case, the processing unit may comprise at least one interface to the device-control computer and/or interfaces to the drives, the orientation sensors and the detector array. If the processing unit is part of the surveying instrument it is preferably detachable from the instrument.

At least in the case that the processing unit can be used remotely from the surveying instrument it may be linked to it via a communication link, preferably a wireless communication link, and comprise a suitable communication interface.

It serves to control the surveying instrument and to process signals or data obtained by means of the surveying instrument, in particular the orientation sensors and the detector array. The memory may be provided in the form of e.g. RAM, ROM, Flash-ROM, hard disks or removable storage media (e.g. Compact Discs, Digital Versatile Disks, Flash-ROMs such as USB-sticks, memory cards) or combinations thereof. When removable storage media are used the processing unit may further comprise suitable drives for the storage media. For processing, the processing unit comprises at least one processor which may be e.g. a multi-purpose microprocessor or a DSP (digital signal processor) especially suited for processing video information. In the following, for brevity, the term "processor" may also mean a combination of at least two coupled processors.

The processing unit serves to perform at least parts of the method according to the invention and may in addition perform additional tasks when the surveying instrument is used in other modes of operation. In that case, instructions stored in the memory may comprise instructions for performing the additional tasks. In particular, the processing unit may serve as a control and evaluation unit as mentioned above.

As mentioned in the introduction, it is desirable that any of the detector elements can be associated with directions to an object point imaged to the detector element. It is assumed that for that purpose the surveying instrument has been calibrated. The resulting calibration may provide a mapping of the position of the detector element in the array or in the telescope unit to a corresponding direction of the object point and if the distance of the object point is known to corresponding coordinates of the object point in the instrument coordinate system. Generally, for calibration a model for modeling the dependence between the position of the detector element and the directions can be used having calibration parameters that are adjusted to provide an optimal mapping. The calibration parameters are stored in the memory as calibration data, the model is at least implicitly implemented by some of the instructions stored in the memory. German Patent application DE 103 59 415.9 and PCT/EP2004/014365 the content of which is included herein by reference disclose suitable methods for calibration.

The instructions stored in the memory may be at least part of the computer program according to the invention. It can be implemented in an arbitrary programming language and may further include control software for controlling the surveying instrument.

For surveying a target region, target region data are obtained. Target region data can be any data that allow defining the target region. In particular, a set of at least three directions, e.g. given by corresponding vertical and horizontal angles, can be used such that rays starting from the surveying instrument and extending along the directions form edges of the target region which may be three dimensional. Alternatively, the extent and shape of the target region and at least one direction can be used as target region data. Further, the target region data can be given by data indicating that the target region is defined by the current orientation of the telescope unit and the field of view of the camera formed by the imaging optics and the detector array.

Before, simultaneous with or after obtaining the target region data, projection surface data are obtained. Herein projection surface data can be any data that define a two-dimensional surface in three-dimensional space.

The target region data and the projection surface data can be defined in any coordinate system. However, preferably, the target region data and the projection surface data are defined in the same coordinate system.

After obtaining the target region data, the drives may be controlled to move the telescope unit into an orientation in which at least a part of the target region can be imaged onto the detector array if the telescope unit is not already in an orientation for imaging the target region. The orientation may be determined on the basis of the obtained target region data.

Then, a set of pixel data of pixels, i.e. picture elements, representing a two-dimensional image of at least the part of the target region is obtained. For obtaining the pixel data, the processing unit may capture corresponding signals or data produced by the detector array. The pixel data for a pixel may comprise visual information or data. Depending on the kind of detector element, the visual information or data may represent color and/or grayscale information in encoded form. Further, the position of the corresponding detector element in the array may be encoded in the set of pixel data, for example by the position in a sequence of pixel data each position corresponding to a position of a detector element, or by explicit data. Further, the data be compressed, preferably in a lossless manner.

The pixel data are then transformed to a set of projected image data representing a projection of the two-dimensional image of the at least part of the target region to the projection surface. For this transformation the calibration data and the model used for calibration or just a camera model being part of the model used for calibration are used to link the position of each detector element or the corresponding pixel to a corresponding direction and thus position on the projection surface.

The projected image data may comprise visual data representing color and/or grayscale information for given or calculated elements or positions of the projected image. The position of the elements of the projected image may then be represented by coordinates in a three-dimensional coordinate system or two coordinates determining a position of the projection surface.

Further, instead of coordinates for the elements on the projection surface the projected image data may comprise data representing a projection of the projection surface to a display plane.

The projected image data are then stored as surveying data at least temporarily in the memory of the processing unit or on other storage media. The projected image data can then be used for further surveying purposes. In addition or alternatively, the projected image data can be transmitted to a receiving device, e.g. a remote computer which uses the data in other applications.

Preferably, not only the projected image data are stored as surveying data but also data relating to parameters used when capturing the image, e.g. the corresponding orientation of the telescope unit, the projection surface data used and/or further parameter used for the projection such as scale factors. The projected image data can be stored and/or transmitted in any suitable graphics format, in particular a graphics format which provide possibilities to store the additional data in the same file as the projected image data.

Embodiments of the invention have the advantage that surveying information for many directions in the target region as far as imaged is contained in the projected image and that for obtaining this information only one image has to be taken so that surveying can be quite fast. In addition further surveying tasks can be performed in the office using the projected image data.

Generally, the surveying instrument may be a video-theodolite. However, preferably, the surveying instrument further comprises a controllable distance-measuring unit to produce a distance signal representing a distance between the instrument and an object to be surveyed along a sighting axis, the distance measuring unit being connected to the processing unit for sending and receiving signals. Accordingly, in the processing unit for the surveying instrument which comprises a controllable distance-measuring unit to produce a distance signal representing a distance between the instrument and an object to be surveyed along a sighting direction of the distance measuring unit, the instructions comprise instructions for reading the distance signals or distance data generated from the distance signals. In the computer program, with the surveying instrument further comprising a controllable distance-measuring unit to produce a distance signal representing a distance between the instrument and an object to be surveyed along a sighting direction, the instruction may comprise instructions for reading the distance signals or distance data generated from the distance signals. This has the advantage that the surveying instrument as well as the processing unit may be used to measure distances to target points sighted allowing a more complete surveying with only one instrument.

The survey data do not need to be used for further surveying in the terrain. However, in the method, the processing unit or the instrument may comprise a display unit and/or a touchscreen for displaying digital images and the method further may comprise displaying the image captured by the detector array and/or the projected image on the display unit and/or the touchscreen, respectively. In the processing unit preferably at least one interface for a display unit or a touchscreen for displaying digital images is provided and the instructions may comprise instructions to display image captured by the detector array and/or the projected image on the display unit and/or the touchscreen, respectively. In the computer program, the instructions may comprise instructions for displaying the image captured by the detector array and/or the projected image on a display unit or a touchscreen, in particular of the processing unit or of the surveying instrument. The surveying instrument may further comprise at least one display unit or one touchscreen connected to the processing device to receive display data from the processing device. This embodiment has the advantage that a user can check the result of the surveying operation right after the measurements.

For displaying the image and/or the projected image, in the computer program, the instructions may comprise instructions for transforming the projected image data to display data the display data representing a projection of the projected image on a display plane and displaying an image represented by the display data. In the processing device, the instructions may comprise instructions for transforming the projected image data to display data the display data representing a projection of the projected image on a display plane and displaying an image represented by the display data. The method may further comprise transforming the projected image data to display data, the display data representing a projection of the projected image on a display plane and displaying an image represented by the display data.

Preferably, the processing unit comprises the display unit and/or touchscreen connected to the interface.

Further, in this case it is possible to use the displayed image or displayed projected image for inputting further data used in the method or for further surveying.

For that purpose, in the processing unit, for selecting points in the captured or projected image, an interface for a pointing device may be provided and/or the display interface may be an interface for a touchscreen and the instructions stored in the memory comprise instructions for and reading data defining at least one pixel representing a point in the displayed image defined by the position of the pointing device or touching of the touchscreen. In the computer program, for selecting points in the captured or projected image the instructions may comprise instructions for reading data defining at least one pixel representing a point in the displayed image defined by the position of the pointing device or touching of the touchscreen, respectively. The method may further comprise reading data defining at least one pixel representing a point in the displayed image defined by the position of the pointing device or touching of a touchscreen respectively. This embodiment has the advantage that a user can easily select targets in the displayed images or displayed projected images by the pointing device or touching the touchscreen. In particular, the instructions may comprise instructions representing a graphical user interface. The pointing device may preferably be one of a mouse, a trackball, a trackpoint, a touchpad or a joystick. The use of a touchscreen has the advantage that display and positioning means are combined in a single device which simplifies the processing unit and allows a more compact design. In the case of using a pointing device, the operations preferably include displaying a mark at a position corresponding to a position of the pointing device. The computer program may comprise corresponding instructions. Further, the position of the pointing device is generally read when an operating element of the pointing device, e.g. a mouse button, is operated.

The projection surface data may be stored permanently in the memory of the processing unit and obtained therefrom. To be able to define the projection surface more flexibly in the method the step of obtaining the projection surface data may comprise: acquiring data of points in the projected image to define the projection surface, moving the telescope unit into orientations defined by the data, obtaining distance data for each orientation representing a distance between the telescope unit and a point in the target region corresponding to the point in the projected image and determining and storing the projection surface data from the orientations and the associated distance data. In the processing unit, the instructions stored in the memory may include a set of instructions such that the processor is responsive to the set of instructions to acquire data of points in the projected image to define the projection surface, to control drives to move the telescope unit into orientations defined by the data, to control the distance-measuring unit to obtain distance data for each orientation and to determine and store projection surface data being determined from the orientations and the associated distance data. In the computer program may comprise instructions for acquiring data of points in the projected image to define the projection surface, moving the telescope unit into orientations defined by the data, obtaining distance data for each orientation representing a distance between the telescope unit and a point in the target region corresponding to the point in the projected image and determining and storing the projection surface data from the orientations and the associated distance data. This embodiment of the invention has the advantage that the projection surface can be chosen quite easily. Herein the shape of the projection surface can be predetermined, e.g. by corresponding instructions in the program and/or processing unit or a type of projection surface may be selected. In order to allow easy inputting of the projection surface data the processing unit may comprise a device unit and an input device and the instructions stored in the memory may comprise instructions for a graphical user interface for reading the inputs of a user. The projection surface can have any shape. In particular the shape may be a plane, a cylinder surface having a circular cross-section or a sphere. In addition, it is possible to use digital terrain models or digital surface models, e.g. defined by a suitable set of coordinates of points on the surface which may relate the instrument coordinate system. At least in the latter cases the projection surface data may be obtained from an external memory via a network connection or from removable storage media. The processing unit may comprise a network interface and/or a drive for reading removable storage media. This has the advantage that the data can be obtained easily. In particular, in the method the instrument may comprise a controllable distance-measuring unit to produce a distance signal representing a distance between the unit and an object to be surveyed along a sighting axis and the step of obtaining the projection surface data may include displaying the image represented by the pixel data on the display unit and/or touchscreen, respectively, reading the position of the pointing device or a position defined by touching the touchscreen, calculating an orientation of the telescope unit such that the sighting axis of the distance-measuring unit points into a direction in the target region corresponding to the read position, controlling the drives to move the telescope unit into the calculated position, obtaining distance data representing the distance between the unit and an object on the sighting axis and storing projections surface data being based on the distance data and the data representing the orientation. In the case that the surveying instrument comprises a controllable distance-measuring unit to produce a distance signal representing a distance between the device and an object to be surveyed along a sighting axis, in the processing unit and the computer program for the step of obtaining projection surface data the instructions comprise instructions for displaying the image represented by the pixel data on the display unit or the touchscreen, respectively, reading the position of the pointing device or a position defined by touching the touchscreen, calculating an orientation of the telescope unit such that the sighting axis of the distance-measuring unit points into a direction in the target region corresponding to the read position, controlling the drives to move the telescope unit into the calculated position, controlling the distance-measuring unit to obtain distance data representing the distance between the unit and an object on the sighting axis and storing projections surface data being based on the distance data and the data representing the orientation. The number of points to be selected to represent the projection surface depends on the geometry of the projection surface. If the projection surface is a plane it is sufficient to take measurements for three points which are not collinear. If the projection surface is the surface of a sphere or a cylinder being vertical it is sufficient to obtain the direction and distance of at least one point on the projection surface if the surveying instrument is located in the center of the sphere or cross-section of the cylinder. This embodiment allows a very simple input of at least some of the projection surface data.

The information content of the projected image is particularly high, if the shape of the projection surface corresponds to the shape of a surface of a particular object to be imaged. If the geometry of the projection surface corresponds to the geometry of an object to be surveyed the projection of the image to the projected image corresponds to a so-called ortho-projection in which a parallel projection of the captured image on the projection surface results. In the case that the projection surface is not the display plane which is displayed on the display unit, an additional transformation can be used to transform the projected image to the display plane. Thus, the method may further comprise transforming the projected image data to display data the display data and displaying an image represented by the display data. In the processing device and/or the computer program the instructions may comprise instructions for transforming the projected image data to display data the display data and displaying an image represented by the display data. If the projection surface can be developed on a plane, e.g. a cylinder surface, the transformation can chosen accordingly and in particular the arrangement of pixels can be chosen accordingly. Otherwise, the transformation may be a projection. Preferably, the transformation is such that angles and/or distances are not distorted by the transformation. In particular for spheres, several different projections are known in the art to project images on a sphere to a plane. Examples of those projections are disclosed in Kuntz, Eugen: Kartennetzentwurfslehre: Grundlagen und Anwendungen, Karlsruhe, Germany, Wichmann, 1990, ISBN 3-87907-1861 the content of which is included herein by reference.

The target region data can be simply read from memory in which they are permanently stored or temporarily stored after receiving them over a suitable communication link from another device. Alternatively, in the method the step of acquiring the target region data may comprise reading user inputs defining directions limiting the target region and/or positions in the projected image and preferably an extent of the target region. In the processing unit and the computer program for the step of obtaining target region data the instruction may include a set of instructions such that the processor is responsive to the set of instructions to acquire the target region data by reading user inputs defining directions limiting the target region and/or positions in the image detected by the detector array or in the projected image and preferably an extent of the target region. This has the advantage that the target region can be easily input. The directions, i.e. rays from the instrument along directions, can be input relative to the instrument coordinate system or, if the position of the instrument is known, relative to an external coordinate system relative to geographical directions. Alternatively, the directions can be obtained by reading corresponding positions in the image or the projected image and determining the directions using the calibration data using the steps mentioned in the preceding paragraphs.

Often it may happen that the target region is too large to be imaged in only one image captured by the detector arrangement. Therefore in the method the step of acquiring pixel data may include: determining orientations of the telescope unit in which pixel data are to be obtained representing partial two-dimensional images of the target region such that the partial two-dimensional images cover the target region, moving the telescope unit into the determined orientations and acquiring pixel data in each orientation, and the step of transforming the pixel data may include transforming the pixel data for each orientation to a set of projected partial image data representing a projection of the respective partial image to the projection surface using the calibration data, and generating panoramic image data representing an panoramic image of the target region projected to the projection surface from the projected partial image data. In the processing unit or the computer program, the instructions may include a set of instructions such that the processor is responsive to the set of instructions to determine orientations in which pixel data are to be obtained representing partial two-dimensional images of the target region so that the partial two-dimensional images cover the target region, to control the drives to move the telescope unit into the determined orientations and acquire pixel data in each orientation, to transform the pixel data for each orientation to a set of projected partial image data representing a projection of the respective partial image to the projection surface using the calibration data, and to generate panoramic image data representing an panoramic image of the target region projected to the projection surface from the projected partial image data. This embodiment has the advantage that also large target regions can be surveyed with little effort. In particular, a user surveying the target region only needs to generate and/or input the target region data to obtain the panoramic image.

Preferably, the telescope unit is controllable with such a precision that the partial images do not need to overlap. In order to obtain a panoramic image of high quality, however, in the method the orientations are determined such that the partial two-dimensional images overlap, and the method further comprises adjusting the pixel data in at least one of the partial images and the projected image data of at least one of the projected partial images in the overlap region using the pixel data of the partial images or the projected image data of the projected partial images in the overlap region, respectively. In the processing unit and in the computer program the instructions may include a set of instructions such that the processor is responsive to the set of instructions to determine the orientations such that the partial two-dimensional images overlap, and to the pixel data in at least one of the partial images and the projected image data of at least one of the projected partial images in the overlap region using the pixel data of the partial images or the projected image data of the projected partial images in the overlap region, respectively. In particular, the adjusting of pixel data or projected image data may include adjusting the visual data comprised therein, e.g. the color and/or brightness and/or grayscale information, by a radiometric adjustment.

Generally, in the target region there may be moving objects that may disturb the surveying operation. Thus, in the method the step of acquiring the pixel data may comprise: acquiring preliminary pixel data corresponding to the same target region at subsequent times and calculating the pixel data from the preliminary pixel data corresponding to an identical target point at different times by averaging. In the processing unit and/or in the computer program the instructions may include a set of instructions such that the processor is responsive to the set of instructions to acquire preliminary pixel data corresponding to the same target region at subsequent times and calculate the pixel data from the preliminary pixel data corresponding to an identical target point at different times by averaging. The repeated capturing of images of the same scene and the averaging has the advantage that moving objects can be eliminated at least approximately from the image or the partial images without the use of sophisticated image processing algorithms for finding moving objects. Further, a higher precision of the pixel data used for transforming can be obtained.

Generally, the projected image data can be obtained by direct projection of the pixels of the two-dimensional image captured by the detector array to the projection surface. However, in the method the projected image may be represented by an arrangement of projected image pixels, each of the projected image pixels having associated visual data, and the step of transforming the pixel data may include: determining visual data for at least one projected image pixel from the visual information in the pixel data of at least one pixel of the set of pixels the at least on pixel having a location which is closest to the location of the projected image pixel of the image reversely projected to an image surface defined by the locations of the detector elements or the pixels of the image. In the processing unit and/or in the computer program the projected image may be represented by an arrangement of projected image pixels, each of the projected image pixels having associated visual data, and for transforming the pixel data the instructions may include a set of instructions to visual data for at least one projected image pixel from the visual information in the pixel data of at least one pixel of the set of pixels the at least on pixel having a location which is closest to the location of the projected image pixel of the image reversely projected to an image surface defined by the locations of the detector elements or the pixels of the image. This kind of projection corresponds to an indirect or reverse projection. Starting from given projected image pixel locations in the projected image a corresponding position is determined in the image plane, i.e. the plane of the detector array, the plane used for defining the pixels of the captured image or the camera model, which would be directly projected to the projected image pixel location on the projection surface. Using this indirect or reverse projection has the advantage that the determination of the visual data or visual information such as color and/or brightness and/or grayscale information, is faster than in a direct projection. Preferably, for the at least one projected image pixel the visual information is determined by determining a corresponding position in the image captured by the detector array and calculating the visual information by interpolation between the visual data of neighboring pixels. Preferably, bilinear interpolation is used.

One advantage of the indirect projection technique is that gaps between or overlaps of neighboring pixels can be avoided. Another advantage is that in the case that pixels in the projection surface are properly chosen no further operations are necessary to display the projected image on the display unit.

The obtained surveying data, i.e. the projected image can be used for further surveying tasks. These can be either performed at a remote site, e.g. in the office, after being stored and then read by a suitable data processing system. However, the method may also comprise the operations of reading two positions in the displayed image selected by the pointing device or by touching the touchscreen, determining a distance between two points in the projected image corresponding to the selected points in the projected image and displaying the determined distance or a value calculated from the determined distance. In the processing unit and/or the computer program the instructions may comprise instructions for reading two positions in the displayed image selected by the pointing device or by touching the touchscreen, determining a distance between corresponding points in the projected image and displaying the determined distance or a value calculated from the determined distance. This embodiment has the advantage that surveying can be performed using only the projected image and the displayed image, respectively, so that no further movements of the telescope unit are necessary. The measured data may also be stored, preferably associated with the points defining the distance. It is also possible to perform these operations on a separate computer on the basis of the stored projected image data.

Further, the method may comprise the operations of reading three positions in the displayed image selected by the pointing device or by touching the touchscreen, determining an angle between two lines defined by corresponding points in the projected image and displaying the determined angle or a value calculated from the determined angle. In the processing unit and/or the computer program the instructions may comprise instructions for reading three positions in the displayed image selected by the pointing device or by touching the touchscreen, determining an angle between two lines defined by corresponding points in the projected image and displaying the determined angle or a value calculated from the determined angle. This embodiment has the advantage that surveying can be performed using only the projected image and the displayed image, respectively, so that no further movements of the telescope unit are necessary. The measured data may also be stored, preferably associated with the points defining the distance. It is also possible to perform these operations on a separate computer on the basis of the stored projected image data.

In another embodiment the method comprises the operation of displaying additional information on the display unit. In the processing unit and/or the computer program the instructions may include a set of instructions for displaying additional information obtained by or stored in the processing unit on the display unit. This embodiment has the advantage that a user can read the additional information from the same display so that operating the processing unit or the instrument becomes more comfortable and less error prone. The additional information may for example relate to the present orientation of the telescope unit defined by horizontal and vertical angles sensed by the orientation sensors.

In another embodiment the method comprises the operations of storing survey data representing points in the target region already surveyed, and displaying as additional information a mark on the display unit representing at least one of the surveyed points in the projected image. In the processing unit and/or the computer program the instructions may include a set of instructions for storing survey data representing points in the target region already surveyed, and displaying a mark on the display unit representing at least one of the surveyed points in the projected image. This embodiment enables the user to monitor progress of the surveying. In particular after interruptions of the surveying, it becomes simpler to recognize the target point last surveyed. Preferably, all survey points are indicated on the display unit.

The method may also comprise the operations of acquiring coordinate data representing points in the target region to be surveyed, and displaying a mark representing at least one point still to be surveyed in the projected image on the display unit. In the processing unit and/or the computer program the instructions may include a set of instructions for acquiring coordinate data representing points in the target region to be surveyed, and displaying a mark representing at least one point still to be surveyed in the projected image on the display unit. One advantage of the embodiment lies in the possibility to indicate a whole sequence of points to be surveyed so that a person can move e.g. a reflector more easily to a position to be surveyed. Preferably, also a curve connecting the points still to be surveyed is shown. This allows a better overview in situations with several target points to be surveyed.

Apart from storing or displaying the projected image, i.e. the projected image data, the projected image can be printed. For that purpose the processing unit may comprise a printer interface which may be e.g. a parallel port, a USB-interface or an IRDA-interface in combination with suitable software interfaces.

In the processing unit further a wireless communication unit for sending data to and receiving commands from a reflector unit may be provided, the reflector unit having a wireless communication unit for receiving data from the processing unit and sending commands to the processing unit, a display unit and a pointing device or a touchscreen and a processor connected to the display unit and pointing device or the touchscreen, respectively, and the instructions may include instructions for sending the pixel data or the projected image data to the reflector unit to be displayed on the display unit or the touchscreen, respectively, of the reflector unit, reading command data representing pixel data of a pixel in the displayed projected image selected by means of the pointing device or the touchscreen of the reflector unit, determining horizontal and vertical angles Hz and Vz corresponding to the selected pixel, and controlling the drives to rotate the telescope unit to the horizontal and vertical angles Hz-180° and Vz-180°, respectively. The method may further comprise the operations of sending the pixel data or the projected image data to a reflector unit having a display unit and a pointing device or a touchscreen and a processor connected to the display unit and the pointing device or the touchscreen, respectively, for being displayed on the display unit or the touchscreen, respectively, of the reflector unit, receiving command data representing projected image pixel data of a projected image pixel in the displayed projected image selected by means of the pointing device or the touchscreen of the reflector unit, determining horizontal and vertical angles Hz and Vz corresponding to the selected projected image pixel, and controlling the drives to rotate the telescope unit to the horizontal and vertical angles Hz-180° and Vz-180°, respectively. The computer program may include instructions for sending the pixel data or the projected image data to a reflector unit having a display unit and a pointing device or a touchscreen and a processor for being displayed on the display unit or the touchscreen, respectively, of the reflector unit, receiving command data representing projected image pixel data of a projected image pixel in the displayed projected image selected by means of the pointing device or the touchscreen of the reflector unit, determining horizontal and vertical angles Hz and Vz corresponding to the selected projected image pixel, and controlling the drives to rotate the telescope unit to the horizontal and vertical angles Hz-180° and Vz-180°, respectively. This embodiment allows the user in an advantageous way to use the reflector unit to direct the telescope unit at least roughly to a predetermined target. Preferably, the surveying instrument comprises a tracking device which can control the drives to move the telescope unit into orientations such that the telescope unit tracks a moving reflector.

According to another aspect of the invention a computer readable storage medium is provided, the medium storing a computer program according to the invention. The storage medium can be e.g. a RAM, a ROM, a Flash-ROM, a USB-stick, a memory card, an optical storage medium such as a CD, a DVD, a Blue-Ray Disk, an magneto-optical storage medium or a magnetic storage medium such as a tape, a floppy disk or a hard disk.

BRIEF DESCRIPTION OF THE DRAWINGS

The foregoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

Exemplary embodiments of the invention are explained in more detail below by way of example and with reference to the drawings. In the drawings

FIG. 14 shows a diagram illustrating the calculation of virtual distances of virtual image points;

FIG. 15 shows a section of a first image sensor of the video-tacheometer in FIGS. 4, 5, 6A, 6B, and 6C, and an arrangement of cells covering the section of the image sensor;

FIG. 16 shows a diagram for illustrating the calculation of directions with respect to an instrument center;

DETAILED DESCRIPTION OF EXEMPLARY EMBODIMENTS

Figure 1:
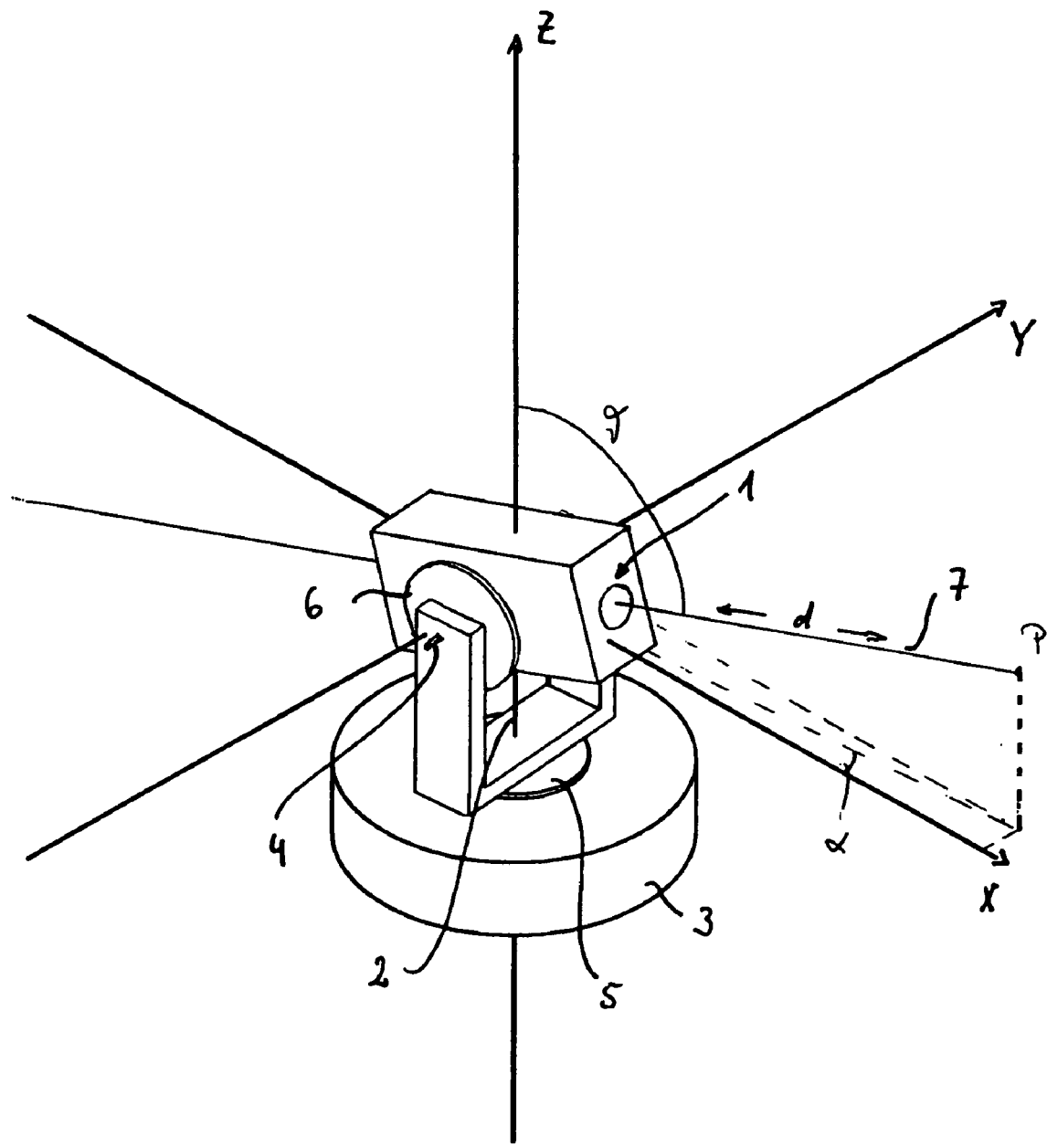
FIG. 1 shows a schematic perspective view of a tacheometer with a corresponding coordinate system and an object point.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

Figure 3:
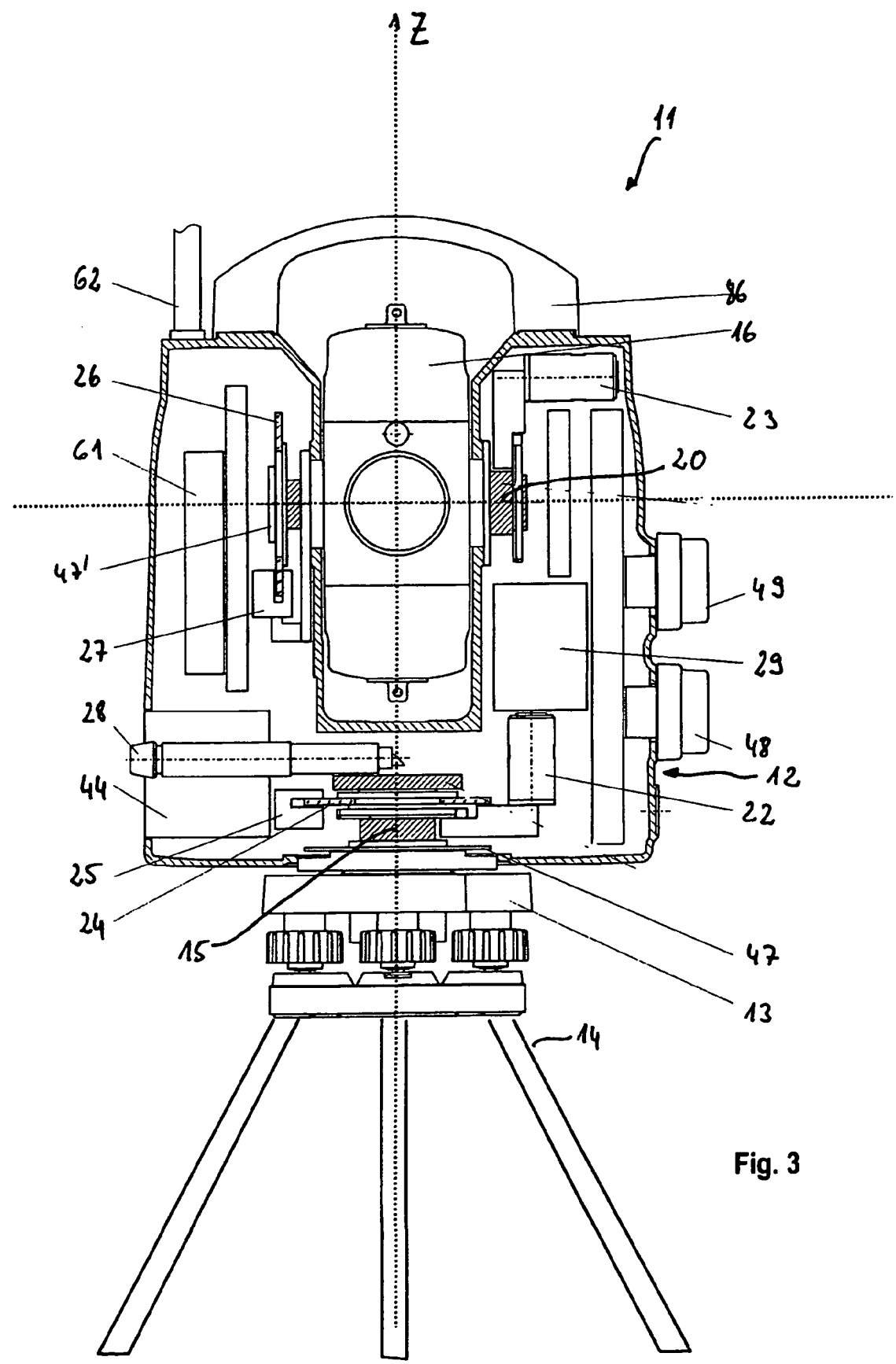
FIG. 3 shows a front view of a video-tacheometer according to a first exemplary embodiment of the invention.
Figure 4:
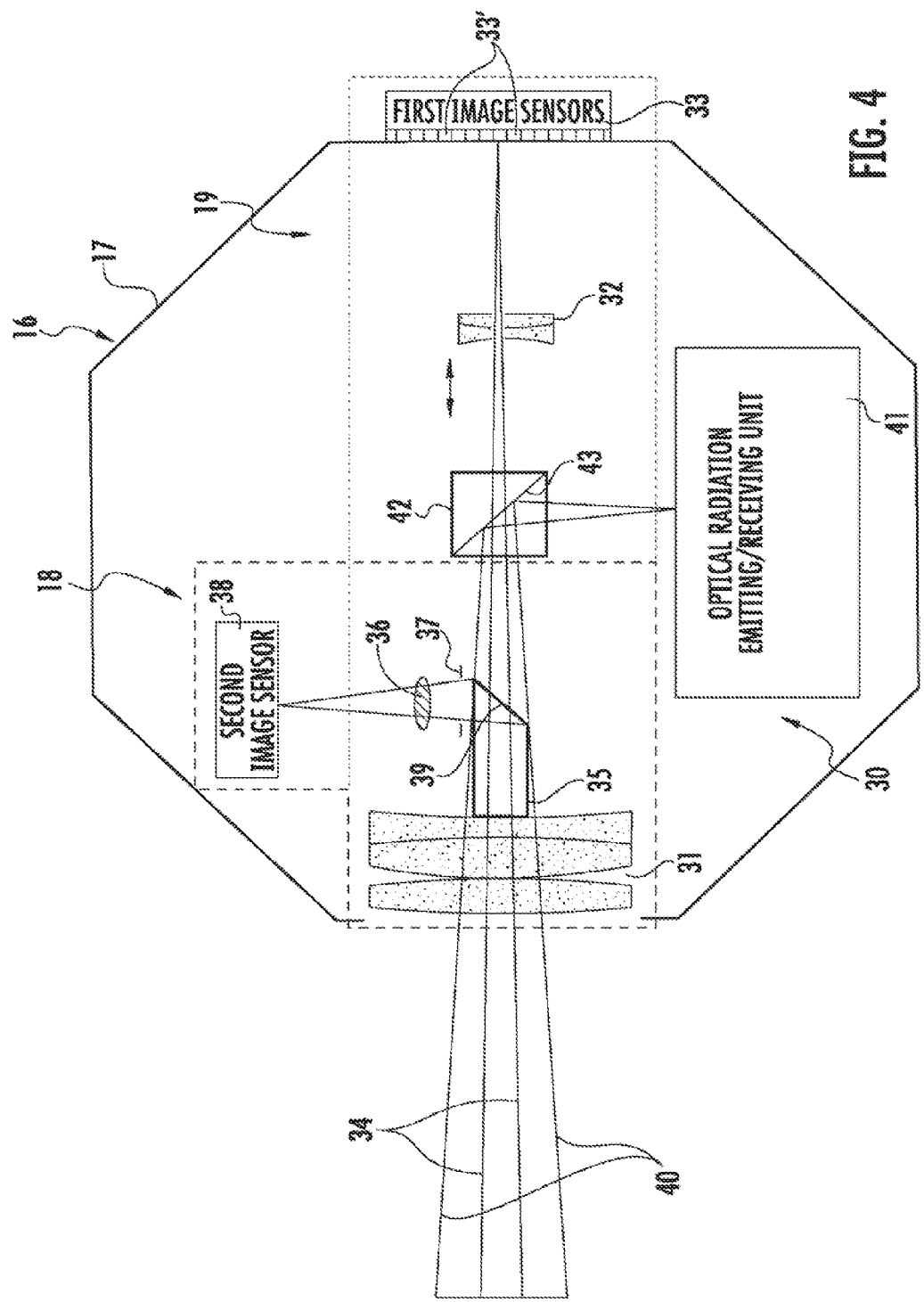
FIG. 4 shows a side view of a telescope unit of the video-tacheometer in FIG. 3.
Figure 5:
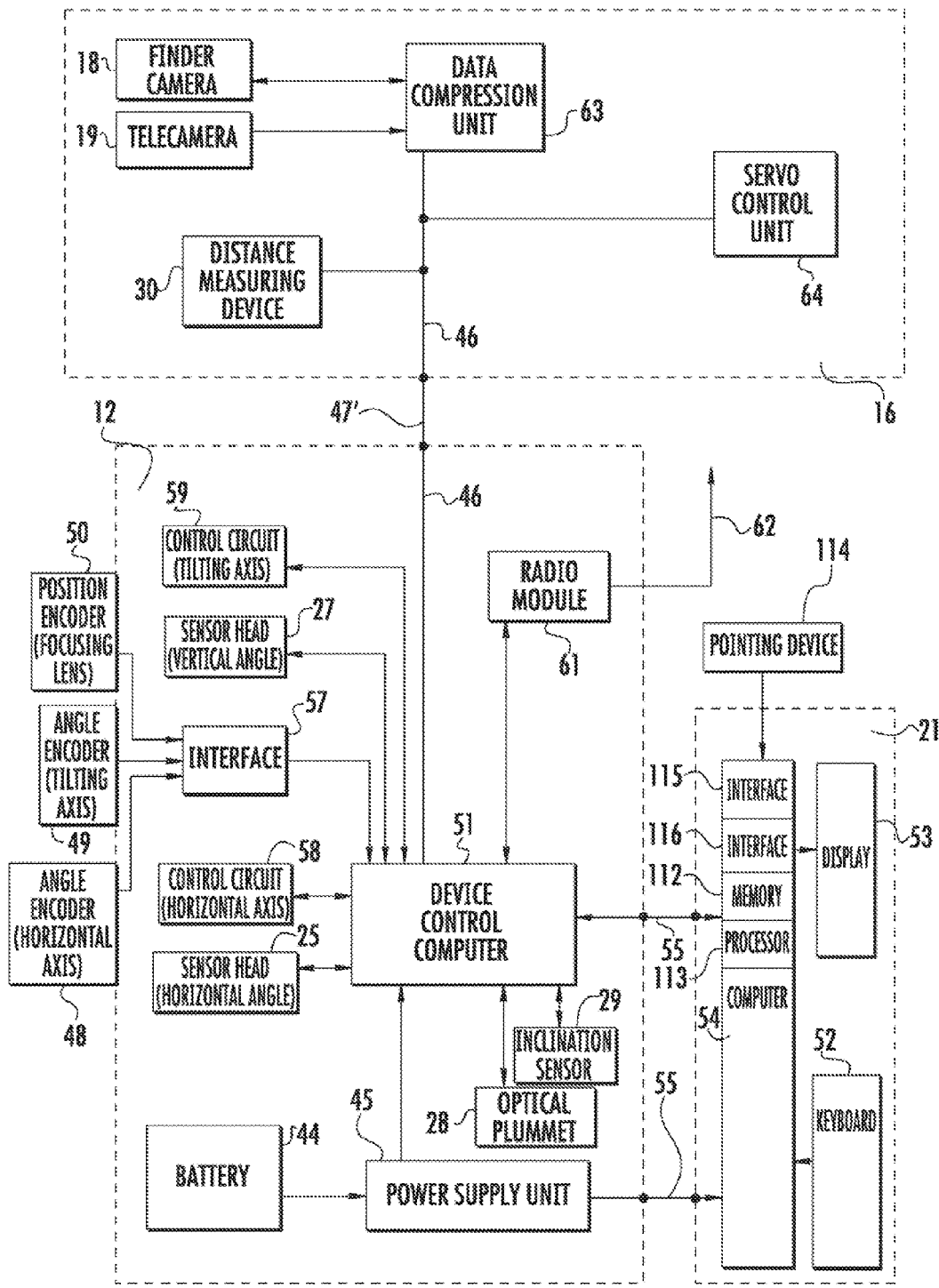
FIG. 5 shows a schematic block diagram of the video-tacheometer in FIG. 3.
Figure 6A:
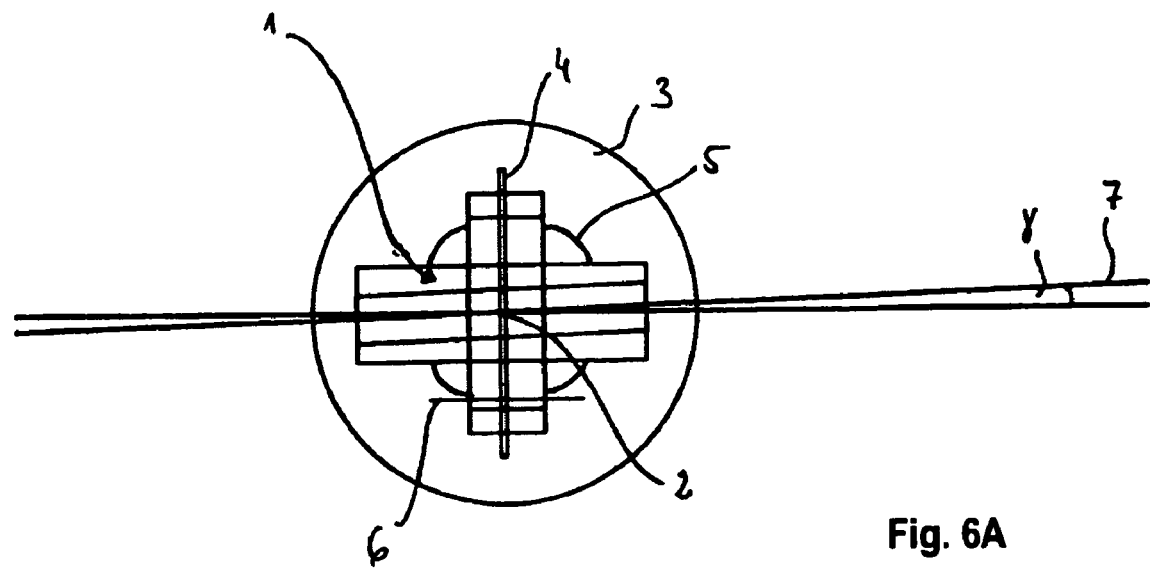
FIG. 6A shows a top view of a tacheometer as in FIG. 1, the instrument having a collimation error.
Figure 6B:
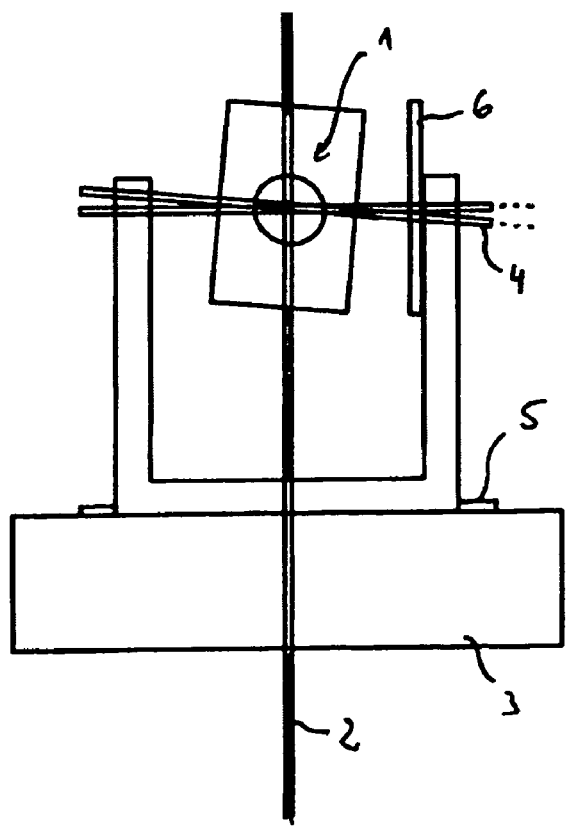
FIG. 6B shows a front view of a tacheometer as in FIG. 1, the instrument having a tilting axis error.
Figure 6C:
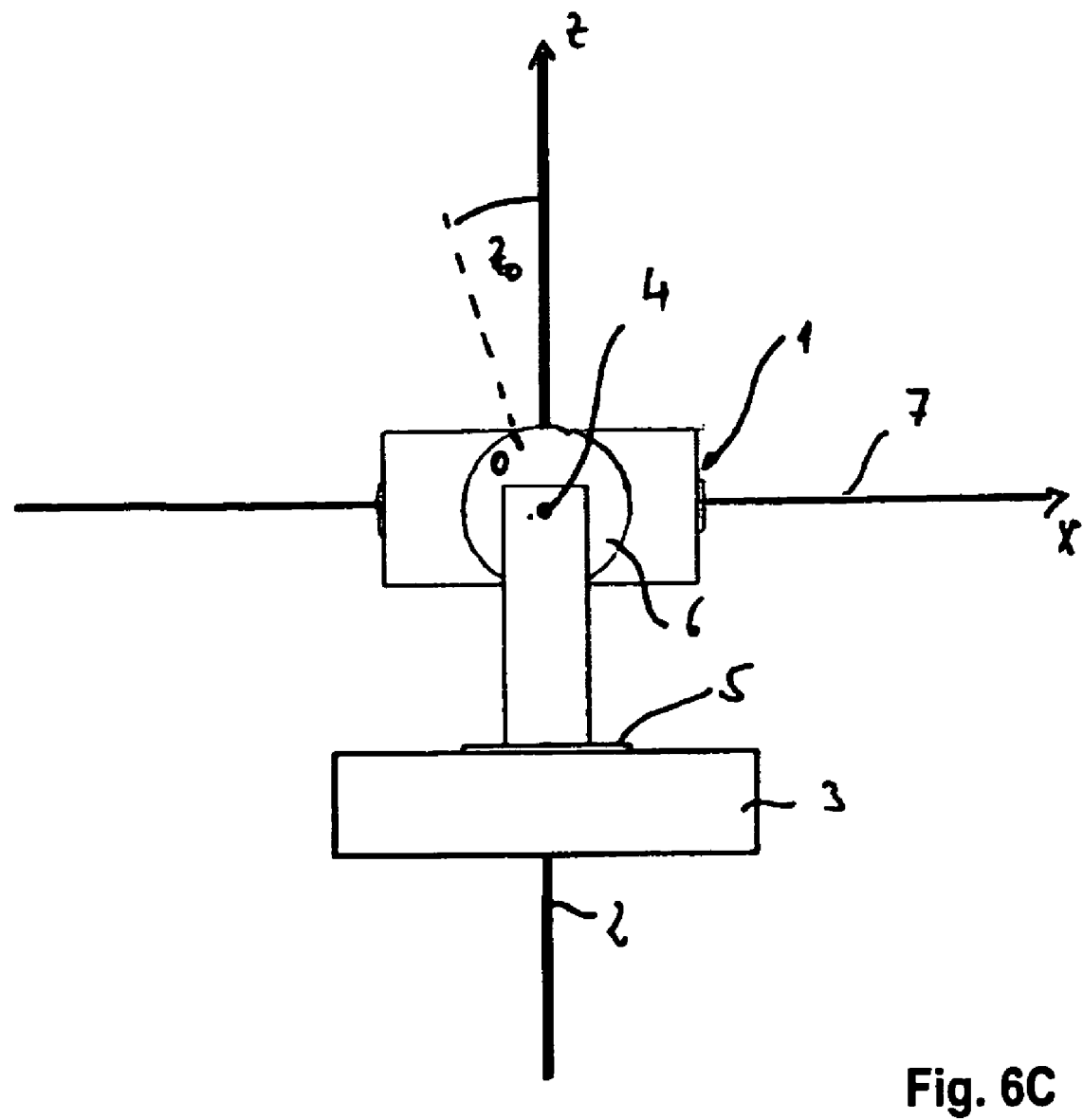
FIG. 6C shows a side view of a tacheometer as in FIG. 1, the instrument having a vertical height index error.

A video-tacheometer 11 according to a first embodiment of the invention is shown in FIGS. 3 to 5 in a schematic and simplified manner.

An alidade 12 is arranged on a base element 13 of a tripod 14 serving as stand for the video-tacheometer 11. The alidade 12 is rotatable about a vertical axis 15, which is oriented vertical to the ground if the video-tacheometer 11 is correctly oriented with respect to ground. The alidade 12 carries a telescope unit 16, which comprises in a housing 17, a finder camera 18 having a wide field of view and a telecamera 19. The telescope unit 16 is rotatable about a tilting axis 20, which is orthogonal to the vertical axis 15 up to a tilting axis error. Thus, the tilting axis 20 rotates with rotation of one of the cameras 18 and 19 about the vertical axis 15. A control panel 21 is removably mounted to the alidade 12. The alidade 12 may be handled by means of a handle 86.

Rotation and tilting drives 22 and 23, respectively, are provided for rotating the alidade 12 about the vertical axis 15 and for tilting the telescope unit 16 about the tilting axis 20.

For measurement of an angle of rotation or of a horizontal angle about the vertical axis 15, a graduated horizontal circle 24 for the horizontal angle a sensing head 25 is provided. The horizontal circle 24 is concentric with the vertical axis 15. The sensing head 25 is held on the alidade 12 and can sense an angular position of the alidade 12 and thus of the telescope unit 16 and the cameras 18 and 19 relative to the base element 13.

For measurement of an angle of rotation, i.e. tilt, about the tilting axis 20, i.e. of the vertical angle, a graduated vertical circle 26 for the vertical angle is correspondingly mounted to the tilting axis 20 being coaxial with the tilting axis 20. A sensing head 27 for the vertical angle which is also held on the alidade 12 can sense the angular position of the telescope unit 16.

Thus, the graduated horizontal circle 24 and the graduated vertical circle 26 are orientation sensors producing orientation data representing an orientation of the telescope unit 16 about horizontal and vertical axes.

The video-tacheometer 11 further comprises an optical plummet 28 arranged in the alidade 12, which comprises a small telescope pointing downwardly in a vertical direction. An optical axis of the small telescope is substantially coaxially with the vertical axis 15. Thus, the optical plummet 28 can be used to center or position the video-tacheometer 11 above a point on the ground, such as a boundary stone, for example. As an alternative an optical plummet could be used which emits a light beam downwardly in a vertical direction, the light beam being substantially coaxial with the vertical axis 15.

An inclination sensor or clinometer 29 which is also arranged in the alidade 12 measures the inclination of the alidade 12 and, thus, of the video-tacheometer 11 in two directions which are orthogonal to each other and, thus, allows to check whether the vertical axis 15 is in a true vertical direction within a given accuracy of the measurement and whether thus the tilting axis 20 is in a true horizontal direction relative to the ground up to a tilting axis error.

Three optical devices are arranged in the telescope unit 16, which is shown from the front in FIG. 3 and in a lateral, sectional view in FIG. 4. These are the finder camera 18, the telecamera 19 and a distance-measuring device 30.

The telecamera 19 comprises an objective 31 and a focusing lens 32 forming first imaging optics and a first image sensor 33. An object or object point is imaged by the objective 31 and the focusing lens 32 onto the image sensor 33, wherein for focusing the image onto the image sensor the focusing lens 32 is moved along the optical axis of the objective 31 and the focusing lens 32, as indicated by the arrows in FIG. 4. The field of view of the telecamera 19 is rather narrow and bounded by boundary rays 34 as shown in FIG. 4.

The finder camera 18 uses some of the optical elements of the telecamera 19. The finder camera 18 comprises the objective 31, a beam splitting prism 35 arranged in the optical path of the objective 31, a supplementary objective 36 and a diaphragm 37 forming second imaging optics and a second image sensor 38. The combined objective formed by the objective 31 and the supplementary objective 36 focuses light from a scene captured by the finder camera 18 onto the second image sensor 38. In the combined objective, the light passing through the objective 31 is reflected by a semi reflective surface 39 of the beam splitting prism 35 towards the supplementary objective 36. The supplementary objective 36 reduces a focal length of the combined objective for the finder camera 18. The diaphragm 37 ensures an essentially focused imaging onto the second image sensor 38 for objects in a distance of more than a couple of meters, so that for the finder camera 18 no focusing lens is necessary. Due to the reduced focal length of the combined objective the field of view of the finder camera 18 (shown in FIG. 4 by the limiting rays 40) is larger than that of the telecamera 19. Preferably, the range of view of the finder camera 18 may be ten times the range of view of the telecamera 19 or more.

The first and second image sensors 33 and 38 are both CCD matrix sensors which comprise an array of photo detector elements 33' which is to a very good approximation rectangular. Images captured by the image sensors are processed by units discussed further below. Each of the detector elements has a location in the array that is represented by corresponding location data. Further, each of the detector elements is responsive to an image projected on the array by the first and second imaging optics, respectively, to generate data of a corresponding pixel representing an element or point of the image.

The distance measuring device (distance-measuring unit) 30 comprises an optical radiation emitting/receiving unit 41, a dichroic beam splitting prism 42 having a beam splitting layer 43 and the objective 31. The emitting/receiving unit 42 emits infrared radiation which is selectively reflected by the dichroic beam splitting layer 43 towards the objective 31. The infrared radiation may then hit a reflector or a target in the terrain from where it is returned. The objective 31 focuses the returned infrared radiation to the emitting/receiving unit 41 via the beam splitting prism 42. The emitting/receiving unit 41 emits pulses of infrared radiation and measures the time of flight of the pulses from the emitting/receiving unit 41 to the target and back to the emitting/receiving unit 41 and determines from the times of flight the distance of the target from the video-tacheometer 11.

Any movements of components of the video-tacheometer 11 are effected electronically. FIG. 5 shows a block diagram in which the various functional blocks of the video-tacheometer 11 are schematically shown, including their connections to each other. The broken lines illustrate the physical units in which the respective components and devices are arranged.

A battery 44 which is arranged in the alidade 12 feeds a power supply unit 45 which serves to supply the video-tacheometer 11 with power. The power supply unit 45 supplies all components and devices in the alidade 12 and the telescope unit 16, as well as any modules connected to it, with the required operating voltages. For the sake of better overview these connecting lines are not shown. The individual components can be connected individually via separate lines as the case for components within the alidade 12 or by a central bus 46 which provides data and power supply lines between the alidade 12 and the telescope unit 16. Slip rings 47' arranged on the tilting axis 20 connect the sections of the bus 46 in the alidade 12 and the telescope unit 16. By these slip rings 47' electric or electronic components in the telescope unit 16 can be supplied with power and can exchange data with components in the alidade 12.

Slip rings 47 arranged on the vertical axis 15 enable a power supply from outside as well as a data transfer to or from external devices via a plug, which is not shown.

For control or operation of the video-tacheometer 11, the video-tacheometer 11 is provided with the control panel 21 and operating elements 48, 49 and 50 in the form of angle encoders arranged on the alidade 12 being operable by corresponding knobs.

An important electric device for controlling operation of the video-tacheometer 11 is a device-control computer or device-control unit 51 arranged in the alidade 12 and provided with power by the power supply unit 45.

The device-control computer 51 comprises a volatile memory, a non-volatile memory and a processor for executing a program stored in the non-volatile memory. The program contains instructions for operation of the various components of the video-tacheometer and in particular instructions for preprocessing and transferring image data obtained from the image sensors 33 and 38, respectively, the control panel 21 where they are further processed.

The operating elements 48, 49 and 50 are connected to the device-control computer 51 via a corresponding interface 57. This interface 57 allows to generate signals corresponding to a rotary position of the operating elements 48, 49 and 50, respectively, which are transmitted to the device-control computer 51.

The operating elements 48 and 49 serve for controlling rotation of the alidade 12 about the vertical axis 15 and tilting of the telescope unit 16 about the tilting axis 20, respectively. In response to signals from the operating elements 48 and 49, respectively, and the interface 57 the device-control computer 51 controls via control circuits 58 and 59 in the alidade 12 the drives 22 and 23 to rotate the alidade 12 about the vertical axis 15 and to tilt the telescope unit 16 about the tilting axis 20, respectively. Angle measurements may be used to control the drives 22 and 23.

Drives 22 and 23 do not need to be controlled solely by the operating elements 48 and 49, respectively, but can also be controlled on the basis of a program stored and executed in the device-control computer 51 or on the basis of commands sent to the device-control computer 51, e.g. from the control panel 21.

The drives 22 and 23 cooperate with the angle-measuring devices, i.e. the graduated horizontal circle 24 for the horizontal angle and the corresponding sensing head 25, or the graduated vertical circle 26 for the vertical angle and the corresponding sensing head 27, respectively, such that the alidade 12 with the telescope unit 16 can be rotated as desired about the vertical axis 15 and the telescope unit 16 can be rotated about the tilting axis 20 in a measurable manner and can be brought in to a desired horizontal and vertical angle position. This purpose is served inter alia, by the device-control computer 51, which receives signals from the sensing heads 25 and 27 and controls the control circuit 58 for the horizontal drive 22 and the control circuit 59 for the tilting drive 23 in response to said signals.

The angles which the alidade 12 is to be rotated to about the vertical axis 15 and which the telescope unit 16 is to be rotated to about the tilting axis 20 can be provided in three ways. First, the operating elements 48 and 49 allow input of corresponding angles to the device-control computer 51. Second, the device-control computer 51 can determine the angle to be set also as a function of data from other components of the video-tacheometer 11, e.g. the control panel 21, and can accordingly control the control circuits 58 and 59, respectively. Third, corresponding data can be input to the control-device unit 51 via an interface 69, for example a RS232-interface.

A radio module 61, which is connected to the device-control computer 51 and has an antenna 62, serves to exchange data with remote devices, such as a remote control. For example, the video-tacheometer 11 can be remote-controlled by a remote control or station, which is located at the target point of the measurement, but it is not shown in the Figures.

For processing the signals of the image sensors 33 and 38, a data compression unit 63 is provided in the telescope unit 16 which compresses image data received from the image sensors 33 and 38. The compressed data can then be sent to the device-control computer 51 which may pre-process and/or forward the data to the control panel 21.

For controlling the position of the focusing lens 32 the operating element 50 of the same type as the operating elements 48 and 49 arranged at the alidade 12 provides signals via the interface 57 to the device-control computer 51 which in turn provides corresponding control signals to a servo control unit 64 arranged in the telescope unit 16 to drive a corresponding focusing drive for shifting the focusing lens 32. This drive is not shown in the Figures.

The device-control computer 51 is further connected to the above-mentioned optical plummet 28 and the inclination sensor 29.

The control panel 21 representing a processing unit according to a first preferred embodiment according to the invention serves for communication between the operator and the video-tacheometer and is provided with a keyboard 52 for input, a display unit 53 for output of data and images captured by one of cameras 18 or 19, respectively, e.g. an LCD, a mouse as a pointing device 114 and a computer 54 to which the display unit 53, the pointing device 114 and the keyboard 52 is connected.

The control panel 21 is connected to the device-control computer 51 arranged in the alidade 12 and the power supply unit 45 via a releasable connection 55. Since the control panel 21 is removable, it may be equipped with its own battery, which ensures that the computer 54 continues to work even when the control panel 21 is removed from the alidade 12.

The computer 54 comprises a memory 112 having a volatile and a non-volatile section. The non-volatile section stores calibration data and instructions of a computer program. The computer 54 further comprises a processor 113 responsive to the instructions to perform the method according to a first preferred embodiment of the invention as described below. The computer 54 can also perform numerous geodesic calculations by means of its program and data memories.

The computer 54 is connected to the device-control computer 51 via a connection 55 so that commands and data can be transferred to the device-control computer 51 and in data, in particular image data and angle data can be sent to the computer 54.

The processor 113 is connected to memory 112 and an interface 116 comprising hardware and software to the display unit 53.

Further, the processor 113 is connected to the pointing device 114 via a corresponding interface 115. The instructions in memory 112 comprise instructions for controlling the display 53 and reading inputs from the mouse and the keyboard 52 such that a graphical user interface is formed.

The computer program comprises further a program module, i.e. instructions, which the processor 113 can execute to calculate a direction of an object point an image of which was captured by the telecamera 19 as function of the position of the image of the object point on the image sensor 33 and the horizontal and vertical angles read from the horizontal and vertical circles 24 and 26 using calibration data stored in memory 112. For that purpose and for the reverse calculation a model is used having model parameters which are given by properties of the video-tacheometer 11.

The control panel 21 represents a processing unit according to a first preferred embodiment of the invention.

In order to achieve a high precision of these calculations the model parameters are determined for the particular video-tacheometer 11. To obtain the values of the model parameters, in the following also termed calibration data, a calibration of the video-tachymeter is performed. This type of calibration is performed for several reasons. As mentioned in the introduction, the axes of a tacheometer should ideally be vertical and horizontal. Practically, however, the above-mentioned conditions for an ideal tacheometer are not met. Rather, the accuracy of measurements may be reduced by different types of errors as illustrated in FIGS. 6A to 6C and 3 in a simplified manner for the instrument of FIGS. 1 and 3, respectively.

A first error relates to the orientation of the vertical axis 2. It should be perfectly perpendicular to the ground, i.e. it should point along the direction of gravity, but in practice it may not be so. This error is not caused by the instrument itself and thus can only be avoided by proper orientation of the surveying instrument. As second error, a line-of-sight error or collimation error may occur which is a deviation of the angle g between the sighting axis 7 and the tilting axis 4 from a right angle (see FIG. 6A). A third error is the so called tilting-axis error (see FIG. 6B) which is the deviation of the angle between the tilting axis and the vertical axis from a right angle. Finally, a so called height-index error $z0$ may occur which is the deviation between the true angle between the sighting axis and the vertical axis and the corresponding angle read on the vertical circle (see FIG. 6C). These last three errors are caused by tolerances of the surveying instrument. In order to be able to provide correct measurements, the surveying instrument needs to be calibrated, that is a relationship between the angles read on the horizontal and vertical circles and the corresponding true angles has to be established.

Figure 2:
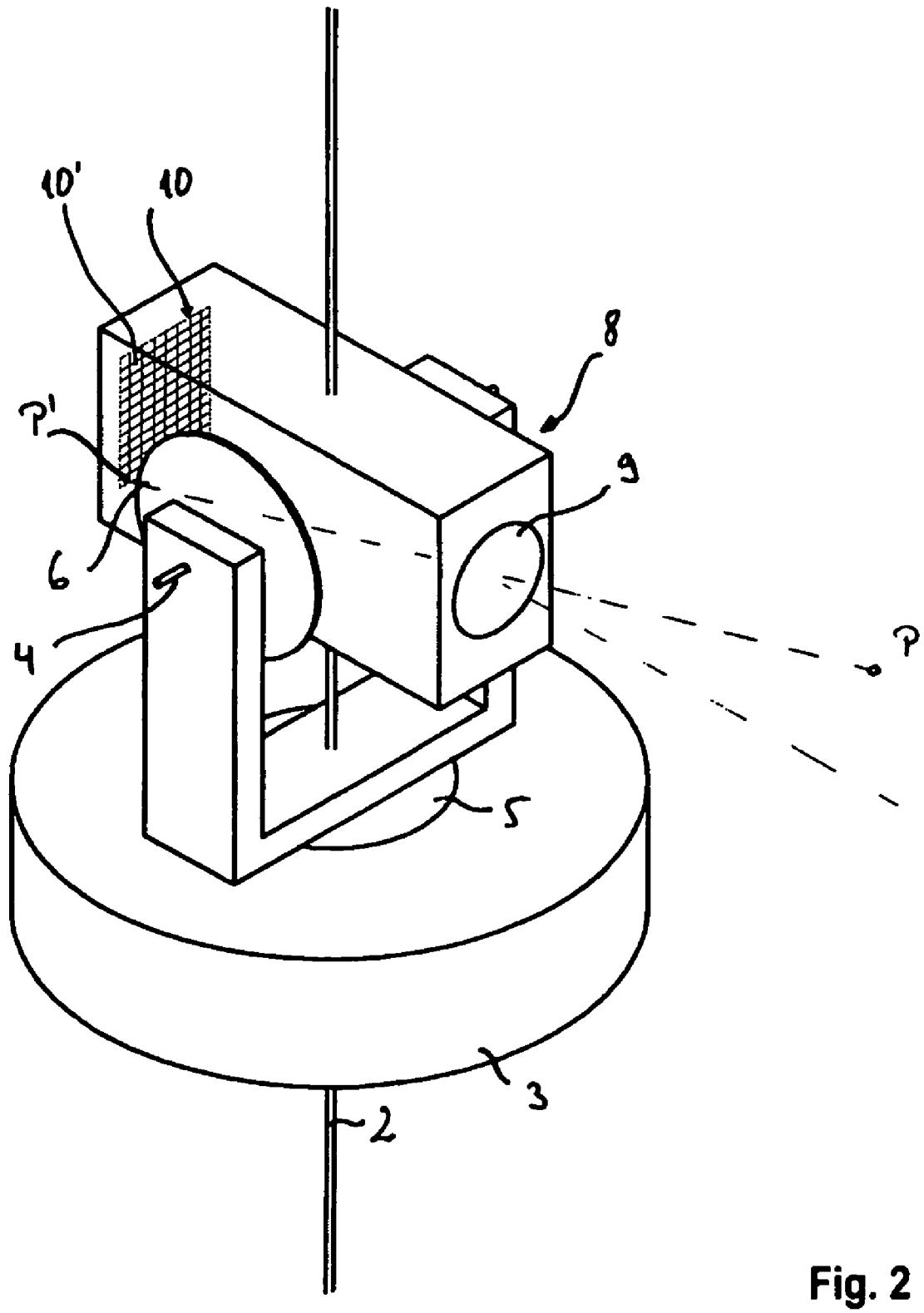
FIG. 2 shows a simplified perspective view of a video-tacheometer.

The video-tacheometer differs from a traditional tacheometer in that it comprises the camera which may for example replace the whole telescope or just the eyepiece of the telescope or may be provided in addition to the telescope. As schematically shown in FIG. 2, a point P to be measured is thus imaged onto a certain position on the image sensor 10 which comprises a rectangular array of detector elements 10' responsive to an image formed on the array to produce pixel data representing a pixel of the image. In order to determine from the position of the image of the point on the image sensor a direction from the surveying instrument to the point, the direction being defined by true vertical and horizontal angles, one needs to know the relationship between a position on the image sensor and a corresponding direction in space.

The optical axis of an ideal camera should be perpendicular to the plane of the image sensor and the optical system should be free of aberrations or distortions. Further, the optical axis should be parallel to a reference axis of the camera.

However, real cameras do not have these ideal properties. Thus, a calibration, i.e. a mapping between directions in space and corresponding positions of images of these directions on the image sensor, is performed.

The video-tacheometer 11 may be calibrated by means of a method for calibrating a surveying instrument using a data processing system 65 and an extensible collimator 66. Methods for calibration a surveying instrument are also disclosed in pending patent application PCT/EP2004/014365 the content of which is included herein by reference. Other methods for calibration may also be used.

Figure 7:
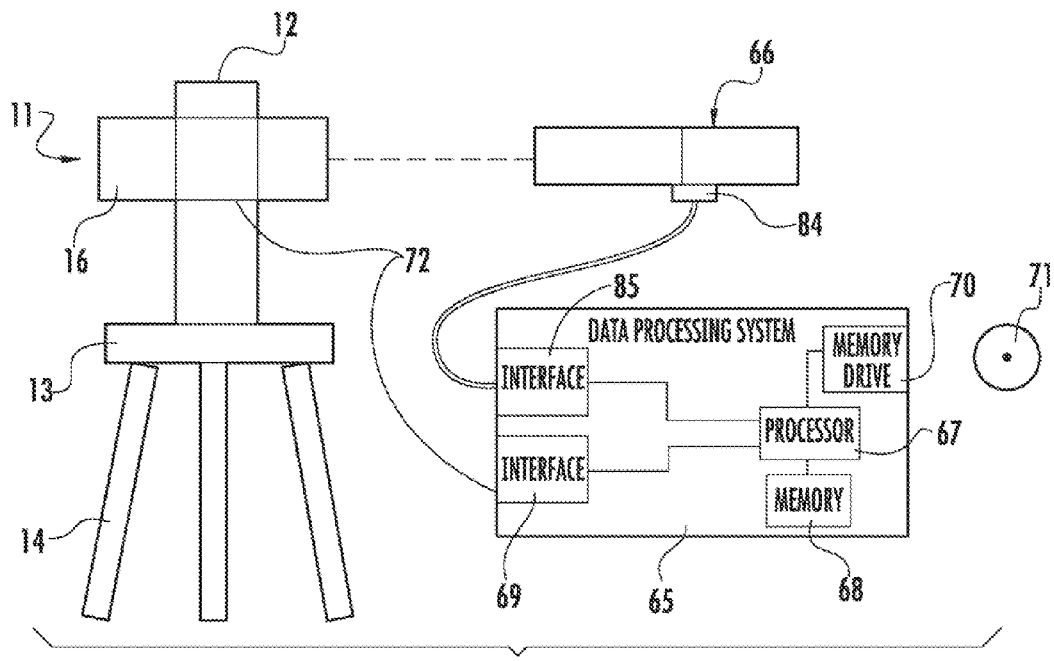
FIG. 7 schematically shows a setup for calibrating the video-tacheometer in FIGS. 3 to 5.

The calibration setup is schematically shown in FIG. 7.

The data processing system 65 comprises a processor 67, a memory 68 for storing a program to be executed by the processor 67 and permanent and temporary data and an interface 69 for reading data used for calibration and sending commands to the surveying instrument to be calibrated, i.e. the video-theodolite 11. In this example, interface 69 is an RS232 interface. The data processing system 65 further comprises a reader for a storage medium, in this case a CD-ROM drive 70, to read a computer program for calibration from a storage medium in the form of a CD 71 on which the computer program for calibration is stored. When the computer program is read from the CD 71 by means of the CD-ROM drive 70 and stored in the memory 68 it can be executed by the processor 67 to perform the steps of the calibration method to be executed by a data processing system.

The data processing system 65 is further connected to the interface 69 of the video-tacheometer 11 via a connection 72, in this example a suitable cable.

The data processing system 65 is connected to the collimator 66 via another output interface 85 for outputting commands.

Figure 8:
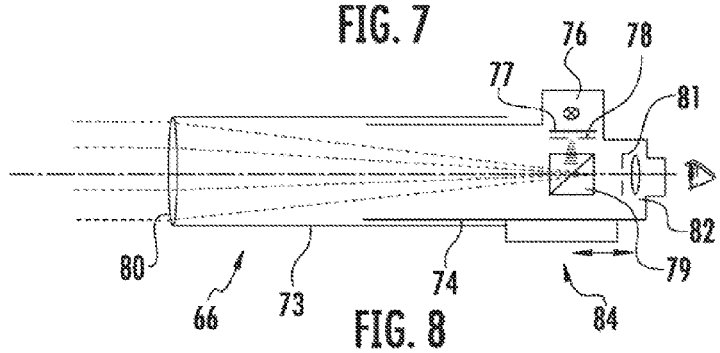
FIG. 8 shows a schematic sectional view of the collimator in FIG. 7.

The extensible collimator 66 (cp. FIG. 8) serves to generate virtual calibration points. The collimator 66 which is shown in more detail in FIG. 8 comprises guiding tube element 73 and guided tube element 74. The guided tube element 74 is slidable in the guiding tube element 73 while being guided by the tube element 73.

The guiding tube element 73 may be mounted in a fixed position relative to the ground by mounting means not shown in the Figures. The guided tube element 74 may be controllably slid relative to the guiding tube element 73 by an electric drive 84, e.g. a step motor, which is connected to the output interface 85 and controlled by the data processing system 65.

The position of the guided tube element 74 relative to the guiding tube element 73 is fully determined by the position of the electric drive 84 and thus does not need to be measured.

An illumination device 76 arranged in the guided tube element 74 illuminates a ground glass screen 77. The illuminated ground glass screen 77 illuminates a first cross-hair 78.

A beam splitter 79 arranged in the light path of the light emitted by illumination device 76 redirects light having passed the first cross hair 78 towards an objective 80 mounted in the guiding tube element 73. The objective 80 images the cross-hair 78 as real or virtual image to a distance determined by the distance between the objective 80 and the first cross-hair 78. For calibration purposes, the first cross-hair 78 is positioned between the objective 80 and its object side focal point. The cross-hair 78 thus represents a floating mark which can be used to generate virtual calibration points.

A second cross-hair 81 is arranged on the optical axis of the objective 80 past the beam splitter 79 and may be viewed by an eyepiece 82.

Further, the computer program stored in memory 68 contains program code, which, when run on the processor 67 lets the processor 67 issue control commands via the output interface 85 to the drive 84 to move the cross-hair 78 into predetermined positions and to calculate a corresponding virtual distance of the virtual calibration point as described below.

For calibration of the video-tacheometer 11 with the telecamera 19 being active, a model is used which includes model parameters to be adjusted for calibration. This model including the model parameters also forms the basis for the processing of the images captured by the image sensor as described further below. The model comprises two submodels.

The first submodel is a model for a transformation of coordinates in a coordinate system fixed to the base element 13 to a camera coordinate system fixed to the camera, that is telecamera 19, including as parameters the horizontal and vertical angles set at the instrument and parameters relating to axis errors as mentioned in the introduction, that is a tilting axis error and some form of collimation error and vertical index error.

The second submodel is a camera model which represents the imaging of an object point by the camera onto the image sensor of the camera. In this embodiment, a pinhole model is used.

In the model, essentially two coordinate systems are used. The first coordinate system, termed instrument coordinate system, is fixed with respect to the base element 13 (see FIG. 3). It is a Cartesian coordinate system with the origin at the intersection of the vertical axis 15 and the tilting axis 20 and with the X axis, the Y axis and the Z axis being orthogonal to each other. In the case that these axes do not intersect, the point of closest approach of these axes is used as the origin of the coordinate system. The X axis and Y axis are orthogonal to the vertical axis 15 and thus horizontal, if the vertical axis 15 is perpendicular to the ground. In this coordinate system a point P has Cartesian coordinates (X, Y, Z).

Second, a camera coordinate system is used, which is fixed with respect to the camera 19. It is defined by an x-axis, a y-axis and a z-axis, all three axes being orthogonal to each other. The position of a point P can be described by the coordinates (x, y, z) in the camera coordinate system.

In the following, coordinates in the instrument coordinate system are always denoted by capital letters whereas coordinates in the camera coordinate system are always denoted by small letters.

Figure 9:
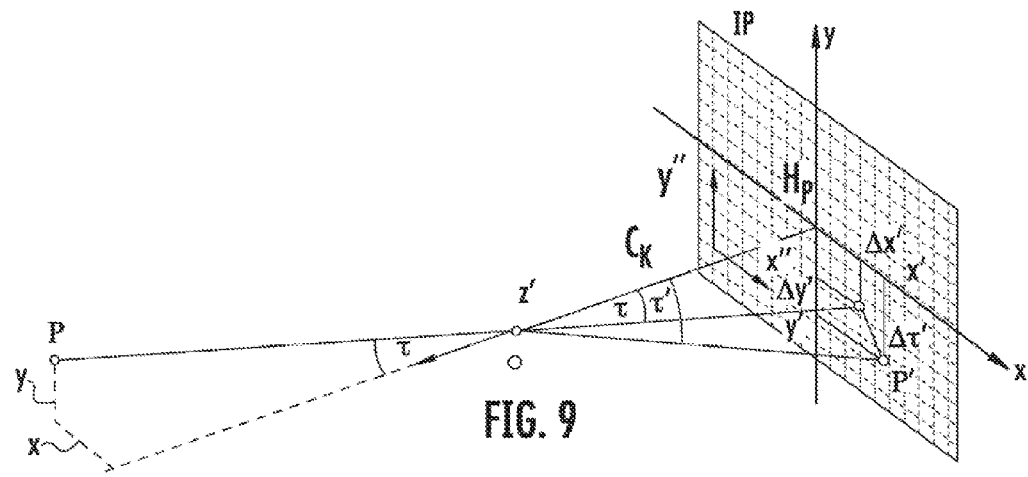
FIG. 9 shows a diagram illustrating a pinhole camera model.

First, the camera model is described in more detail with reference to FIG. 9.

The pinhole model used as a camera model assumes that a point P imaged by the camera onto the image sensor may be described by a projection of this point via a projection center O onto an image plane IP which is related to the image sensor 33 and may in particular be in the same plane.

Thus, the pinhole model is determined by the image plane IP and the position of the projection center O relative to the image plane. Since the position of the projection center relative to the projection center is determined by the imaging optics, i.e. camera optics, here the objective 31 and the focusing lens 32, the position represents optical properties of the camera and in particular imaging properties of the camera. Imaging of an object point P to the image plane is represented by a projection of the object point through the projection center O onto the image plane (see FIG. 9). The image plane is assumed to be essentially the plane of the image sensor so that the x axis and y axis of the camera coordinate system are parallel to the image plane. The z-axis of the rectangular camera coordinate system is the line through the projection center orthogonal to the image plane. Since the image is always in the image plane the position can be characterized solely by the x and y coordinates.

Let $(x,y,z)$ be the coordinates of the point P in the camera coordinate system and $(x_0, y_0, z_0)$ the projection center coordinates in the camera coordinate system. Thus, the piercing point $H_p$ of the line orthogonal to the image plane IP through the projection center O, i.e. the z-axis, has coordinates $x_0$ and $y_0$ in the x-y-plane. Further, (x', y', z') denote the coordinates of the image P' of the point P generated by the camera in the image plane. If the camera optics do not create distortions, one obtains the following relationship by simple geometric arguments (see FIG. 9):

$$\frac{x' - x_0}{c_k} = \frac{x - x_0}{z - z_0}$$

$$\frac{y' - y_0}{c_k} = \frac{y - y_0}{z - z_0}$$

Herein $c_k$ is the so-called camera constant representing the distance between the projection center and the image plane. Thus, $z'=c_k$ holds true.

The camera optics may create distortions in images, the distortions being caused to imperfections of the lenses used in the camera optics and/or their alignment. To account for first-order radial distortions another parameter v is introduced. A relative change in position of the image caused by a distortion is modeled as a constant v times the square of the radial distance of the image from the piercing point $H_P$. If the image of a point (x, y, z) falls at (x', y') in the image plane without the distortion the squared radial distance of the image point from the piercing point $H_P$ is $(x'-x_0)^2+(y'-y_0)^2$. Thus, distortion corrections $\Delta x'$ and $\Delta y'$ are added (see FIG. 9) which results in the equations:

$$x' = x_0 + c_k \frac{x - x_0}{z - z_0} + \Delta x'$$

$$y' = y_0 + c_k \frac{y - y_0}{z - z_0} + \Delta y'$$

with $$\Delta x' = v((x'-x_0)^2+(y'-y_0)^2)(x'-x_0)$$

$$\Delta y' = v((x'-x_0)^2+(y'-y_0)^2)(y'-y_0)$$

and v being a camera model parameter representing the above-mentioned first-order radial distortions of the optics of the camera.

These equations are valid only in the camera coordinate system. If the coordinates of the object point shall be expressed in the instrument coordinate system, a transformation between these coordinate systems is performed. This is the submodel for transformation of coordinates.

Generally, the transformation can be expressed by a sequence of three rotations about the coordinate system axis and a translation vector in space. Thus coordinates $p'=(x, y, z)$ of a point P in the camera coordinate system are transformed into coordinates $P'=(X, Y, Z)$ in the instrument coordinate system by the equation:

$$p = T + R^{-1} P$$

wherein T is a translation vector and $R^{-1}$ is the inverse of a product R of rotation matrices. Since during calibration the position of the projection center and the position and orientation of the image plane are adjusted the origin of the camera coordinate system can be chosen to be the projection center, resulting in the equation:

$$p = R^{-1}(P - O)$$

Inserting this relationship into the equations for x' and y' yields the so called collinearity equations:

$$x' = x'_0 - c_K \frac{r_{11}(X - X_0) + r_{21}(Y - Y_0) + r_{31}(Z - Z_0)}{r_{13}(X - X_0) + r_{23}(Y - Y_0) + r_{33}(Z - Z_0)} + \Delta x'$$

$$y' = y'_0 - c_K \frac{r_{12}(X - X_0) + r_{22}(Y - Y_0) + r_{32}(Z - Z_0)}{r_{13}(X - X_0) + r_{23}(Y - Y_0) + r_{33}(Z - Z_0)} + \Delta y'$$

with $$\Delta x' = v((r_{11}(X-X_0)+r_{21}(Y-Y_0)+r_{31}(Z-Z_0))^2+(r_{12}(X-X_0)+r_{22}(Y-Y_0)+r_{32}(Z-Z_0))^2)(r_{11}(X-X_0)+r_{21}(Y-Y_0)+r_{31}(Z-Z_0))$$

$$\Delta y' = v((r_{11}(X-X_0)+r_{21}(Y-Y_0)+r_{31}(Z-Z_0))^2+(r_{12}(X-X_0)+r_{22}(Y-Y_0)+r_{32}(Z-Z_0))^2)(r_{12}(X-X_0)+r_{22}(Y-Y_0)+r_{32}(Z-Z_0))$$

wherein $r_{ij}$, i,j=1, . . . , 3 are the matrix elements of R and the coordinates of the projection center O in the instrument coordinate system are $(X_0, Y_0, Z_0)$.

Since the origin of the camera coordinate system is chosen to be the projection center and the z axis is assumed to be orthogonal to the image plane, an image position (x", y") read on the image sensor in a image sensor coordinate system having a x" axis and a y" axis being directed along rows and columns of the matrix of the CCD sensor corresponds to an image position in the camera coordinate system given by $x'=x''-x_s''$ and $y'=y''-y_s''$, with $(x_s'', y_s'')$ being the coordinates of the position of the intersection of the z axis with the image plane as measured by the image sensor, i.e. the position of the corresponding pixel on the image sensor. Thus, in the above mentioned equations x' and y' are replaced by $x''-x_s$ and $y''-y_s$.

In summary, the parameters of the camera model are the coordinates $x_s$, $y_s$ of the piercing point, the camera constant $c_k$ and the parameter v representing the distortion properties of the camera optics. Due to the definition of the camera coordinate system $x_0=y_0=0$ holds true.

The transformation between the camera coordinate system and the instrument coordinate system can be derived in various ways, for example by performing successive rotations of the camera coordinate system starting from an orientation in which it coincides with the instrument coordinate system as set out below.

Figure 10:
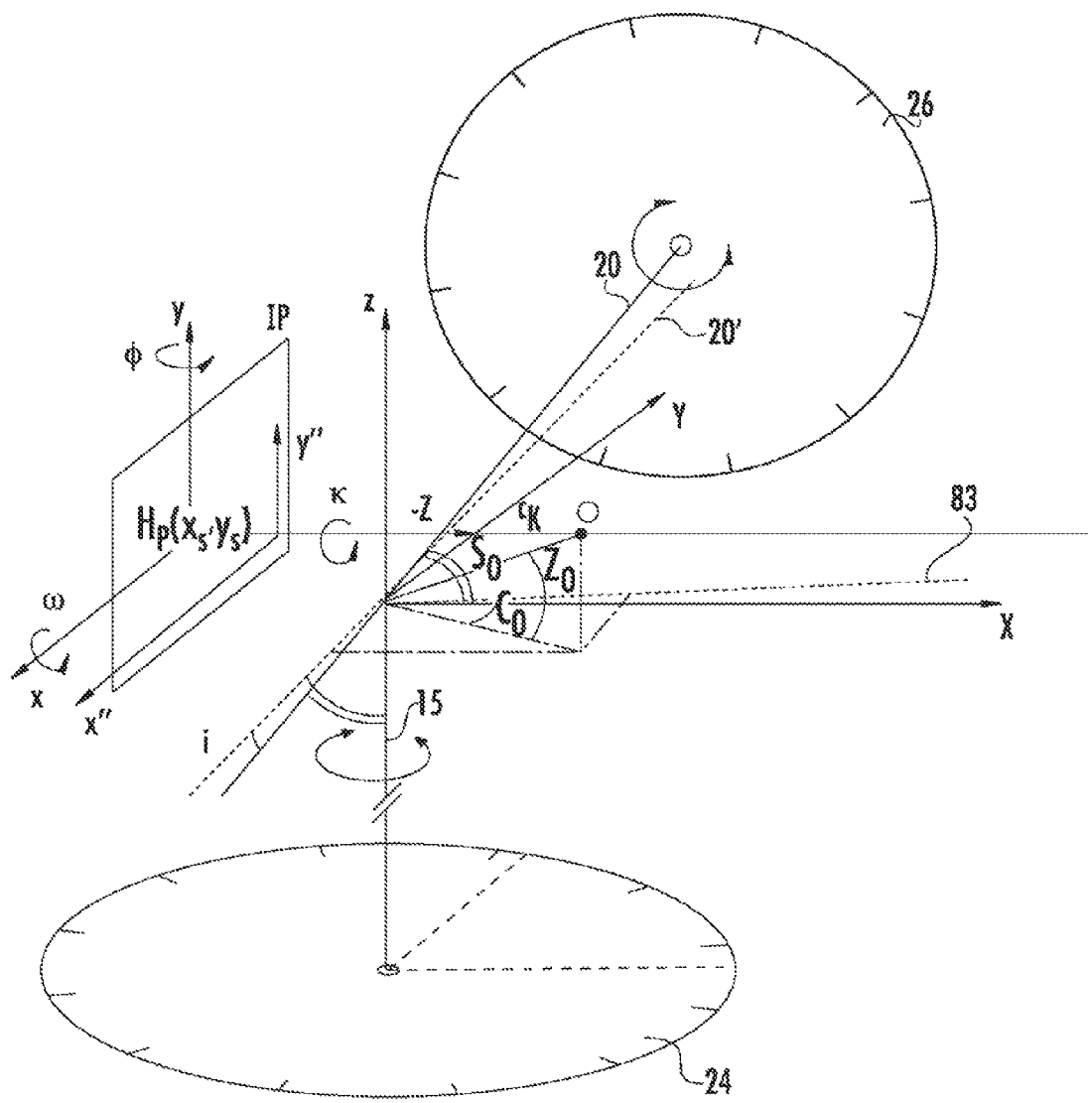
FIG. 10 shows a perspective diagram illustrating coordinate systems and the arrangement of axes and an image plane used in a model used for calibration of the instrument of FIG. 3.

FIG. 10 shows the camera coordinate system with coordinate axis x, y and z, the image coordinate system with coordinates x", y" and an origin with the coordinates $(x_s'', y_s'', c_k)$, the x"- and the y"-axis being parallel to the x- and y-axis, and their relation to the instrument coordinate system (X,Y,Z). In FIG. 10, the origin of the instrument coordinate system lies at the intersection of the theoretical tilting, vertical and sighting axes (i.e. in the instrument center or tacheometer center, respectively). For these theoretical axes the above-mentioned conditions are satisfied: The theoretical vertical axis 15 is assumed to be perpendicular to the ground, the angle between the theoretical tilting axis 20' and the theoretical vertical axis 15 and the angle between the theoretical sighting axis 83 and the theoretical tilting axis 20' are assumed to be right angles. All three axes intersect in one point which is the origin of the instrument coordinate system. It is further assumed that the actual vertical axis is the theoretical vertical axis. The Z axis of the instrument coordinate system coincides with the vertical axis of the instrument and the Y axis coincides with the zero direction marked on the horizontal circle 24.

The origin of the camera coordinate system is the projection center O. However, in FIG. 10, for the sake of a better overview, the origin is shown shifted to the image plane. The principal point $H_P$, i.e. the piercing point of the line through the projection center and orthogonal to the image plane IP, has the coordinates $x_s''$ and $y_s''$ in the image coordinate system in the image plane.

Figure 11:
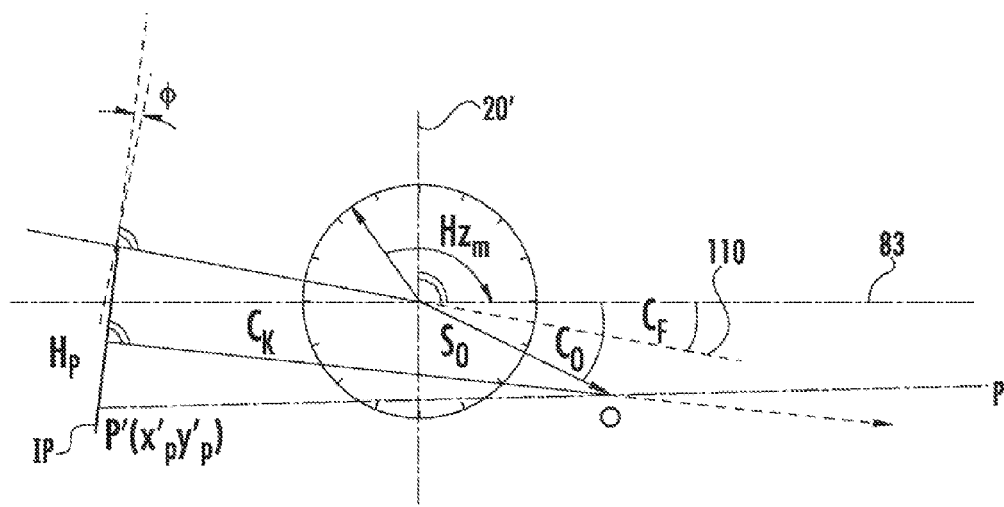
FIG. 11 shows a top view of the arrangement in FIG. 10.
Figure 12:
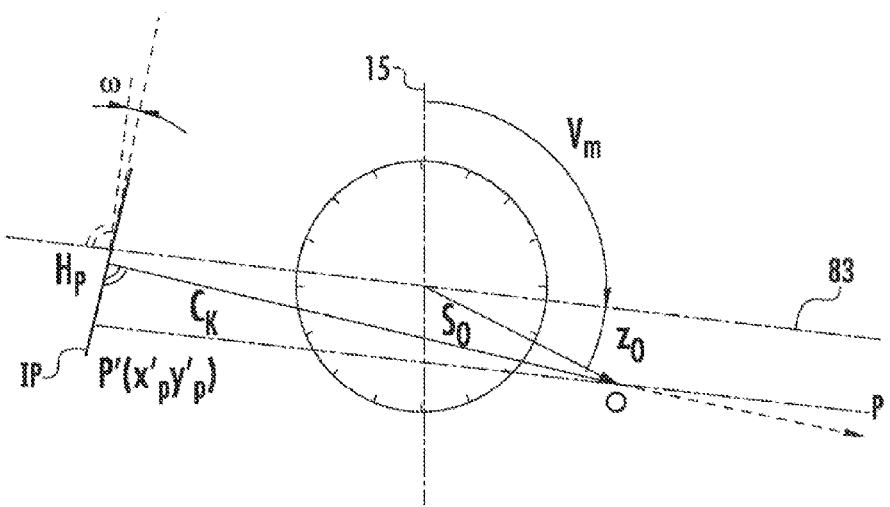
FIG. 12 shows a side view of the arrangement in FIG. 11.

As shown in FIGS. 10 to 12, the actual tilting axis 20 may deviate from the theoretical tilting axis 20' by an angle i, which is the deviation of the angle between the actual tilting axis 20 and the vertical axis 15 from a right angle. Thus, the angle i represents a tilting axis error.

Furthermore, the theoretical sighting axis 83 does not need to run through the projection center O. This deviation may be expressed by two angles $c_O$ and $z_O$. The angle $c_O$ is defined in a plane given by the theoretical tilting axis 20' and the theoretical sighting axis 83 as the angle between the theoretical tilting axis 20' and the line through the projection center O and the intersection point of the theoretical sighting axis 83 and the theoretical tilting axis 20'. The angle $z_O$ is defined in a plane given by the vertical axis 15 and the theoretical sighting axis 83 as the angle between the theoretical sighting axis 83 and the line through the projection center O and the intersection point of the theoretical sighting axis 83 and the theoretical tilting axis 20'.

A deviation of an telescope axis 110, the telescope axis 110 being defined by the lens mounting of the camera lenses, from the theoretical sighting axis 83 is defined by an angle CF between the telescope axis 110 and the theoretical sighting axis 83.

The camera coordinate system may also be rotated about the axis of the instrument coordinate system by angles $\omega$, $\phi$, $\kappa$ which are assumed to be independent of any errors and directions of the video-tacheometer 11.

The above mentioned deviations cause deviations of the actual or true horizontal and vertical angles from the respective angles as read from the horizontal and vertical circle 24 and 26, respectively.

The actual or effective angle of tilting of the camera coordinate system is given by $$V_0 = V_m + z_0$$

as can be determined from FIGS. 10 and 12. Therein $V_m$ denotes the vertical angle as read from the vertical circle 26.

The angles $c_O$ and $c_F$ have the same influence on the spherical coordinates of the projection center and actual horizontal angle, respectively, as a collimation error:

$$\frac{c_0}{\sin(V_0)} \text{ and } \frac{c_F}{\sin(V_0)}.$$

The angle i causes a deviation in the horizontal angle of $$i \cot(V_0).$$

The effective horizontal angle $Hz_{eff}$ by which the camera coordinate system is rotated about the vertical axis thus reads:

$$Hz_{eff} = Hz_m + \frac{c_F}{\sin(V_0)} + i \cdot \cot(V_0)$$

wherein $Hz_m$ denotes the horizontal angles as read from the horizontal circle 24.

A detailed derivation of these formulas can be found in Deumlich, F., Staiger, R.: "Instrumentenkunde der Vermessungstechnik", Heidelberg, Germany, 9. edition, pages 206 to 208.

The rotation matrix $R^{-1}$ can be obtained by considering the following sequence of rotations of the camera coordinate system starting in an orientation in which it coincides with the instrument coordinate system.

First, the camera coordinate system is rotated about the vertical axis by the effective horizontal angle $Hz_{eff}$. The corresponding coordinates in the rotated coordinate system may be obtained by the rotation matrix $$R_\kappa^{-1}(Hz_{eff}) = \begin{bmatrix} \cos(-Hz_{eff}) & \sin(-Hz_{eff}) & 0 \\ -\sin(-Hz_{eff}) & \cos(-Hz_{eff}) & 0 \\ 0 & 0 & 1 \end{bmatrix}$$

The tilting axis error is accounted for by a rotation about the y-axis of the transformed, i.e. rotated, camera coordinate system by the angle i.

The corresponding coordinate transformation is given by the rotation matrix $$R_\phi^{-1}(i) = \begin{bmatrix} \cos(i) & 0 & \sin(i) \\ 0 & 1 & 0 \\ -\sin(i) & 0 & \cos(i) \end{bmatrix}$$

Now, the camera coordinate system rotated twice is further rotated about the x-axis of the twice rotated camera coordinate system by the effective vertical angle $V_0$. Taking into account that in geodesy the vertical angle is measured from the zenith the corresponding rotation matrix for the coordinate transformation reads:

$$R_\omega^{-1}(V_0) = \begin{bmatrix} 1 & 0 & 0 \\ 0 & \cos(200gon - V_0) & -\sin(200gon - V_0) \\ 0 & \sin(200gon - V_0) & \cos(200gon - V_0) \end{bmatrix}$$

In a fourth step, the camera coordinate system as rotated so far is rotated further by the angle $c_F$ about the current y axis. The corresponding coordinate transformation can be written in terms of the rotation matrix $$R_\phi^{-1}(c_F) = \begin{bmatrix} \cos(c_F) & 0 & \sin(c_F) \\ 0 & 1 & 0 \\ -\sin(c_F) & 0 & \cos(c_F) \end{bmatrix}$$

Finally, the camera coordinate system obtain by the last rotation is rotated about the x axis by an angle $\omega$, about the y axis by an angle $\phi$ and about the z axis by an angle $\kappa$. The corresponding rotation matrix reads $$(R_\omega(\omega) \cdot R_\phi(\phi) \cdot R_\kappa(\kappa))^{-1} = \begin{bmatrix} \cos(\phi)\cos(\kappa) & -\cos(\phi)\sin(\kappa) & \sin(\phi) \\ \cos(\omega)\sin(\kappa) + \sin(\omega)\sin(\phi)\cos(\kappa) & \cos(\omega)\cos(\kappa) - \sin(\omega)\sin(\phi)\sin(\kappa) & -\sin(\omega)\cos(\phi) \\ \sin(\omega)\sin(\kappa) - \cos(\omega)\sin(\phi)\cos(\kappa) & \sin(\omega)\cos(\kappa) + \cos(\omega)\sin(\phi)\sin(\kappa) & \cos(\omega)\cos(\phi) \end{bmatrix}.$$

The complete rotation matrix having matrix elements $r_{ij}$, i,j=1, ..., 3 thus reads $$R = R_\kappa(Hz_K) \cdot R_\phi(k_0) \cdot R_\omega(V_0) \cdot R_\phi(c_F) \cdot R_\omega(\omega) \cdot R_\phi(\phi) \cdot R_\kappa(\kappa).$$

From FIG. 10, the coordinates of the projection center O in the instrument coordinate system can be written as $$O = \begin{bmatrix} X_0 \\ Y_0 \\ Z_0 \end{bmatrix} = \begin{bmatrix} S_0 \cdot \sin(V_m + z_0) \cdot \sin\left(Hz_m + \frac{c_0}{\sin(V_m + z_0)} + i \cdot \cot(V_m + z_0)\right) \\ S_0 \cdot \sin(V_m + z_0) \cdot \cos\left(Hz_m + \frac{c_0}{\sin(V_m + z_0)} + i \cdot \cot(V_m + z_0)\right) \\ S_0 \cdot \cos(V_m + z_0) \end{bmatrix}$$

wherein $S_0$ denotes the distance of the projection center from the origin of the instrument coordinate system.

Thus, the complete transformation is given by the rotation matrix R and the position of the projection center. The transformation parameters used in the transformation, i.e. the transformation parameters parameterizing the transformation, are $i$, $c_0$, $c_F$, $z_0$, $S_0$, $\omega$, $\phi$ and $\kappa$. The transformation also depends on the horizontal and vertical angles $Hz_m$ and $V_m$ as read on the horizontal circle.

Using the collinearity equations and the coordinate transformation it is possible to calculate the positions x" and y" of an image of an object point which has spherical coordinates Hz, V and S and thus Cartesian coordinates (S cos(Hz) sin(V), S sin(Hz) sin(V), S cos(V)) in the instrument coordinate system and which is imaged at horizontal and vertical angles $Hz_m$ and $V_m$ using the camera model parameters and the transformation parameters:

$$x'' = x'_s - c_\kappa \frac{r_{11}(X - X_0) + r_{21}(Y - Y_0) + r_{31}(Z - Z_0)}{r_{13}(X - X_0) + r_{23}(Y - Y_0) + r_{33}(Z - Z_0)} + \Delta x' \quad (1)$$

$$y'' = y'_s - c_\kappa \frac{r_{12}(X - X_0) + r_{22}(Y - Y_0) + r_{32}(Z - Z_0)}{r_{13}(X - X_0) + r_{23}(Y - Y_0) + r_{33}(Z - Z_0)} + \Delta y'$$

with $$\Delta x' = v((r_{11}(X-X_0)+r_{21}(Y-Y_0)+r_{31}(Z-Z_0))^2 + (r_{12}(X-X_0)+r_{22}(Y-Y_0)+r_{32}(Z-Z_0))^2)$$

$$(r_{11}(X-X_0)+r_{21}(Y-Y_0)+r_{31}(Z-Z_0))$$

$$\Delta y' = v((r_{11}(X-X_0)+r_{21}(Y-Y_0)+r_{31}(Z-Z_0))^2 + (r_{12}(X-X_0)+r_{22}(Y-Y_0)+r_{32}(Z-Z_0))^2)$$

$$(r_{12}(X-X_0)+r_{22}(Y-Y_0)+r_{32}(Z-Z_0))$$

The above equations can be written for brevity, as $$x'' = U_x(i, c_0, c_F, z_0, \phi, \kappa; S_0, c_\kappa, x_S, y_S, v; S, V_m, Hz_m) \text{ and}$$

$$y'' = U_y(i, c_0, c_F, z_0, \phi, \kappa; S_0, c_\kappa, x_S, y_S, v; S, V_m, Hz_m).$$

Actually, each of the detector elements of the image sensor 33 has a fixed location in the array, and thus corresponding fixed coordinates in the image sensor coordinate system. Thus, the measured coordinates can only have discrete values. Each of the detector elements is responsive to an image projected on the array by the imaging optics to generate data of a pixel representing a point of the image, in the example, an array of detector elements having RGB channels is used, so that the pixel data comprise corresponding intensity data for each channel.

Figure 13:
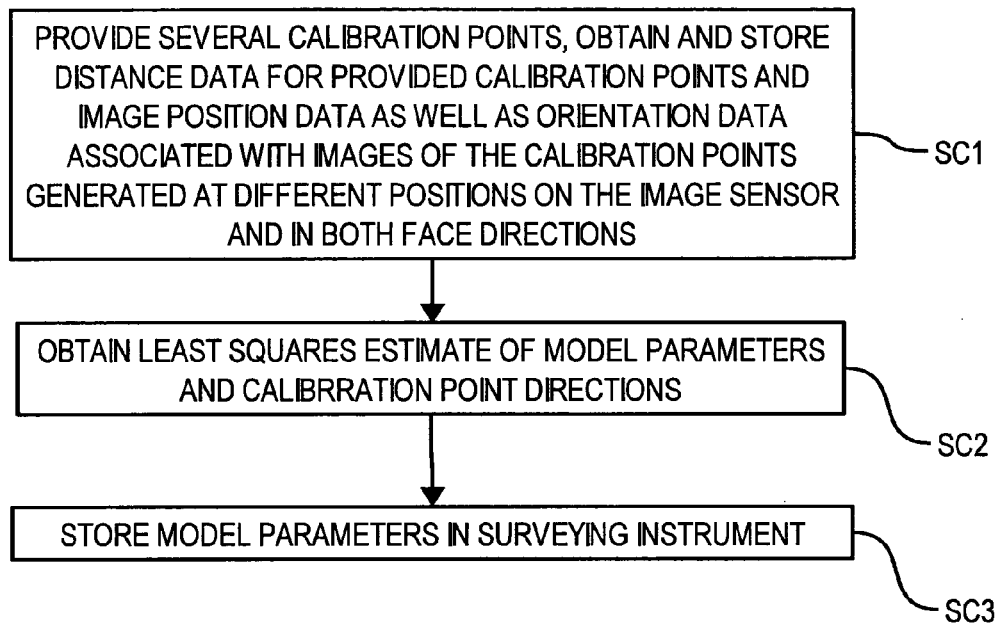
FIG. 13 shows an overview of the method for calibration in form of a flow-diagram.

The calibration method is described with reference to FIG. 13.

First, a user brings the video-tacheometer 11 in predetermined, e.g. marked, position relative to the collimator 66, in which a virtual image of cross-hair 78 can be imaged to the image sensor 33. The position is determined in dependence on the properties of the collimator and of the camera and chosen such that virtual calibration points can be provided by moving the cross-hair 78. Further, the video-tacheometer 11 is oriented with its vertical axis perpendicular to the earth, i.e. in a direction parallel to the gravity of the earth.

The method may be subdivided into three major sections S1 to S4. The data processing system 65, i.e. processor 67 automatically carries out all steps of sections SC1 to SC3 issuing commands to the collimator electric drive 84 and the surveying instrument 11, if necessary, receiving image position data and corresponding orientation data from the surveying instrument 11, and performing the calculations described below. The model which is used for calibration is provided in the form of program code of the computer program executed in the data processing system 65.

In the first section SC1, measured data for calibration are obtained by means of the collimator 66, the data processing system 65 and the video-tacheometer 11.

By means of the collimator 66 several virtual calibration points $P_i$, i=1, ..., N, N being a positive integer number, are provided. Distance data for these virtual calibration points are given by the position of the electric drive or the corresponding data in memory 68, i.e. the distance between the cross-hair 78 and the objective 80 along the light path, and the known distance between the objective lens 80 and the video-tacheometer 11. Further, for each calibration point images of the calibration point are generated in different positions and the image sensor and corresponding image position data representing the position of the images on the image sensor as well as orientation data representing corresponding horizontal and vertical angles are obtained in both faces of the video-tacheometer 11.

In a second section SC2, values for the model parameters and data representing directions associated with the calibration points in the instrument coordinate system are estimated using a least squares estimate method. All steps in this section are also performed by means of the computer program in the data processing system 65.

In a third section SC3, the obtained model parameters are stored in the surveying instrument, that is the video-tacheometer 11, as calibration data to be used therein to calculate for a given position on the image sensor a corresponding direction in the instrument coordinate system and if the distance of a point imaged onto the image sensor 33 from the video-tacheometer is known, also corresponding Cartesian coordinates.

On the data processing system 65 the computer program for calibration is started and first requires to input the positive integer number N via a display and a keyboard not shown in the Figures. After inputting the integer N the program requests input of the distance data associated with the first calibration point. After input of these data, the processor 67 stores the data in the memory 68 of the data processing system.

In section SC1, for each measured point, i.e. N times, the following steps are executed.

First, a new calibration point is provided by generating a virtual image of the cross-hair 78 in the collimator 66 by changing its position with respect to the objective 80. For that purpose, the processor controls the electric drive 84 to move the cross-hair 78 between the focal point of the objective 80 and the objective 80 by the distance $\Delta f$.

Then, the distance D between the surveying instrument, that is the video-tacheometer 11, and the virtual calibration point is obtained. FIG. 14 illustrates the calculation. In this Figure the first cross-hair 78 is shown on the optical axis of the objective 80 for simplicity. For calculating the distance D, the distance s of the virtual image of the cross-hair 78 from the objective 80, more precisely the principal plane H of the objective 80 on the video-tacheometer side, is calculated from the focal length f of the objective 80 and the distance Δf of the cross-hair 78 from the focal point of the objective 80 by means of the formula:

$$s = f \frac{(f - \Delta f)}{-\Delta f}$$

The virtual image distance s is then added to the distance $S_{Th/H}$ between the objective 80, that is its above-mentioned principal plane H and the vertical axis of the surveying instrument, that is the video-tacheometer 11.

Then, for the given calibration point different images are generated on the image sensor 33 and corresponding image position data and orientation data are obtained and stored in the data processing system 65.

The generation of images of the calibration point as well as the generation of the data required for calibration are as follows.

A first generation step is performed for the first calibration point. For the following calibration points, this generation step needs to be performed only when necessary at least in the case that a collimator is used to provide the calibration points and that the orientation of the collimator relative to the surveying instrument, that is the video-tacheometer 11, remains unchanged except for re-orientations of the telescope unit 16, that is the camera 19. In this generation step the camera 19 is directed to the calibration point generated. In this embodiment, it is sufficient that an image of the calibration point appears on the image sensor 33.

Further, the camera is brought into a first face, which means, that the vertical angle of the camera 19 is between 0 gon and 200 gon, 0 gon being the zenith as determined by the vertical circle 26.

Next, in a second generation step, the camera 19 is rotated and tilted to move the image of the calibration point on the image sensor 33 to a predetermined start position on the image sensor 33. Preferably the starting position is situated close to one of the corners of the image sensor 33. For this purpose, the computer program stored in the data processing system 65 comprises a program module for object recognition in images such as images captured by the image sensor 33. In the memory 68 of the data processing system 65 a template is stored which represents the cross-hair 78. By use of known object recognition techniques, for example a template matching algorithm, the position of the image of the calibration point in the captured image, that is on the image sensor 33, is obtained. The computer program now calculates whether the camera 19 should be rotated by a given increment about the vertical axis 15 and/or tilted about the tilting axis 20 in order to bring the image of the calibration point closer to the start position. It then issues a corresponding command to the surveying instrument, in which the device-control computer 51 receives the corresponding commands and moves the camera 19 by the respective angles by means of the drives 22 and/or 23. Then a new image is captured and the process is repeated, until the image of the calibration point reaches the start position. Thereby, the size of the angle increments can be reduced as the image of calibration point approaches the start position.

In a third generation step, the program calculates random positions in cells of a matrix covering the image sensor as target positions of images of the calibration point. For that purpose, the image sensor is divided into an L×M matrix with predetermined positive integer numbers L and M and the geometric centers of the cells are calculated. In FIG. 15, cells 88 are arranged in a rectangular array covering the image sensor 33. The geometric centers of the cells are marked by crosses. For each of the geometric centers a for each direction in the matrix a random number is determined using a pseudo random number generator, the magnitude of the random number being less than half the size of the cell in the corresponding direction and then added to the coordinate of the geometric center in the respective direction. The resulting random positions in each of the cells are shown in FIG. 15 by open circles. This use of random numbers reduces the effects of defective photo detecting elements in the image sensor drastically, because it can be avoided that an image position is always on a defective pixel. These positions are stored in the memory 68 of the data processing system 65.

In a forth generation step, the telescope unit 16 and thus the camera 19 is rotated and tilted to move the image of the calibration point on the image sensor 33 to the target position. For that purpose the same algorithm may be used as in the second generation step. Once the image of the calibration point has reached the target position, the image position data, that is the coordinates x" and y" of the image in the image plane, are stored and the orientation data, that is the horizontal angle $Hz_m$ and the vertical angle $V_m$ as determined by the horizontal and vertical circle, respectively, are read from the surveying instrument in response to corresponding commands sent from the data processing system 65 to the surveying instrument.

After the image position data and orientation data are stored for each target position, in a fifth generation step, the camera 19 is directed to the calibration point in the second face, that is the vertical angle as determined by means of the vertical circle is between 200 and 400 gon. In order to ensure that an image of the calibration point will appear on the image sensor 33 also in the second face, the camera is preferably rotated by 200 gon about the vertical axis 15 and then tilted by 400 gon minus the vertical angle obtained for the last target position in the fourth generation step.

The following two generation steps correspond to the third and forth generation steps, the only difference being that the camera 19 is in the second face.

The steps of section SC2 are executed by means of the computer program. Once for each calibration point $P_i$, i= 1, ..., N Q images j, j=1, ..., Q, Q being an positive integer number, are generated and corresponding image position and orientation data are obtained by reading these data, the model parameters are adjusted so that the model predicting the position of images of the calibration points as a function of the model parameters, directions of the calibration points in the instrument coordinate system and the respective orientation data fits the measured image position data. The estimation method, a least squares estimate, which is equivalent to a classic adjustment method by least squares, is based on the error function E(i, $c_0$, $c_F$, $z_0$, ω, φ, κ; $S_0$, $c_k$, $x_s$, $y_s$, v; {$S_i$, {x"$_{lj}$, y"$_{lj}$, $V_{mlj}$, $Hz_{mlj}$}}) given by the following sum over all calibration points i and all images j of the calibration points $$E = \sum_{i=1}^{N}\sum_{j=1}^{Q}\left[\left(\begin{matrix}x''_{ij} - U_x(i, c_0, c_F, z_0, \omega, \phi, \kappa; \\ S_0, c_K, x_S, y_S, v; S_l, V_{mlj}, Hz_{mlj})\end{matrix}\right)^2 + \right.$$

$$\left.\left(y''_{ij} - U_y\left(\begin{matrix}i, c_0, c_F, z_0, \omega, \phi, \kappa; \\ S_0, c_K, x_S, y_S, v; S_l, V_{mlj}, Hz_{mlj}\end{matrix}\right)\right)^2\right].$$

Herein $S_l$, $\{x''_{ij}, y''_{ij}, V_{mlj}, Hz_{mlj}\}$ denote the distance for the calibration point $I$ and the data sets $j=1, \ldots, Q$ for all images of the calibration point, the data set for image $j$ comprising the image position data $x''_{ij}, y''_{ij}$ and the vertical and horizontal angles $V_{mlj}, Hz_{mlj}$ set.

The error function E is minimized using a suitable minimization procedure, for example a Gauss-Newton algorithm as described in Benning, Wilhelm: "Statistik in Geodäsie, Geoinformation und Bauwesen", Heidelberg, Germany, 2002, ISBN 3-87907-383-X pp. 140.

In section SC3, the model data obtained by the computer program are stored as calibration data in the memory of the control panel, i.e. the processing unit. For that purpose the data processing system 65 sends these data via the interface 69 and the connection 72 to the surveying instrument, i.e. the video-tacheometer 11, which stores these data in the non-volatile memory section of memory 112 of the computer 54.

The performance of the method may be exemplified by the following example. In this example a variant of the method described above is used in which, however, for each angle combination more than one measurement is made. For calibrating a camera having a focal length of 300 mm and a fixed focus at 100 m, fitted to an instrument having an angle measuring accuracy of 1", one can use three calibration points at distances of, e.g., 20 m, 80 m and 500 m, and a total of 48 angle combinations per telescope position, arranged in a grid of 8×6 positions, for example. If 30 measurements per angle combination in which no random deviation is greater than 0.05 pixels, are made and the corresponding data used, the instrument can be calibrated to an accuracy of direction measurement of approximately 1" in the vertical and horizontal directions. Thus, the method is also suited for calibration of cameras having a relatively large focal length.

Using the model, from image position data of an image of an object point on the image sensor, a direction of the object point with respect to the instrument coordinate system can be calculated (see FIG. 16). Using the equation (2)

$$P'_T = \vec{O} + R \cdot \begin{bmatrix} x'_P - \Delta x' - x''_S \\ y'_P - \Delta y' - y''_s \\ -c_K \end{bmatrix}$$

in which $\vec{O}$ denotes a vector from the origin of the instrument coordinate system to the projection center O, one can transform measured image position data $x'_P, y'_P$ corresponding to an imaged object point P into the coordinate system of the instrument, i.e. video-tacheometer 11. $P_T'$ is a vector in the instrument coordinate system representing a direction corresponding to the measured image positions. The projection center O and the point $P_T'$ are both known in terms of coordinates with reference to the surveying instrument, and define an imaging ray a on which an object point being imaged to the position on the image sensor represented by $x'_P, y'_P$ is located. As the ray does not need to intersect the video-tacheometer center, i.e. the origin of the instrument coordinate system, a distance (approximate distance) of the object point P from the video-tacheometer center must be given for the correct calculation of a direction with respect to the video-tacheometer center. This distance is used as a radius of a sphere extending around the video-tacheometer center, i.e. the origin of the instrument coordinate system, and intersected by the imaging ray a. In this way, two coordinate triplets are obtained, which can be used for direction computation, depending on the position of the telescope unit 16 that has the function of a camera. The closer the video-tacheometer center is to the imaging ray, the less dependent this method becomes from the distance given.

Memory 112 further stores instructions for processor 113 to calculate positions or direction on the basis of formulas (1) and the procedure mentioned in the paragraph above.

Figure 17:
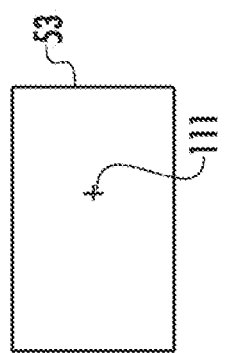
FIG. 17 shows a schematic view of a display unit of the video-tacheometer in FIG. 3 and a mark indicating a sighting axis displayed on the display unit.

In the computer 54 of the video-theodolite 11, i.e. the memory 112 program code is stored to display a sighting axis mark 111, e.g. cross-hairs, indicating a sighting axis on the display 53 (see FIG. 17) which coincides with the direction in which the distance measuring device 30 measures distances. The corresponding position on the display 53 can be calculated either from the calibration parameters, which are stored in the instrument, or can be calculated once and then be stored permanently in the instrument, e.g. a non-volatile memory of computer 54.

The finder camera 18 may also be calibrated using the method, data-processing system, collimator and computer programs described above. As the position of the projection center may be seen as just a set of parameters in the model, the fact that the light path is not straight does not require the modification of the calibration method.

In another embodiment a more detailed model for the distortions of the camera is used in which also terms are used which are of higher order and/or not radial-symmetric. Luhmann, Thomas: "Nahbereichsphotogrammetrie: Grundlagen, Methoden und Anwendungen", Heidelberg, Germany, 2000, ISBN 3-87907-321-X, pp. 119 to 122 disclose corresponding amendments to the model described above.

The calibrated video-tacheometer 11 can be used for providing surveying information according to a method according to a first preferred embodiment of the invention.

For that purpose the memory 112 stores instructions for performing the method, when the instructions are executed by the processor 113.

First, a user 134 sets up the video-tacheometer 11 at a desired position, e.g. an arbitrary position or a position defined by predetermined coordinates and brings it with its vertical axis into a perpendicular orientation, in which the vertical axis is parallel to the gravity of the earth. For that task, the user may use the optical plummet 28.

Figure 18:
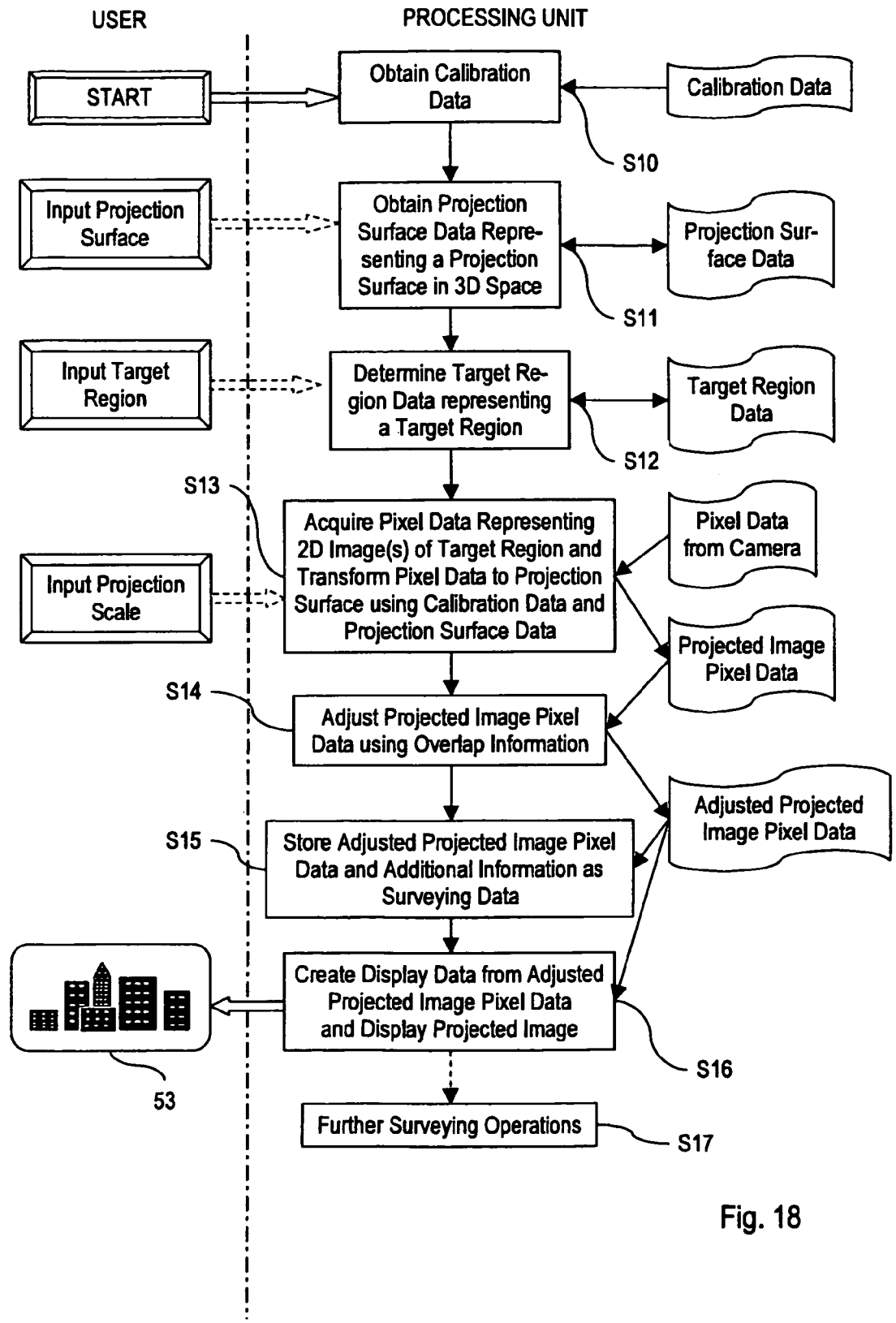
FIG. 18 shows a flow diagram illustrating a method for providing surveying data according to a first preferred exemplary embodiment of the invention

The user 134 then starts the surveying by starting the computer program in the memory 112 of the computer 54. The steps performed are illustrated in the flow diagram in FIG. 18. The part left of the dot-dashed line shows actions by the user whereas the central column illustrates operations by the processor 113. The right column illustrates some of the data generated and/or used in the method.

The method can be subdivided in essentially four sections S10 to S13 the following sections S14 to S16 forming a fifth section.

After the user has input a start command via the keyboard 52 or the pointing device 114, in section S10 the processor 113 obtains calibration data from the non-volatile section of memory 112.

In section S11, the processor obtains data representing a (panoramic) projection surface in three-dimensional space. This projection surface is the surface an image obtained by the first image sensor 33 is projected to. The processor 113 stores these data as projection surface data in memory 112.

In section S12 the processor determines a target region to be surveyed by obtaining data representing the target region. The processor then stores target region data defining the target region in the memory 112.

In section S13 the processor 113 acquires a set of pixel data produced by the optical detector array representing a two-dimensional image of at least a part of the target region using the array of detector elements, i.e. the first image sensor 33 of telecamera 19. It then transforms the set of pixel data to a set of projected image data representing a projection of the image to the projection surface using the calibration data, target region data and the projection surface data. The acquisition of some of the pixel data and the transformation may occur sequentially or concurrently.

Figure 20:
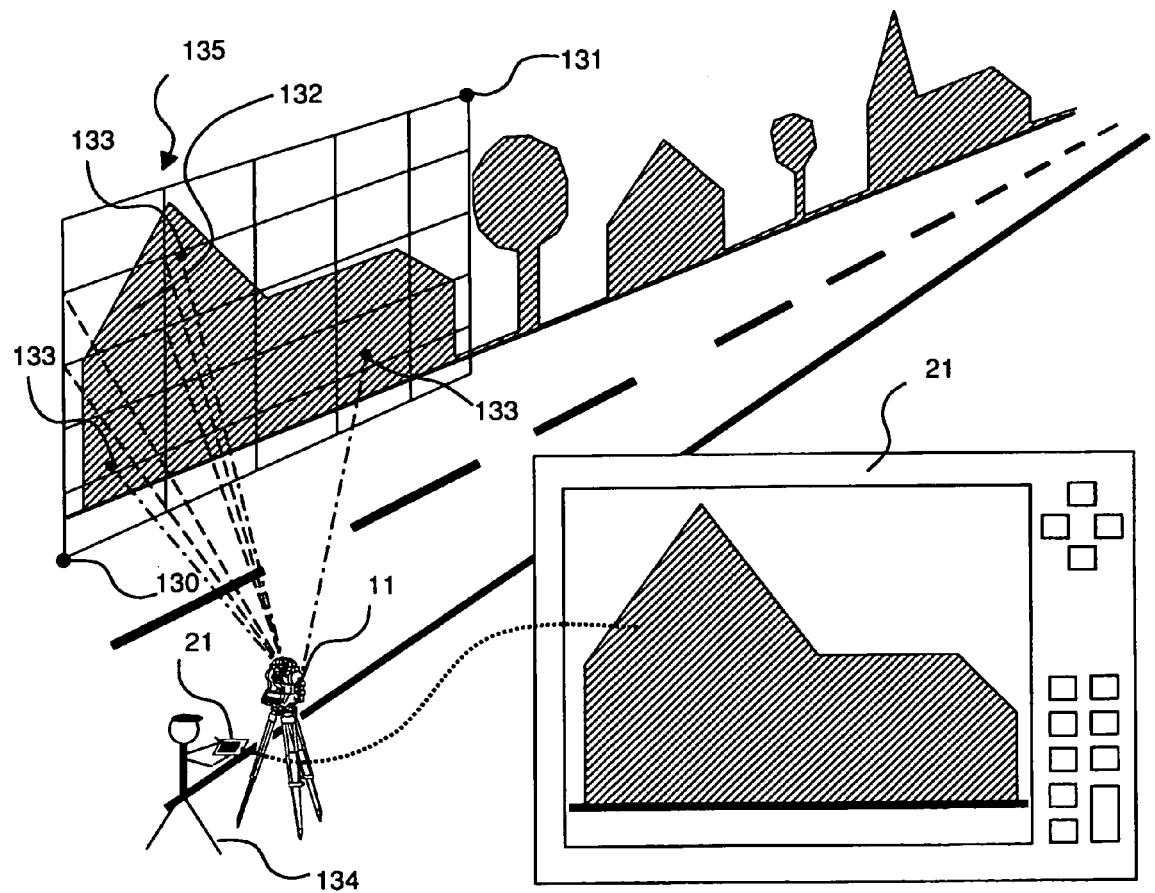
FIG. 20 schematically shows an illustration of the setup for obtaining an image projected to a projection plane.
Figure 25:
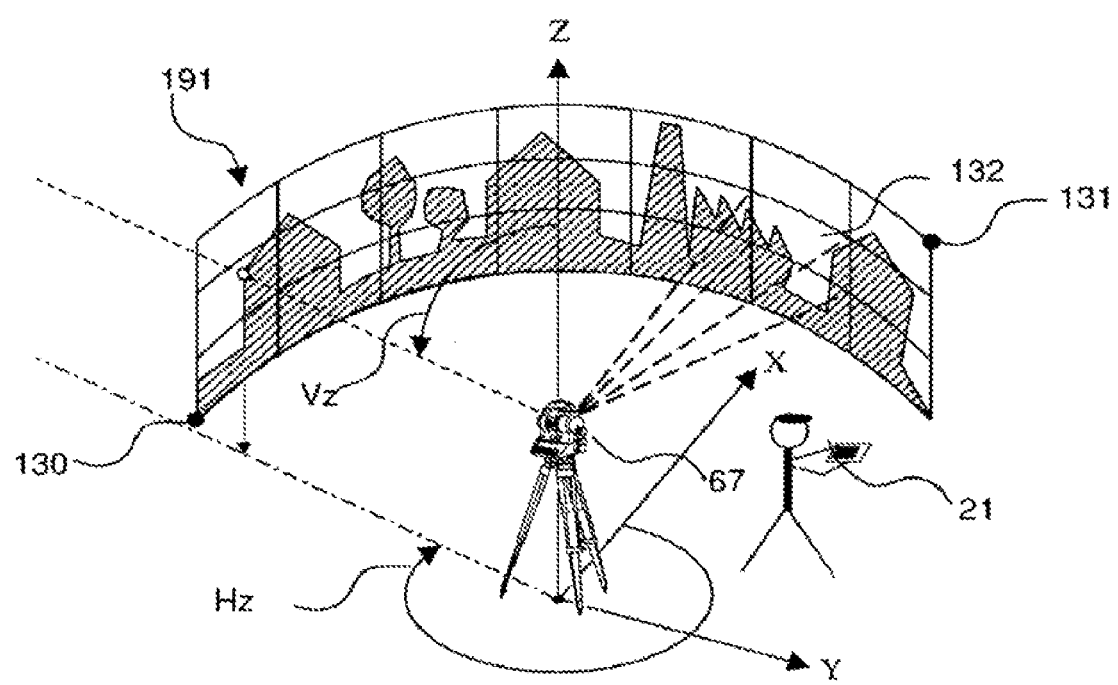
FIG. 25 schematically shows an illustration of the setup for obtaining an image projected to a cylinder.

The section S13 for acquiring the pixel data and transforming the pixel data can be divided into three main operations: determining a sequence of orientations of the telescope unit in which partial images are to be captured for covering the target region, obtaining pixel data for each of the partial images and transforming the pixel data to projected image data representing a projection of the image represented by the pixel data to the projection surface using the calibration data and the projection surface data and, in the case of more than one capture partial image, determining the subset of the transformed pixel data that represents an (panoramic) image of the target region obtained by mounting the partial images. Projected partial images are illustrated in FIGS. 20 and 25 by rectangles 132.

For a sequence of orientations of the telescope unit in which partial images are to be captured for covering the target region the processor 113 determines the number of partial images necessary to cover the target region from the target region data, i.e. the horizontal and vertical angles defining the edge or corner directions bounding the target region, the horizontal and vertical viewing angles of the telecamera 19 formed by the imaging optics and the detector array and a desired overlap between neighboring partial images. In this example, the largest difference between the horizontal angles and the largest difference between the vertical angles is determined, and compared to the horizontal viewing angle and vertical viewing angle, respectively. By dividing the differences by the corresponding viewing angles reduced by the desired overlap permanently stored in memory 112, the number of partial images necessary in horizontal and vertical direction is calculated. In case of a full panoramic image the horizontal angle range covers 400 grin, i.e. 360°.

Further, the processor 113 determines and stores a sequence of orientations of the telescope unit 16 so that the set of partial images captured in each of the orientations covers the target region, two neighboring partial images overlapping along their edges by the predetermined amount, which may be given the number of pixels of overlap and stored in the memory 112 as a predetermined number. For example, the first partial image, i.e. the first orientation, may be chosen such that the upper left corner of the partial image will coincide with the upper left corner of the smallest rectangle enclosing the corners of the target region as seen by the camera. Then, the following orientations may be chosen such that the partial images are taken along a meandering path as shown in FIG. 20. If the target region is small enough the sequence may contain only a single partial image and thus a single orientation.

Generally, the operations of obtaining the pixel data and of transforming the pixel data can be performed such that first all pixel data are obtained and then all transformations are performed. In this example, however, after obtaining the pixel data for one partial image the corresponding pixel data are transformed to the projection surface before or while obtaining the pixel data for the next partial image.

The step of obtaining the pixel data for one partial image includes controlling the drives to move the telescope unit 16 subsequently into the orientations in the determined sequence of orientations, and reading the pixel data from the detector array for each of the orientations. The pixel data are then stored temporarily in the memory 112.

In this example, an indirect projection technique is used to transform most of the pixel data representing the partial image to the projection plane. For that purpose the projected image is represented by a given number of projected image pixels which are located on the projection surface in a predetermined arrangement, in the cases of a plane or a cylinder as a projection surface.

Figure 19:
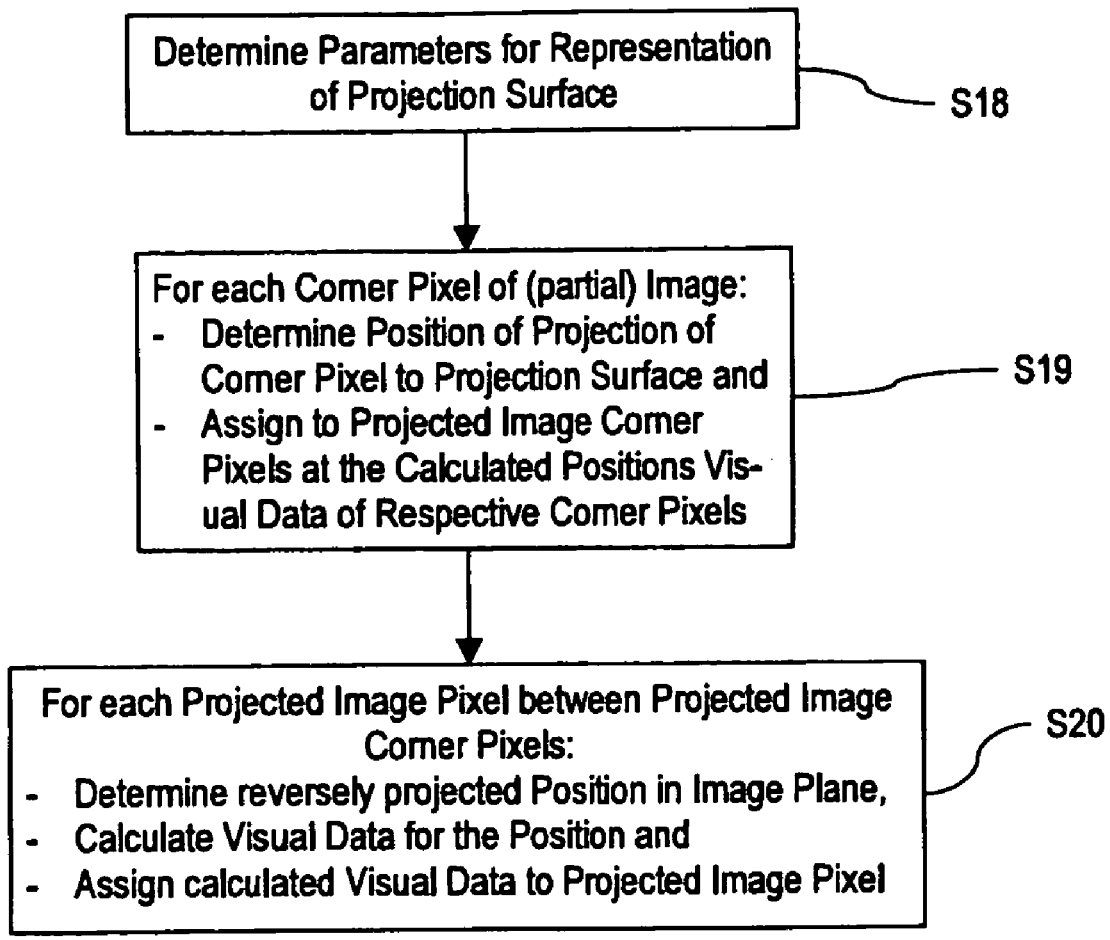
FIG. 19 shows a more flow diagram illustrating the substeps of step S13 in FIG. 18.
Figure 28:
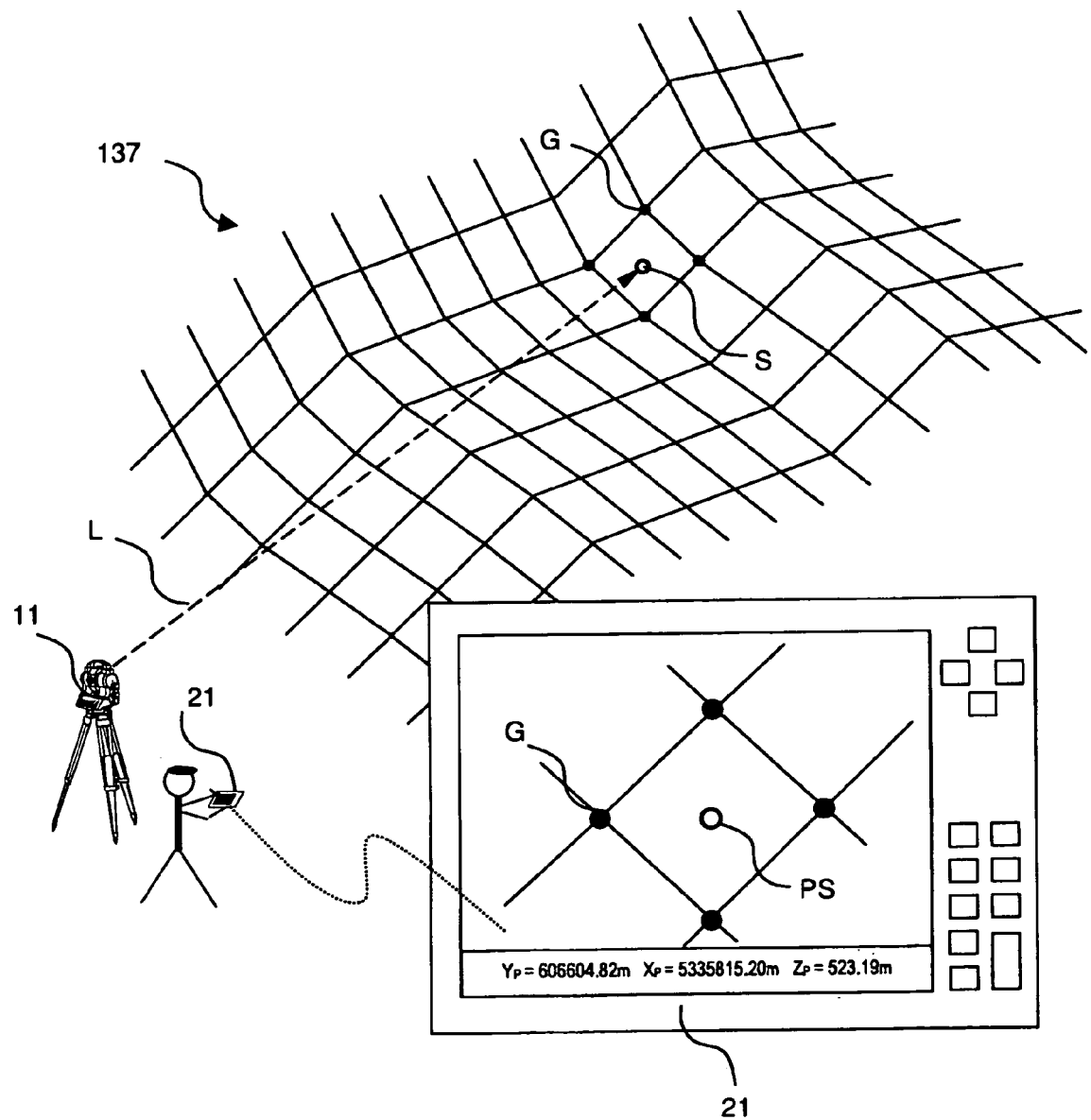
FIG. 28 schematically shows an illustration of the setup for obtaining an image projected to a freeform surface.

As shown in FIG. 19, the step of transforming the pixel data of an image or a partial image captured by the array of detector elements comprises (cp. FIG. 28) step S18 of determining parameters for representing the projection surface, step S19 of directly projecting the corner pixels of the image to the projection surface and step S20 of determining visual data for projected image pixels of the projected image by indirect projection.

The step S19 of directly projecting corner pixels includes determining corner pixels of the image or the partial image and determining the positions of the projected image corner pixels on the projection surface defined by the directions associated with the corner pixels by equation (2) and the steps mentioned after equation (2), in this example of intersections of rays along the directions associated with the respective corner pixels passing through the origin of the instrument coordinate system with the projection surface. It further comprises assigning the visual data of the respective corner pixels to the resulting projected image corner pixels.

The step S20 of determining visual data for projected image pixels of the projected image by indirect projection comprises determining for each projected image pixel not being a projected image corner pixel visual data by determining the coordinates of a position in the plane of the image to be projected using equations (1), calculating visual data for the position using visual data of the pixel at the determined position and optionally neighboring pixels and assigning the visual data to the projected image pixel.

Details of steps S19 to S20 are described further below.

In the case that more than one partial image is captured step S13 further includes mounting the projected partial images to obtain a merged projected image defined by panoramic image data. This operation is quite simple, as all projected image data are defined in the same projection surface so that in the case of a representation of the projected (partial) image by projected image pixels the location of the projected images pixels is known. The arrangement of the projected partial images is illustrated in FIGS. 20 and 25. If the partial images do not overlap, the projected partial image data of the projected partial images to be mounted are arranged in a data structure representing a single image. In the case, that an overlap exists, the overlapping pixels of one of two overlapping projected partial images are omitted. The projected image pixel data assigned to the overlapping pixel not omitted may be the projected image pixel data of the pixel kept or an average of the pixel data the overlapping pixels.

If more than one image is captured to cover the target region, in step S14 the processor 113 adjusts the projected image data using overlap information between overlapping pixels of overlapping projected partial images.

In step S15 the processor stores the projected image, i.e. the projected image data, and additional information as surveying data in a data structure in memory 112.

Depending on further processing, the projected image data and the additional information may be transferred to another storage device, e.g. of a remote computer, via the radio module 61. In addition, the projected image data and the additional information may be stored on a removable storage device such as a compact flash card inserted via an adaptor in a PCMCIA-slot of the control-panel 21 not shown in the Figures. The additional information may comprise e.g. the calibration data and the horizontal and vertical angles Hz and Vz as detected by the angle sensors 24, 25 and 22, 23 when the image or the images was or were, respectively, were captured. Preferably, the projected image is also decomposed into projection pixels. The projected image data then comprise a set of projection pixel data representing properties of the projection pixels. The additional information may then further comprise direction information, e.g. a horizontal and a vertical angle, determined for each projected pixel.

The stored data may be used by the processor for further surveying tasks or at a remote computer, e.g. in an office, to perform further surveying operations S17 solely on the basis of the obtained surveying data.

In step S16 the processor controls the display unit 53 to display the projected image. For that purpose, it creates display data from the projected image data and sends these data to the display unit 53 which displays a corresponding image.

Obviously, the detailed operations to be preformed in sections S11 to S13 depend on the type of projection surface. Thus, the detailed steps are described in the following for different types of projection surfaces. Since the mounting of the projected partial images is the same for all types of projection surfaces this substep does not need to be explained further.

In a first step of section S11, the processor controls the display unit 53 to display a selection of four types of projection surfaces: a plane, a cylinder, a sphere and a freeform surface. It than reads either as an input from the keyboard 52 or as a position of the pointing device when operating a selection button of the pointing device, e.g. a mouse button, selection data defining one of the four types of projection surface. In other embodiments, only one type of surface may be available. In that case the selection step is omitted. The type of surface is stored as part of projection surface data.

The following steps differ in dependence on the type of selection. In order to enhance readability, the sequence of steps following the selection step is described separately for each type of projection surface.

Figure 21:
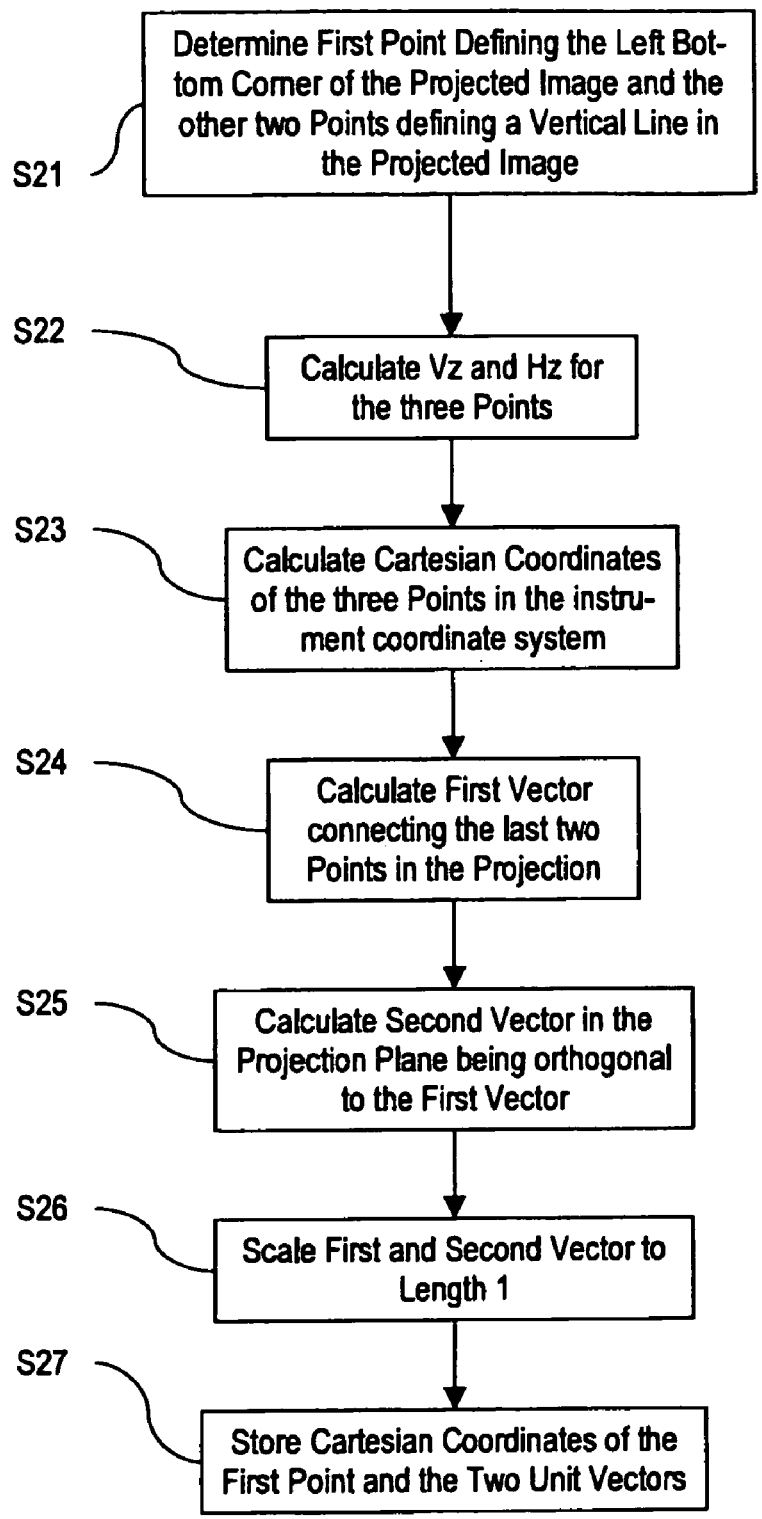
FIG. 21 shows a flow diagram illustrating the substeps of step S18 in FIG. 20 for the case of a projection plane.

FIG. 21 shows the steps for the case of a projection surface a plane. The situation is schematically illustrated in FIG. 20, which shows a user 134 with the video-tacheometer 11 in front of a target region.

The processor 113 controls the display unit 53 to display three alternatives to input projection surface data defining a plane, namely a numerical input using the keyboard 52, reading data from a remote storage device or computer, via the radio module 61 or the definition by measuring the position of three points defining the plane relative to the surveying instrument 11. In any case, coordinates of three points being not collinear are read which define a projection plane 135 (cf. FIG. 20).

After reading the corresponding selection by the user, the processor 113 either reads projection surface data in form of horizontal and vertical angles and a distance from the surveying instrument 11 from the keyboard 52 and stores the data as data of the projection surface data.

Or the processor 113 reads the data from via the radio module 61, the device-control computer 21 and connection 55 in form of horizontal and vertical angles and a distance from the surveying instrument 11 and stores the data as data of the projection surface data.

Or the processor 113 controls the display unit 53 to display the image currently captured by the telecamera 19 and reads inputs from the pointing device when its selection element is operated the inputs defining a position on the image displayed on the display unit 53, i.e. a corresponding pixel. Between reading the inputs the user may re-orient the telescope unit 16. Thus, a user may select the points by selecting suitable points in the displayed image. In FIG. 20 the corresponding points are marked by reference numeral 133. The image points must not be collinear. Preferably, the user first inputs the position of the lower left corner point the projected image, then the positions of two points that shall represent a vertical line in the projected image.

For each of the three points 133 the processor 113 then determines the directions, i.e. horizontal and vertical angles, associated with the position using the calibration data and equation (2) including the steps mentioned after equation (2), wherein x" and y" are given by the coordinates obtained using the pointing device.

The processor 113 then controls the drives 22 and 23 to rotate the telescope unit 16 with its sighting axis into an orientation given by the determined horizontal and vertical angle. Once the telescope unit 16 has reached the desired orientation the processor 113 controls the distance-measuring device 30 to measure a distance from the distance-measuring device 30 to an object on the sighting axis and produce a corresponding distance signal. The processing unit 21, in particular the processor 113 receives the distance signal and converts it into distance data. The processor 113 then stores the distance data in the memory 112 associated with the corresponding horizontal and vertical angles as projection surface data for the respective point defining the position of the point in the instrument coordinate system.

Next, in step S12, the target region is defined. The processor first obtains the information whether a full panorama of 400 gon shall be obtained or only a section thereof via the graphical user interface.

In the first case, the processor 113 reads angle data defining the position of the center of the panoramic image in the vertical direction from the keyboard 52 or as a position of the pointing device 114. Further, it reads the height of the panoramic image either by reading corresponding data from the keyboard 52, the data representing the vertical positions of the borders of the panoramic image, or representing at least one border or the center in the vertical direction and the height. The processor 113 stores these data as target region data in the memory 112.

In the second case, at least two, generally four corner points are obtained in the same manner as in the case of the points 133 defining the projection plane, wherein the distance data do not need to be obtained. If the target region has a rectangular cross section, only two points, in FIG. 20 the lower left corner point 130 and the upper right corner point 131 need to be determined, as the other two points are obtained by geometric calculation. In case of four points the points having the largest absolute difference of the horizontal angles define the horizontal angle of the panoramic image and its horizontal angular position and the points having the largest absolute difference of the vertical angles define the height of the panoramic image and its vertical position. These data are then stored as target region data in the memory 112.

For defining the projected image in terms of projected image pixels, the processor 113 reads a scale factor which defines the number of pixels of the projected image per length in the target region, e.g. per m.

To this end, first an optimum scale factor is determined. The processor calculates the distance $D_{ortho}$ of the projection plane to the instrument along a direction orthogonal to the plane and a ratio $$m_{opt} = \frac{D_{ortho}}{f}$$

with f denoting the focal length of the imaging optics. The value of f is stored in the memory.

The processor calculates and stores the optimum scale factor $$m = \frac{1}{m_{opt} l_{pixel}}$$

wherein $I_{pixel}$ denotes the length of a detector element of the detector array, i.e. pixel in the captured image. Use of this scale factor makes sure that for the smallest distance between the instrument and the object plane the maximum resolution of the camera is used. Increasing this value is not recommendable as no increase in resolution can be obtained. Decreasing the scale factor leads to a reduced precision.

The processor 113 controls the display unit 53 to display the optimum scale and reads either confirmation information or a different scale factor via the keyboard 52 or the graphical user interface.

Figure 22:
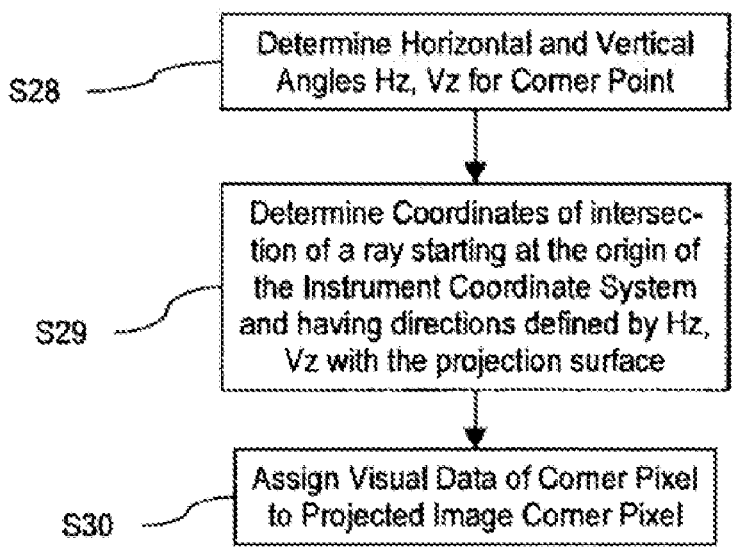
FIG. 22 shows a flow diagram illustrating the substeps of step S19 in FIG. 20 for the case of a projection plane.
Figure 23:
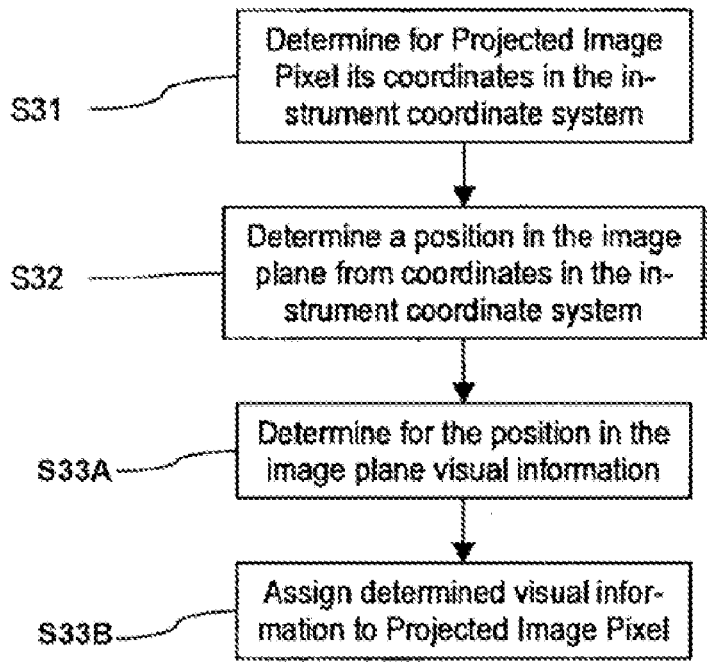
FIG. 23 shows a flow diagram illustrating the substeps of step S20 in FIG. 20 for the case of a projection plane.

The steps S18 to S20 for determining parameters representing the projection plane and transforming the pixel data for one partial image to corresponding projected partial image data are shown in more detail in FIGS. 21 to 23 for the case of a plane projection surface.

First, in steps S21 to S27 a representation of the projection plane is obtained using the projection surface data defining the at least three points mentioned above (see FIG. 21).

In step S21, the processor 113 determines a first point defining the left bottom corner of the projected image and the other two points defining a preferably vertical line in the projected image.

In step S22, the processor 113 calculates vertical angles Vz and horizontal angles Hz in the instrument coordinate system for all three points.

In step S23, the processor 113 calculates Cartesian coordinates of three corresponding projected points in the instrument coordinate system the coordinates representing the intersections of rays having the calculated horizontal and vertical angles Hz and Vz associated with the points determined in step S21 with the projection surface.

In step S24 the processor 113 calculates a first vector in the instrument coordinate system connecting the second and third projected point in step S23.

Then, in step S25, the processor 113 calculates a second vector being orthogonal to the first vector and extending in the projection plane. For that purpose a vector product of the first vector and a vector connecting the first projected point and one of the second and third projected point can be used.

In step S26, the processor 113 scales the first and second vector to length 1 to obtain coordinates of unit vector $E_2$ and $E_1$ by dividing the coordinates by the length of these vectors. The projection plane then has the parametric representation:

$$R_{ab} = a \cdot E_1 + b \cdot E_2 + R_{UL},$$

in the instrument coordinate system, wherein $R_{ul}$ denotes the vector to the point on the projection surface corresponding to the first point and a and b are arbitrary real numbers and $R_{ab}$ is a vector to a point in the projection surface defined by the parameters a and b which may be regarded as coordinates (a,b) of the point $R_{ab}$ in the projection plane.

In step S27 the processor 113 stores Cartesian coordinates of the first point and the two unit vectors in memory 112.

Figure 24:
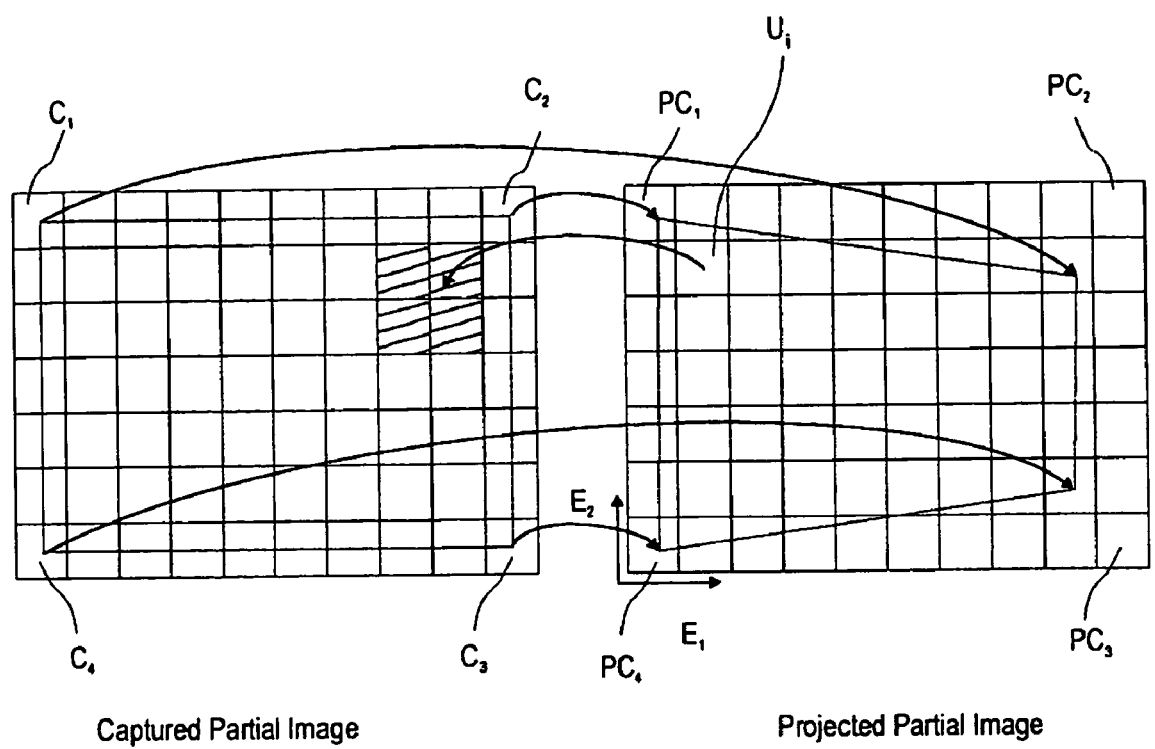
FIG. 24 shows an image plane and the projection plane for illustration of the projection steps S19 and S20 in FIG. 20.

For representation of the projected image projected image pixels are used that are defined by the desired resolution, i.e. the scale factor read in above. In the example, quadratic pixels in a rectangular array on the projection plane are used (cp. FIG. 24). Each projected image pixel $U_{ij}$ is assigned a position given by equation (3)

$$R_{ij} = \frac{i}{N} E_1 + \frac{j}{M} E_2 + R_{UL}.$$

where i=1, ..., N, j=1, ... M are non-negative integers, if N and M denote the maximum number of pixels in horizontal and vertical direction of the projected image. Thus, using the representation above a=i/N, b=j/M. The position of a pixel or projected pixel in the following means the position of its geometric center.

The projection is illustrated in FIG. 24, which schematically shows the partial image captured on the left hand side and the projected partial image on the right hand side. Each image is composed of pixels visualized by squares.

Step S19 directly projecting corner pixels C2, ..., C4 includes determining corner pixels of the image or the partial image and determining the positions of the projected image corner pixels on the projection surface defined by the directions associated with the corner pixels by equation (2) including the steps mentioned after equation (2). If only two corner pixels have been determined so far for a rectangular projected image, two other corner pixels are determined which form the corners of the rectangle defined by the corner pixels already obtained. Thus, there are four corner pixels in any case. FIG. 22 shows the substeps of step S19 for each corner pixel. The processor 113 calculates coordinates representing the position of the projected image corner pixel in two steps for each of the corner pixels.

In step S28, the processor 113 calculates horizontal and vertical angles Hz and Vz associated with the respective corner pixel using the coordinates of the respective corner pixel in the image plane and equation (2) including the steps mentioned in the paragraph after equation (2), i.e. some of the calibration data and equations based on the model used for calibration. These angles define the corner directions corresponding to edges of the target region.

In step S29, the processor 113 determines the coordinates of the intersection of a ray starting at the origin of the instrument coordinate system and having direction defined by the angles Hz and Vz and the projection surface. These coordinates define the projection of the corner pixel, i.e. the respective projected image corner pixel. The ray may be represented by the equation $$R = c \begin{pmatrix} \cos(Hz)\sin(Vz) \\ \sin(Hz)\sin(Vz) \\ \cos(Hz) \end{pmatrix},$$

wherein R is a vector pointing towards a point on the line having the distance c (c arbitrary real number) from the origin of the instrument coordinate system. As mentioned above the plane has the representation $$R_{ab} = a \cdot E_1 + b \cdot E_2 + R_{UL},$$

so that by equating the left sides of the above mentioned equations three equations for a, b, and c for given angles Hz and Vz are obtained, which can be solved using standard formulas. The solution can be represented in the computer program by corresponding instructions for calculating a, b and c.

In step S30 the processor 113 assigns the visual data of the respective corner pixel to the resulting projected image corner pixel $PC_1, \ldots, PC_4$.

Thus, the projected image corner pixel is defined by the values for a and b, i.e. i,j, respectively, and the associated visual data.

The indirect projection of step S20 is performed for each of the projected image pixels which are not projected image corner pixels. As the projected image pixels are arranged to cover the projected image area completely but without overlap, using indirect projection avoids problems due to overlap of direct projections of pixels in the projection surface.

The steps for each of those projected image pixels are shown in more detail in FIG. 23.

In step 331, the processor calculates for a given position of $R_{i,j}$ of a projected image pixel $PU_{i,j}$, the corresponding coordinates in the instrument coordinate system using equation (3).

In step S32, the processor 113 then determines a position in the image plane corresponding to the projected image pixel using the calculated coordinates in the instrument coordinate system and equations (1). For this purpose, the processor 113 calculates horizontal and vertical angles Hz and Vz from the calculated coordinates and then the coordinates in the image plane from the obtained values using equations (1). For this calculation also some of the calibration data are used.

In step S33A, the processor then determines visual information for the calculated position. The visual information is to be assigned to the pixel $PU_{i,j}$. To this end the processor 113 performs a bilinear interpolation of the visual data between the pixels for the captured image closest to the calculated position, in FIG. 24 shown as hatched squares. Bilinear interpolation is generally known in the art. Sections in Press, W. H., et al.: Numerical Recipes in C, $2^{nd}$ edition, 1992, ISBN 0-521-43108-5, pp. 123-124 or Luhmann, T.: Nahbereichsphotogrammetrie, Heidelberg: Wichmann, 2000, ISBN 3-87907-321-X, pp. 385-386 describe bilinear interpolation and are incorporated herein by reference. If the visual information is color information coded in RGB-channels, for example, the interpolation is performed for each of the channels R, G and B.

In step S33B, the processor 113 assigns the calculated visual data to i and j and stores the visual data so that the visual data and i and j represent projected image data.

Then the partial images are mounted to form the panoramic image. For that purpose, in each partial image the pixels in the right and bottom overlap region are omitted for all but the most right and bottom partial images.

In the next step S14, the processor 113 performs a radiometric adjustment of the projected partial image data in the overlap regions using the information of the omitted pixels. In more details it compares the intensities in pixels of the partial projected images that correspond to the same position. It then adjusts the intensities in one of the partial images, if a meandering sequence is used, the next projected image along the path, for all pixels by multiplication with a scaling factor, so that the intensities in the overlap region coincide.

The resulting projected image pixel data are stored as projected image data in step S15. In this step also additional data, e.g. projection surface data and or horizontal and vertical angles used when capturing the image or the partial images, may be stored.

In step S16 the processor 113 controls the display unit 53 to display an image on the basis of the projected image data.

Alternatively, a user can select a cylinder surface as a projection surface. This is illustrated in FIG. 25, in which the cylinder surface is marked by reference numeral 191.

The axis of the cylinder is assumed to be vertical, i.e. parallel to the vertical axis of the instrument, and runs through the origin of the instrument coordinate system. It is thus the Z-axis of the instrument coordinate system. For the projection to the cylinder surface, positions on the cylinder surface are defined by an x-coordinate extending along the circumferential direction and a y-coordinate extending along the cylinder axis and thus orthogonal to the x-direction.

Pixels of the projected image form a rectangular array, the geometric centers of the pixels being equidistant in x- and y-direction. This arrangement of pixels allows a simple display on the display unit 53 as the display of the projected image pixels on the plane display unit 53 corresponds to developing the cylinder surface on a plane.

Next, in step S12 the target region has to be defined. The processor 113 first obtains the information whether a full panorama shall be obtained or only a section via the graphical user interface.

In the first case, the processor 113 reads angle data defining the position of the center of the panoramic image in the vertical direction from the keyboard 52 or as a position of the positioning device. Further, it reads the height of the panoramic image either by reading corresponding data from the keyboard 52, the data representing the vertical positions of the borders of the panoramic image, or representing at least one border or the center in the vertical direction and the height. The processor 113 stores these data as target region data in the memory.

In the second case, four corner points are obtained as in the case of a projection to a plane. The points having the largest absolute difference of the horizontal angles define the horizontal angle of the panoramic image and its horizontal angular position and the points having the largest absolute difference of the vertical angles define the height of the panoramic image and its vertical position. These data are then stored as target region data in the memory 112.

In step S18 for the case of a cylinder surface as a projection surface, for defining the projected image in terms of projection pixels, the processor 113 reads a scale factor which defines the ratio of the number of pixels of the projected partial image per unit angle, e.g. per ° or per gon, in horizontal direction and the number of pixels of the image captured by the detector array per unit angle, e.g. per ° or per gon, in horizontal direction which depends on the imaging optics and the detector element array and is known.

Further, the processor 113 calculates a factor q which is the number of pixels of the projected image per unit angle, in this example per gon, by multiplying the scale factor with the number of pixels in horizontal direction per unit angle, e.g. gon, which is given by the corresponding number of detector elements per unit angle. Further, the processor calculates and stores a radius of the projection surface, i.e. cylinder surface, $R_{pan}$ in units of pixels of the projected image:

$$R_{pan} = q \frac{400 gon}{2\pi}.$$

Figure 26:
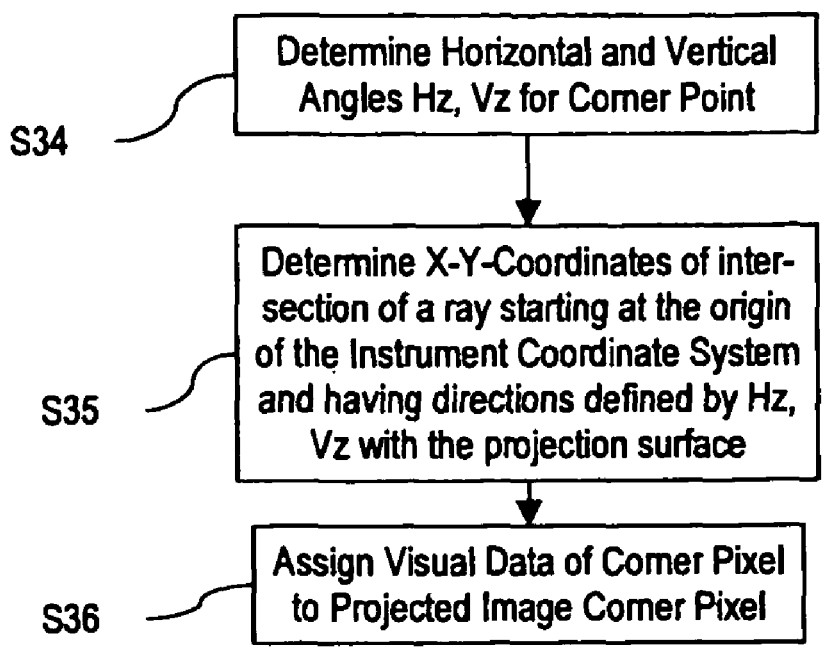
FIG. 26 shows a flow diagram illustrating the substeps of step S19 in FIG. 20 for the case of a projection to a cylinder.

In step S19 for the case of a cylindrical projection surface Herein the processor 113 performs the direct projection of all four corner pixels of the captured image to the projection surface. The step comprises for each corner pixel the steps shown in FIG. 26.

Steps S34 and S36 correspond to steps S28 and 530 for the case of a projection plane so that these steps do not need to be defined more explicitly.

However in step S35 which is analogous to step S29 the processor 113 determines coordinates representing the intersections of a rays extending from the origin of the projection center in a direction given by the horizontal and vertical angles Hz and Vz calculated in step S34 and of the projection surface. In more detail, the processor 113 calculates the x-coordinate $x_{pan}$ of the respective corner pixel in units of pixels of the projected image using the formula $$x_{pan} = q \cdot Hz.$$

Also, the processor 113 calculates the y-coordinate $y_{pan}$ of the four corner pixel in units of pixels of projected image using the formula $$y_{pan} = -R_{pan} \cdot \tan\left(\frac{V}{400 gon} - \frac{\pi}{2}\right) + \frac{h_{pan}}{2}.$$

Herein $h_{pan}$ denotes the height of the panoramic image in units of pixels, i.e. its extension in vertical direction. The minus-sign is due to the fact that in the graphics system used the y-axis points downwards.

As a result the pixel position $x_{pan}$, $y_{pan}$ of the corner pixel are known.

Figure 27:
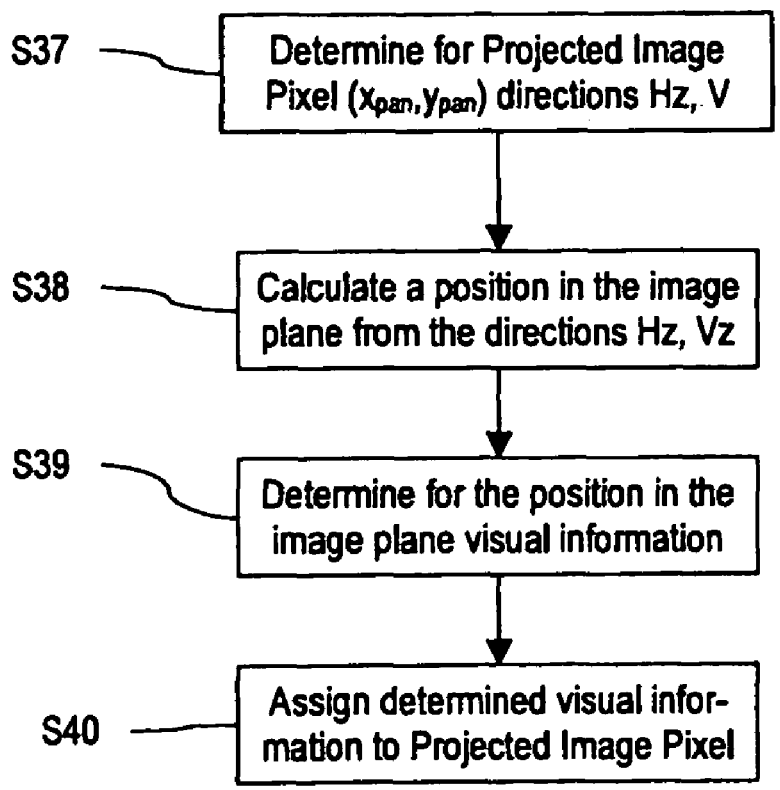
FIG. 27 shows a flow diagram illustrating the substeps of step S20 in FIG. 20 for the case of a projection to a cylinder.

As in the case of the planar projection surface, the projected image pixel data for all other projected image pixels forming the projected image are obtained by indirect projection in step S20. The steps carried out for each of these pixels are shown in FIG. 27.

In step S37, the processor 113 determines the coordinates of the respective projected image pixel.

In step S38, the processor 113 determines a position in the image plane from the determined coordinates in the instrument coordinate system. It first calculates horizontal and vertical angles Hz, V of a ray running from the projected image pixel through the origin of the instrument coordinate system:

$$Hz = \frac{x_{pan}}{q}$$

$$V = \frac{200 gon}{\pi}\left(\arctan\left(\frac{-y_{pan} + h_{pan}/2}{R_{pan}}\right) + \frac{\pi}{2}\right).$$

The processor 113 then calculates co-ordinates x" and y" in the image plane of the captured image from Hz and V using the calibration data and equations (1).

As in the case of a planar projection surface, in step S39 the processor 113 calculates visual data for the calculated coordinates x", y" by bilinear interpolation between the pixels for the captured image closest to the position defined by the coordinates.

In step S40, it assigns the visual data to the coordinates $x_{pan}$ and $y_{pan}$ and stores the visual data as projected image data. The $x_{pan}$-$y_{pan}$-coordinates can be omitted when the pixel data of all pixels of the projected image are stored in a pattern so that from the position in the pattern the coordinates can be derived.

As in the case of the planar projection surface, the partial images are mounted to form the panoramic image.

In the case, that a spherical surface is selected as a projection surface, the processor uses the following formulae:

$$y_{pan} = -q \cdot (V - c_{pan}) + \frac{h_{pan}}{2}$$

$$Hz = \frac{x_{pan}}{q}$$

$$V = -\frac{1}{q}(y_{pan} - h_{pan}/2) + c_{pan}$$

Herein $c_{pan}$ is the center of the panoramic image in the chosen angle units, in the example gon.

A projection of the projected image onto a plane may be obtained using standard projection methods as disclosed e.g. in Kuntz, Eugen: Kartennetzentwurfslehre: Grundlagen und Anwendungen, Karlsruhe, Germany, Wichmann 1990, ISBN 3-87907-186-1 the content of which is included herein by reference.

As a fourth alternative the projection surface may be a freeform surface, e.g. a digital surface model or a digital terrain model as illustrated in FIG. 28.

The step S11 of obtaining projection surface data now comprises reading projection surface data from storage medium e.g. using the radio module 61:

The freeform surface which may be a digital terrain model or CAD data may be defined by a quadratic grid of grid points in a plane and height data for each surface point in a direction orthogonal to the plane over a respective grid point the height data representing the distance of the surface point G from the grid point, i.e. the plane. In the present patent application, the digital terrain model or the CAD data are used to represent three-dimensional data in general.

The projected image is obtained as is the case of the other types of surfaces.

In the case of a digital terrain model, the projection to the freeform surface results in an orthoprojection of the captured image which shows the target region in a parallel projection on the digital terrain model, i.e. the projection surface. Sections of the terrain not visible in the captured image or one of the captured partial images lead to empty areas in the projected image and can be shown in any desired color or brightness, e.g. black.

As further surveying operations for example distances can be measured in the projected image, in particular in the case that a projection plane is used. The corresponding step comprises the operations of reading two positions in the displayed projected image selected by the pointing device, determining a distance between points in the instrument coordinate system corresponding to the selected points in the projected image and displaying the determined distance on the display unit 53. For this purpose, the processor 113 reads the position of the pointing device when a selection signal is given, e.g. by pressing a mouse button, and determines coordinates (a,b) in the projection plane. It then calculates Cartesian coordinates for each of the points selected using equation (3). It finally calculates the length of the line between the points using standard formulas known to a person in the art, stores the length in memory 112 and displays the length on the display unit 53 in the projected image as additional data.

In particular, in the case of a projection plane, the surveying operation may also comprise reading three positions in the displayed projected image selected by the pointing device, determining an angle between two lines defined by corresponding points in the projected image and displaying the determined on the display unit 53. First the processor 113 transforms the positions in the displayed projected image, e.g. a and b, into Cartesian coordinates in the instrument coordinate system. Then is determines two vectors, starting at the same point in the instrument coordinate system corresponding to one of the selected points and ending in one of the other points in the instrument coordinate system corresponding to one of the selected points left. Using standard formulas, the angle between the lines can then be calculated by the processor 113.

Further, in the case of a projection surface 137 (cp. FIG. 28) defined as a freeform surface based on a digital terrain model, the instrument may be used to provide further points for the model. To this end, a user selects a point in the projected image which shall form another point of the digital terrain model using the pointing device. The processor 113 obtains position data of the selected point PS in the displayed projected image by reading the position pointed to by the pointing device when a selection operation is performed. It then calculates from equation (2) including the steps mentioned in the paragraph after equation (2) a ray L in the instrument coordinate system and the coordinates of the intersection of the ray with the projection surface. These coordinates represent another point that can be used for defining the digital terrain model.

Alternatively, after determining the horizontal and vertical angles by equation (2) including the steps mentioned in the paragraph after equation (2), the processor 113 can direct the telescope unit 16 with the sighting axis into the calculated directions by controlling the drives 22 and 23 accordingly. It can then control the distance-measuring device 30 to measure the distance to the point in the terrain corresponding to the selected point and store this distance and the corresponding horizontal and vertical angles or equivalent Cartesian coordinates as data of another point in the digital terrain model in memory 112.

Figure 29:
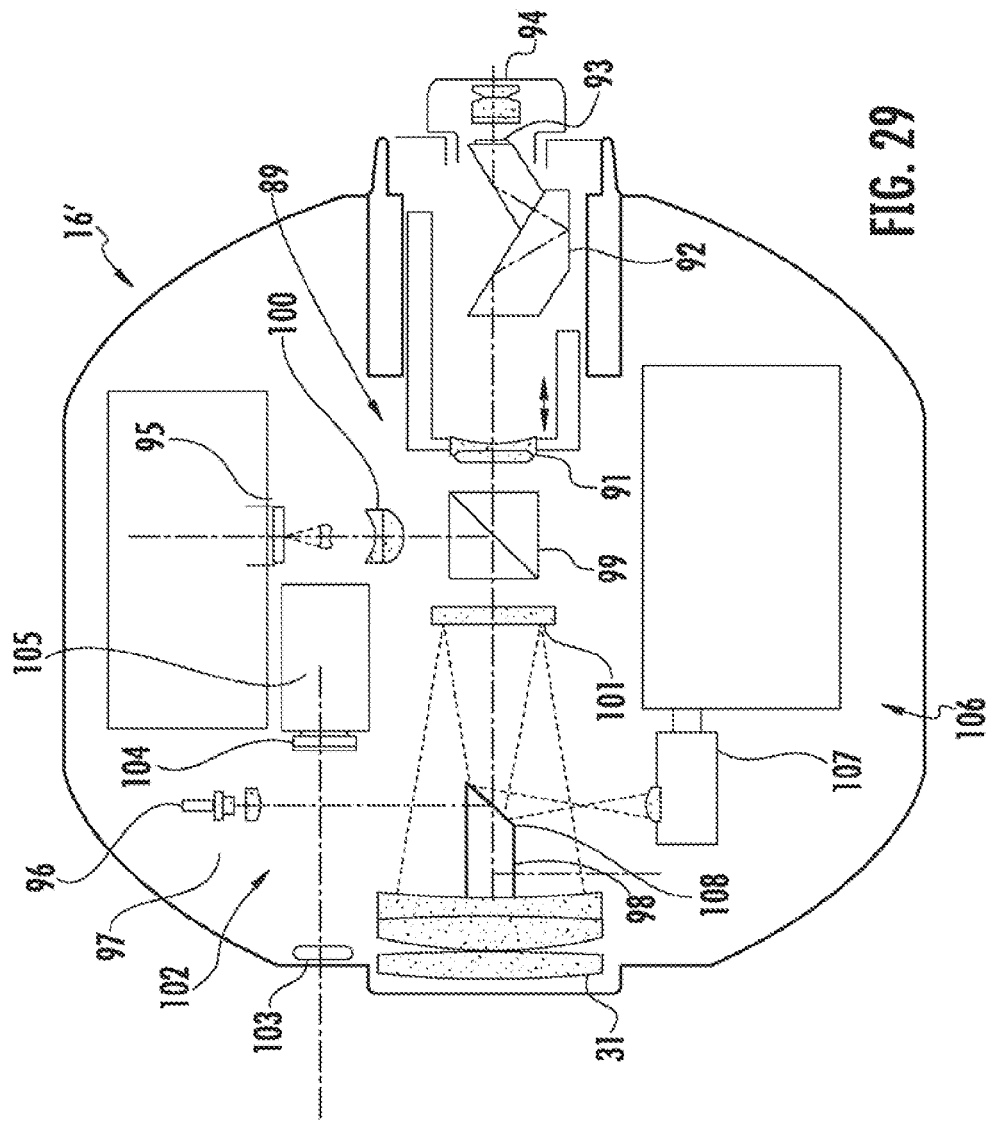
FIG. 29 shows a schematic sectional side view of a telescope unit of a video-tacheometer according to a second preferred exemplary embodiment of the invention.

A video-tacheometer 11' according to a second preferred embodiment of the invention having a telescope unit 16' is shown in FIG. 29. The telescope unit 16' differs from the above-mentioned telescope unit 16. Further, the computer programs stored in the device-control computer 51 and the memory 112 differ from those in the video-tacheometer 11' of the first example.

It comprises a telescope 89 formed by an objective 31 as in the first exemplary embodiment, a focusing lens 91, a reversing prism 92, a cross-hair 93 and an eyepiece 94. An image is focused onto the crosshair 93 by shifting the focusing lens 91 along the optical axis of the telescope as indicated by the arrows in FIG. 29. The telescope is used for sighting at a target.

A further device in the telescope unit 16' is constituted by the tracking device or tracker, respectively, which serves to automatically sight a reflector located in the target point and to track it, when it is being carried from one point to another. The tracker comprises a transmitter, which emits a narrow bundle of optical radiation; the objective 31 through which the bundle is incident in the direction of transmission and, after reflection at the target, in the receiving direction; receiving optics; a receiver 95, which detects the position of the bundle reflected back by the target and focused onto it by the receiving optics, and a closed-loop control which guides the telescope unit 16' or the alidade 12, respectively, such that the position of the ray bundle reflected back by the target remains constant on the receiver 95.

More precisely, the transmitter of the tracker comprises a radiation source 96 for emitting optical, preferably infrared, radiation, such as a laser diode, for example, and transmitting optics, which comprise first collimating optics 97 and a prism 98, at the oblique surface of which the ray bundle coming from the radiation source 96 and collimated by the first collimator optics 97 is reflected in the direction of the optical axis of the objective 31. The receiving optics are formed by a splitting prism 99 and second collimator optics 100. Finally, the receiver 95 comprises several detection elements which are sensitive to the radiation from the transmitter. For the receiver 95, use may be made of a quadrant diode or of a camera circuit, for example.

The transmitter of the tracker transmits the ray bundle, which has been emitted by the radiation source 96, collimated by the first collimator optics 97 and deflected onto the optical axis of the objective 31 by the prism 98, to the target, through the center of the objective 31. The ray bundle is reflected back to the tacheometer by the target, for example a triple mirror or reflector, respectively, and then enters the telescope unit 16' again, through the objective 31. On its way to the target and back, the ray bundle, which was narrow at first, has broadened so much, at a sufficiently great distance from the target, that it fills the entire diameter of the objective 31 upon its return, so that those parts of the ray bundle which are not incident on the prism 98 and are passing a dichroic mirror 101. The wavelength of the ray bundle emitted by the transmitter is selected such that the ray bundle passes the dichroic mirror 101 without substantial reflection, so that said mirror has practically no influence on said bundle. The ray bundle, having passed through the dichroic mirror 101, then enters the splitting prism 99. The splitting layer thereof selectively reflects at the wavelength of the radiation emitted by the transmitter, so that it deflects the ray bundle, which has entered the splitting prism 99, in the direction of the second collimator optics 100, but allows visible light to pass. The second collimator optics 100 focus the ray bundle from the transmitter, said bundle having been reflected by the target, onto the receiver 95 of the tracker. If the position of the image of the target on the receiver 95 deviates from a predetermined position, e.g. in the center, the tracker supplies a signal concerning amount and direction of such deviation to the device-control computer (not shown in FIG. 3), which controls the drives, so as to rotate the telescope unit 16', together with the alidade 12, if required, such that the image on the receiver 95 is at the predetermined position again, which is in the center in the example.

Further, a finder camera 102 is provided in the telescope unit 16'. The finder camera 102 comprises a camera objective 103 and an image sensor 104. Signals of the image sensor 104 are processed by an image processing circuit 105 which is connected to the device-control computer 51. The finder camera 102 can be used to find a target to be measured more easily. The finder camera 102 can be calibrated using the same method as described in the first exemplary embodiment as the projection center of the pinhole camera model can in principle be located arbitrarily with respect to the vertical axis.

The distance-measuring device 106 measures the distance from a target to the tacheometer by directing radiation to the target and receiving the radiation reflected back by it. The distance-measuring device 106 is formed by components of the telescope and by further components. An infrared-light source, which is not explicitly shown in FIG. 29 and emits infrared radiation in a pulsed manner within a predetermined wavelength range, for example a laser diode, directs infrared radiation, after focusing by transmitting/receiving optics 107, to a surface 108 of the prism 98, which is reflective for the light from the infrared light source, and passes it from there to the dichroic mirror 101, which is reflective for the infrared light from the infrared-light source of the distance-measuring device 106 and, therefore, deflects the infrared light onto the objective 31. The infrared-light source and the transmitting/receiving optics 107 are arranged and formed such that the ray bundle emitted by the infrared-light source is focused along the optical path of the distance-measuring device 106, at a distance from the objective 31 which is the focal width of the objective 31, and thus, a near-parallel ray bundle is emitted by the objective 31, said ray bundle then impinging on a target, such as a reflector, for example a triple mirror, or also a natural target, e.g. the wall of a house. The reflected ray bundle passes back along the same path from the target, via the objective 31, the dichroic mirror 101 and the surface 108 of the prism 98, to the transmitting/receiving optics 107, which focus the ray bundle onto a receiving element (not shown in FIG. 29) of the distance-measuring device 106, which detects the radiation. The distance to the target is then determined from the transit time of a pulse between emission and reception, which transit time has been determined by means of a corresponding electronic circuit. Since the ray bundle is emitted along the optical axis of the objective 31, the distance to a target sighted by means of the telescope is determined on the optical axis.

The other components correspond to those of the first exemplary embodiment and the same reference signs are used for corresponding components. Further, the comments to these components in the description of the first exemplary embodiment also apply for this exemplary embodiment.

Generally, the instrument can be calibrated using the same method as described above and using the finder camera instead of the telecamera 19.

The generation of projected images is performed in the same way as described above.

Figure 31:
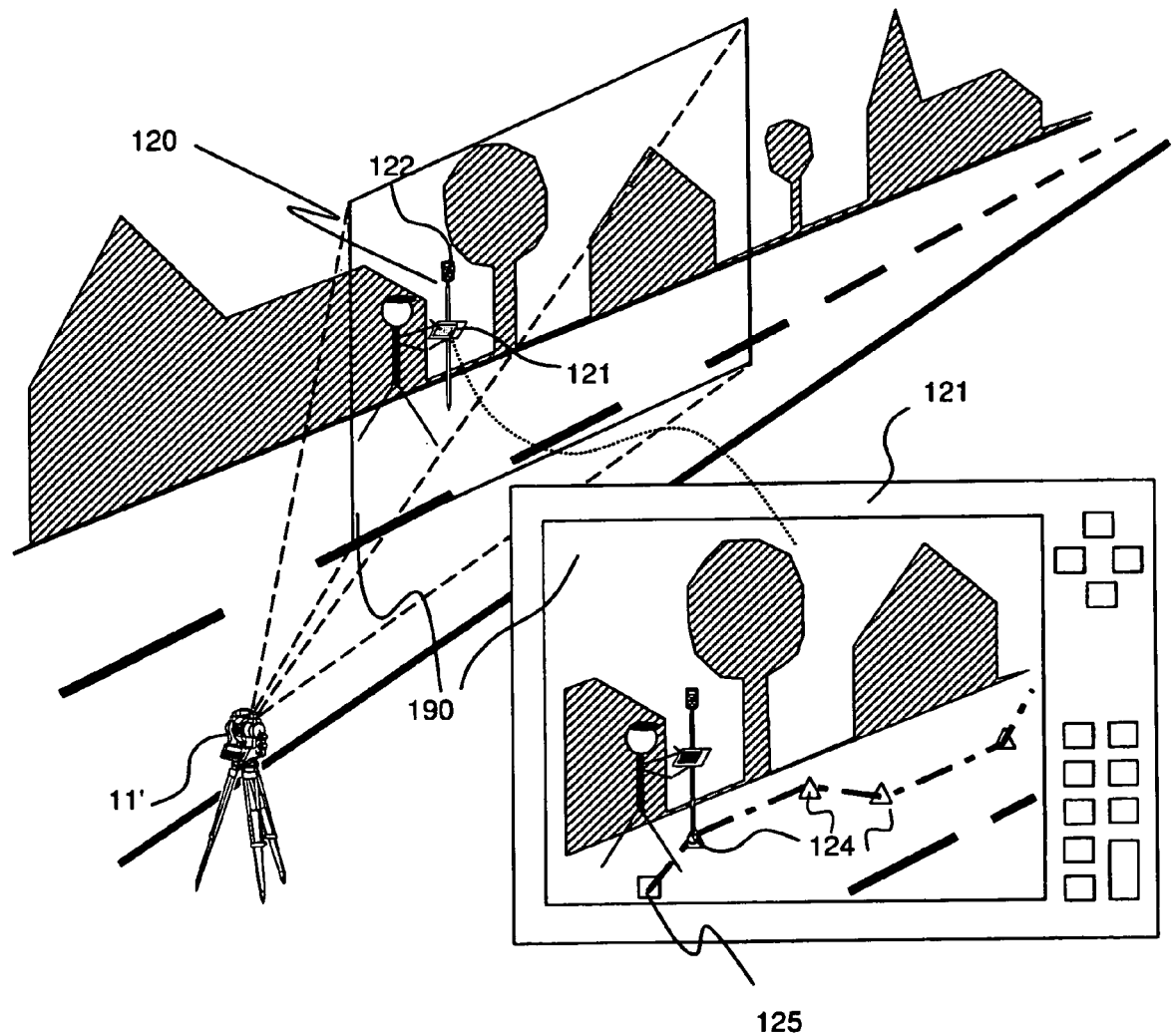
FIG. 31 schematically shows an illustration of the setup for obtaining an image projected to a projection plane and points to be surveyed.

Further, as shown in FIG. 31, a reflector station 120 is used comprising a remote control unit 121 and a reflector 122 mounted to a pole.

The remote control unit 121 comprises a display unit 190, a graphics tablet and a corresponding pen as a pointing device and a control section. Alternatively, it may comprise a touchscreen and a pen as display and pointing device instead of the display unit, the graphics tablet and the corresponding pen. The control section has a wireless network interface suited for operation with the radio module 61 of the video-tacheometer 11'. In particular, the control section may receive projected image data via the wireless connection and display a corresponding image on the display unit. Further, it may obtain position information from the tablet if a user touches a point on the tablet using the pen. It may transfer the corresponding data via the wireless connection to the video-tacheometer 11' and in particular the computer 54 so that the combination of the computer 54 and the remote control unit 121 may be seen to represent a processing unit according to a further preferred exemplary embodiment of the invention.

For surveying, a user may use the video-tacheometer 11' in remote mode in which the instrument is controlled from the reflector station 120. The following method according to a second preferred embodiment of the invention is particularly suited for the case, that at least one, usually several target points shall be staked out.

First, a projected image of a target region is generated as described in the first embodiment.

Figure 30:
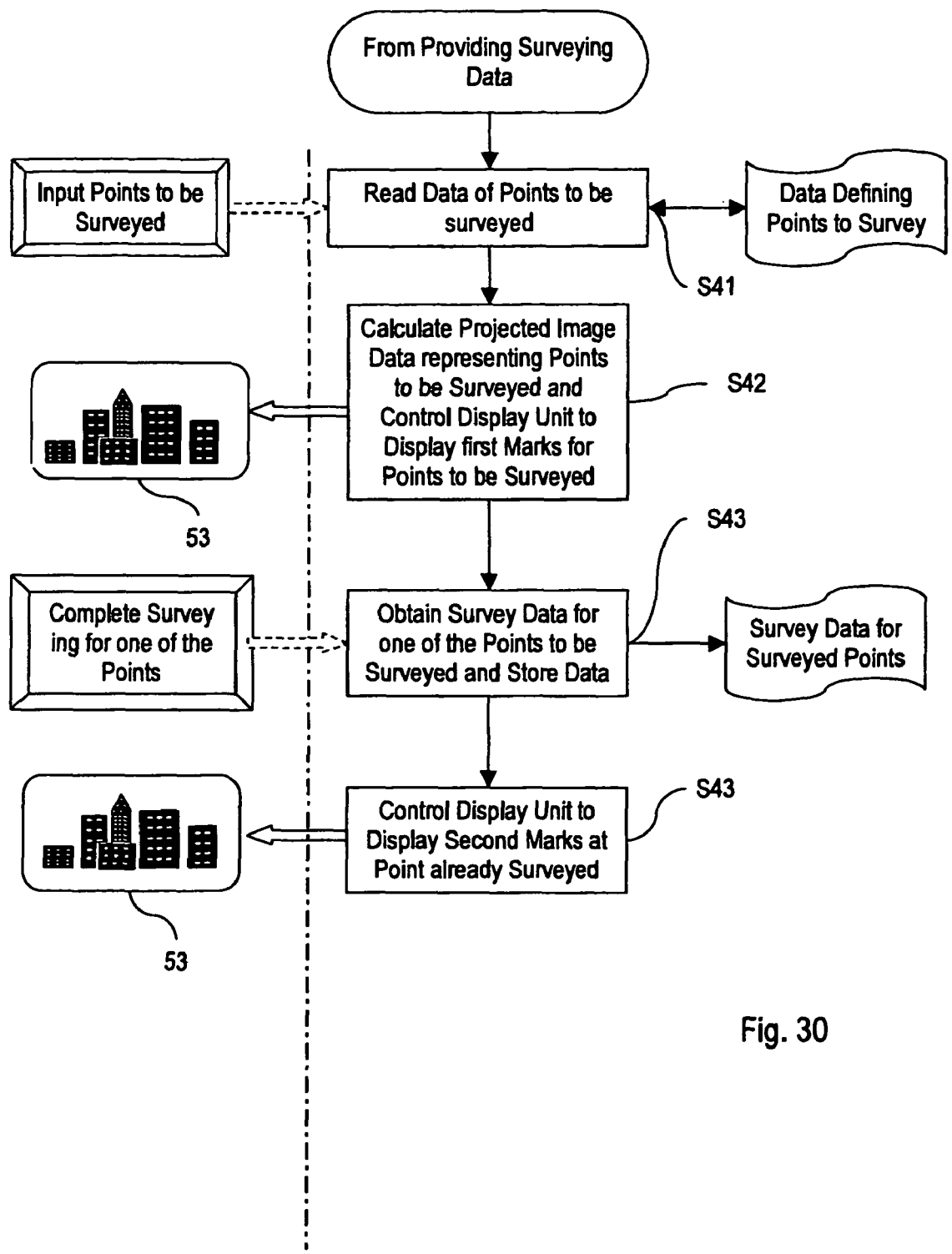
FIG. 30 schematically shows a flow diagram illustrating the steps of displaying points already surveyed and points still to be surveyed in the projected image.

In order to get a better overview over the surveying task, points to be surveyed, i.e. to be staked out, as well as points already surveyed, i.e. staked out, can be marked in the projected image. Any control commands, signals and data are transferred between the instrument and the operating unit via the wireless interface. The corresponding steps are shown in FIG. 30.

After generating and displaying the projected image, in step S41 the processor 113 reads co-ordinates of points to be surveyed. The processor 113 may read these co-ordinates from the keyboard, from a storage medium, i.e. a compact flash memory card inserted into the PCMCIA-slot of the operating panel 21, or via the radio module 61 and store them in the memory 112.

In step S42, the processor 113 calculates projected image data, i.e. the locations of the pixels of projected image, corresponding to the points to be surveyed and controls the display unit 53 and that of the remote control unit 121 to display first marks 124 for points to be surveyed in the projected image. It further controls the display units to display a polygon connecting the points.

The processor 113 controls the device-control computer 51 of the instrument to operate in staking out mode, that is the instrument is automatically controlled to track the reflector 122 of the reflector station 120 using the tracking device. The user now moves the reflector station 120 to the position to be staked out monitoring his position on the display unit of the reflector control unit 121. The control unit automatically moves the telescope unit 16' into the direction of the reflector 122.

Once the user operates an operating element display on the remote control unit 121 that he has completed the surveying, i.e. staking out, of the point, in step S43, the processor 113 reads a measure command input of the user, e.g. from the keyboard, and controls the instrument to measure the horizontal and vertical angles as well as the distance between the reflector 122 and the instrument, generate corresponding signals and send them to the processor 113. The processor 113 converts the signals into data and controls the display unit 53 and the display of the remote control unit 121 to display the measured data which it also stores in memory 112.

The user may then move the reflector station 120 to a position closer to the next point to be staked out and repeat the measurement.

This process may be repeated until the reflector station 120 has reached the point to be staked out within a given tolerance. Due to the visual display of the points and the reflector station, only very few cycles will be needed. For determining when the desired accuracy is reached, the processor 113 compares the actual measured horizontal and vertical angles and the measured distance to the corresponding stored data.

If the angle and distance data differ by less than a predetermined maximum error, in step S44, the processor 113 displays a second mark 125 instead of the first mark 124. The second mark indicates that the point has been staked out.

Figure 32:
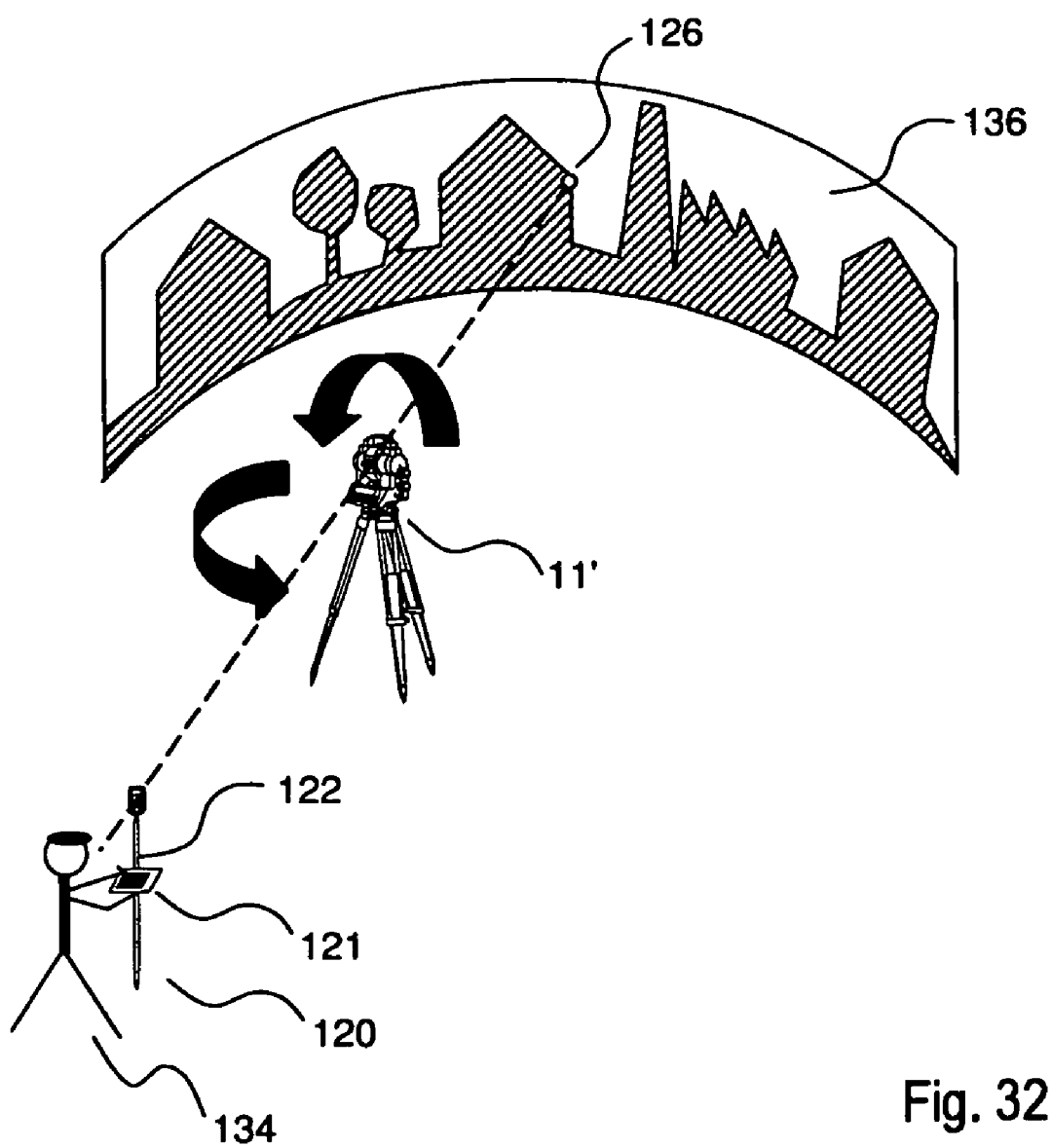
FIG. 32 schematically shows a scene for explaining a method for directing a camera of the instrument in FIG. 29 to a predetermined target.
Figure 33:
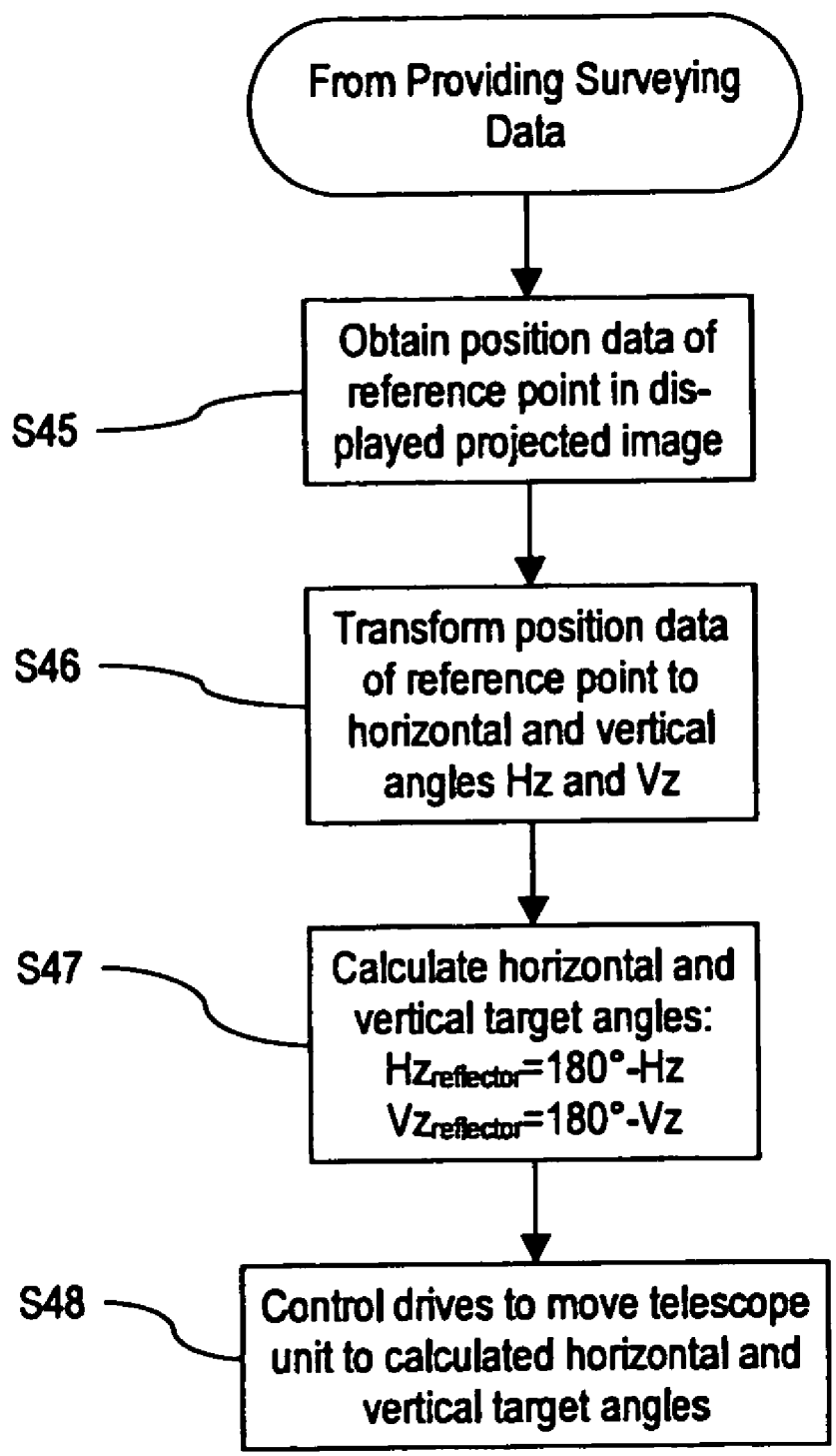
FIG. 33 shows steps of a method for directing the camera of the instrument in FIG. 29 to a predetermined target.

In another application, the image is used to at least approximately direct the telescope unit 16' towards a reflector station 120 (cp. FIG. 32 and FIG. 33).

For that purpose, also the above-mentioned reflector station 120 is used.

As a projection surface, a cylinder surface 136 is selected. Then a projected panoramic image of the target region is generated as described above and transferred to the remote control unit 121.

In step S45, the processor obtains position data of a reference point in the displayed projected image. The user sights a target point 126 in the target region along a line connecting the reflector station 120 and the instrument 11'. The user then selects the chosen target point in the projected image using the pointing device. The processor 113 reads the position of the pointing device when the pointing device is operated.

In step S46, the processor 113 calculates the horizontal and vertical angles Hz and Vz corresponding to that position from the position data.

In step S47, the processor 113 determines the direction in which the reflector station is approximately located relative to the instrument in the form of the horizontal and vertical angles $$Hz_{reflector} = 180° - Hz$$

$$Vz_{reflector} = 180° - Vz.$$

In step S48, the processor then controls the drives to move the telescope unit into the orientation defined by the calculated horizontal and vertical angles $Hz_{reflector}$ and $Vz_{reflector}$.

The user may now perform further surveying tasks starting at the determined orientation of the telescope unit 16'.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

What is claimed is:

1. A surveying instrument comprising:
a distance-measuring unit to produce distance data representing a distance between the distance-measuring unit and an object to be surveyed along a measuring direction of the distance measuring unit, the distance-measuring unit being mounted for rotation about a horizontal and a vertical axis;
orientation sensors to produce orientation data representing an orientation of the distance-measuring unit about the horizontal and vertical axes;
a telescope unit to generate image data pertaining to a two-dimensional image of the object, the telescope unit having a defined spatial relation with respect to the distance-measuring unit; and
a processing unit configured to:
control the telescope unit to produce image data;
control the distance-measuring unit to produce distance data for at least three different locations at the object, the distance data being received by the processing unit together with corresponding orientation data;
obtain surface data representing a surface defined by the distance data and orientation data associated with the at least three different locations at the object; and
transform the image data into projected image data representing a projection of the image to the surface based on the surface data.

2. The surveying instrument according to claim 1, wherein the instrument further comprises an interface for user selection of the different locations at the object in the two-dimensional image of the object.

3. The surveying instrument according to claim 1, wherein the processing unit is further configured to at least one of store and transmit to a receiving device at least the projected image data together with information regarding the distance of the surface as surveying data.

4. The surveying instrument according to claim 1, wherein the surface is one of a plane, a sphere and a cylinder.

5. The surveying instrument according to claim 1, wherein said processing unit is further configured to recognize a user-selected point in the projection of the image represented by the projected image data and to determine the position of the selected point at the object.

6. The surveying instrument according to claim 1, wherein the processing unit comprises a memory storing instructions and a processor.

7. The surveying instrument according to claim 1, wherein the telescope unit is mounted for rotation about a horizontal and a vertical axis;
the telescope comprises orientation sensors to produce orientation data representing an orientation of the telescope unit about the horizontal and vertical axes; and
the processing unit is further configured to:
determine directions in which image data are to be obtained, the directions identifying plural two-dimensional partial images of a target region so that the plural partial images cover the target region;
control the telescope unit to acquire partial image data in each direction, the partial image data being received by the processing unit together with corresponding orientation data;
obtain panoramic surface data representing a panoramic surface, wherein the panoramic surface has a shape that is selected from a group consisting of a cone, a cylinder and a sphere;
transform the partial image data for each direction to a set of projected partial image data, each representing a projection of the respective partial image data to the panoramic surface; and
generate panoramic image data representing a panoramic image of the target region projected to the panoramic surface based on the set of projected partial image data and the orientation data corresponding to the respective projected partial image data.

8. The surveying instrument according to claim 7, wherein the processing unit is further configured to at least one of store and transmit to a receiving device the obtained panoramic image data as surveying data.

9. The surveying instrument according to claim 1, wherein
the instrument further comprises rotation drives for rotating at least one of the distance-measuring unit and the telescope unit about the horizontal and vertical axes; and
the processing unit is adapted to control the rotation drives to rotate the distance-measuring unit and the telescope unit, respectively, into determined directions.

10. The surveying instrument according to claim 9, wherein
the instrument comprises at least one of an interface for a display unit and a pointing device and an interface for a touch-screen, for displaying at least one of the two-dimensional image and the projection of the image on the display unit and the touch-screen, respectively, and for selecting locations at the object in the two-dimensional image and the projection of the image, respectively; and
the processing unit is further adapted to read the position of the pointing device, and a position defined by touching the touch-screen, respectively, to calculate an orientation of at least one of the distance-measuring unit and the telescope unit such that the measuring direction of the distance-measuring unit and the telescope unit, respectively, points to a location at the object corresponding to the read position, and to control the rotation drives to move the distance-measuring unit and the telescope unit, respectively, into the calculated orientation.

11. The surveying instrument according to claim 1, wherein
the telescope unit has imaging optics and an array of optical detector elements, each detector element having a location in the array and being responsive to an image projected on the array by the imaging optics to generate data of a pixel representing a point of the image; and
the processing unit stores calibration data for relating the location of each optical detector element to an optical path.

12. The surveying instrument according to claim 11, wherein the processing unit is adapted to transform the image data into projected image data by:
analytically detecting intersections between the optical path of each optical detector element and the surface represented by the surface data and the panoramic surface represented by the panoramic surface data, respectively, based on the calibration data; and
storing each pixel value of the two-dimensional image to the detected intersection at the surface and the panoramic surface, respectively.

13. The surveying instrument according to claim 1, wherein
the instrument comprises an interface for at least one of a display unit and a touch-screen for displaying digital images; and
the processing unit is adapted to display at least one of the two-dimensional image and the projection of the image on the display unit and the touch-screen, respectively.

14. The surveying instrument according to claim 13, wherein
for selecting locations at the object in the two-dimensional image or the projection of the image, an interface for a pointing device is provided or the display interface is an interface for a touch-screen; and
the processing unit is adapted for reading data defining at least one pixel representing a point in the displayed image defined by the position of the pointing device or touching of the touch-screen.

15. The surveying instrument according to claim 13, wherein the processing unit is adapted to acquire target region data representing the target region by reading user inputs defining directions limiting the target region and/or positions in the two-dimensional image or in the projection of the image and preferably an extent of the target region.

16. The surveying instrument according to claim 13, wherein the processing unit is adapted for reading two positions in the displayed projection of the image selected by the pointing device or by touching the touch-screen, determining a distance between two locations at the object corresponding to the selected locations in the projection of the image and displaying the determined distance or a value calculated from the determined distance.

17. The surveying instrument according to claim 13, wherein the processing unit is further adapted for reading three positions in the displayed projection of the image selected by the pointing device or by touching the touch-screen, determining an angle between two lines defined by corresponding locations at the object and displaying the determined angle or a value calculated from the determined angle.

18. The surveying instrument according to claim 13, wherein the processing unit is adapted for displaying additional information obtained by or stored in the processing unit on the display unit.

19. The surveying instrument according to claim 13, wherein the processing unit is adapted for storing survey data representing locations in the target region already surveyed, and displaying a mark on the display unit representing at least one of the surveyed locations.

20. The surveying instrument according to claim 13, wherein the processing unit is adapted for acquiring coordinate data representing locations to be surveyed, and displaying a mark on the display unit representing at least one point still to be surveyed.

21. A surveying instrument comprising:
a distance-measuring unit to produce distance data representing a distance between the distance-measuring unit and an object to be surveyed along a measuring direction of the distance measuring unit;
a telescope unit to generate image data pertaining to a two-dimensional image of the object, the telescope unit having a defined spatial relation with respect to the distance-measuring unit; and
a processing unit configured to:
control the telescope unit to produce image data;
control the distance-measuring unit to produce distance data;
obtain surface data representing a plane, wherein a location of the plane is selected based on the distance data and the plane has an orientation selected by image processing by identifying and analyzing at least one oval and lozenge element at the object in the two-dimensional image of the object; and
transform the image data into projected image data representing a projection of the image to the plane based on the surface data.

22. The surveying instrument according to claim 21, wherein the instrument further comprises an interface for user selection of at least one oval and lozenge element at the object in the two-dimensional image, the processing unit being configured to use the selected element for selection of an orientation of the plane.

23. The surveying instrument according to claim 21, wherein the processing unit is further configured to at least one of store and transmit to a receiving device at least the projected image data together with information regarding the distance of the plane as surveying data.

24. The surveying instrument according to claim 21, wherein
the distance-measuring unit is mounted for rotation about a horizontal and a vertical axis;
the instrument further comprises orientation sensors to produce orientation data representing an orientation of the distance-measuring unit about the horizontal and vertical axes; and
the processing unit is further configured to control the distance-measuring unit to produce distance data for different locations at the object, the distance data being received by the processing unit together with corresponding orientation data.

25. A surveying instrument comprising:
a distance-measuring unit to produce distance data representing a distance between the distance-measuring unit and an object to be surveyed along a measuring direction of the distance measuring unit;
a telescope unit to generate image data pertaining to a two-dimensional image of the object, the telescope unit having a defined spatial relation with respect to the distance-measuring unit;
an interface for receiving three-dimensional-data of the object; and
a processing unit configured to:
control the telescope unit to produce image data;
control the distance-measuring unit to produce distance data;
obtain surface data representing a surface, wherein a location of the surface is selected based on the distance data and the surface has a shape as defined in the three-dimensional-data; and
transform the image data into projected image data representing a projection of the image to the surface based on the surface data.

26. The surveying instrument according to claim 25, wherein the processing unit is further configured to select an orientation of the surface by image processing by identifying and analyzing at least one same characteristic element contained in both the three-dimensional-data and the image data.

27. The surveying instrument according to claim 25, wherein
the distance-measuring unit is mounted for rotation about a horizontal and a vertical axis;

the instrument further comprises orientation sensors to produce orientation data representing an orientation of the distance-measuring unit about the horizontal and vertical axes;

the processing unit is further configured to control the distance-measuring unit to produce distance data for at least three different locations at the object, the distance data being received by the processing unit together with corresponding orientation data; and the processing unit is further configured to determine an orientation of the surface by using the distance data and orientation data associated with the at least three different locations at the object.

28. The surveying instrument according to claim 25, wherein the processing unit is further configured to at least one of store and transmit to a receiving device at least the projected image data together with information regarding the distance of the surface as surveying data.

29. A surveying instrument comprising
a telescope unit to generate image data pertaining to a two-dimensional image of an object to be surveyed, the telescope unit being mounted for rotation about a horizontal and a vertical axis;
orientation sensors to produce orientation data representing an orientation of the telescope unit about the horizontal and vertical axes; and
a processing unit configured to:
determine directions in which image data are to be obtained, the directions identifying plural two-dimensional partial images of a target region so that the plural two-dimensional partial images cover the target region;
control the telescope unit to acquire partial image data in each direction, the partial image data being received by the processing unit together with corresponding orientation data;
obtain panoramic surface data representing a panoramic surface, wherein the panoramic surface has a shape that is selected from a group consisting of a cone, a cylinder and a sphere;
transform the partial image data for each direction to a set of projected partial image data, each representing a projection of the respective partial image data to the panoramic surface; and
generate panoramic image data representing a panoramic image of the target region projected to the panoramic surface based on the set of projected partial image data and the orientation data corresponding to the respective projected partial image data.

30. The surveying instrument according to claim 29, wherein
the instrument further comprises a distance-measuring unit to produce distance data representing a distance between the instrument and an object to be surveyed along a measuring direction of the distance measuring unit, the distance-measuring unit having a defined spatial relation with respect to the telescope unit; and
wherein the processing unit configured to control the distance-measuring unit to produce distance data for at least one location at the object to obtain a location of the surface based on the distance data.

31. The surveying instrument according to claim 29, wherein the processing unit is adapted to at least one of store and transmit to a receiving device the generated panoramic image data as surveying data.

32. The surveying instrument according to claim 29, wherein the processing unit is further adapted to determine the directions such that the two-dimensional partial images overlap, and to adjust the pixel data in at least one of the partial image data and the projected partial image data of at least one of the two-dimensional partial images in the overlap region by using the pixel data of the partial image data or the projected partial image data of the projected partial images in the overlap region, respectively.

33. The surveying instrument according to claim 29 wherein
the instrument further comprises rotation drives for rotating at least one of the distance-measuring unit and the telescope unit about the horizontal and vertical axes; and
the processing unit is adapted to control the rotation drives to rotate the distance-measuring unit and the telescope unit, respectively, into determined directions;
wherein
the instrument comprises at least one of an interface for a display unit and a pointing device and an interface for a touch-screen, for displaying at least one of the two-dimensional image and the projection of the image on the display unit and the touch-screen, respectively, and for selecting locations at the object in the two-dimensional image and the protection of the image, respectively; and
the processing unit is further adapted to read the position of the pointing device, and a position defined by touching the touch-screen, respectively, to calculate an orientation of at least one of the distance-measuring unit and the telescope unit such that the measuring direction of the distance-measuring unit and the telescope unit, respectively, points to a location at the object corresponding to the read position, and to control the rotation drives to move the distance-measuring unit and the telescope unit, respectively, into the calculated orientation.

34. The surveying instrument according to claim 29, wherein
the telescope unit has imaging optics and an array of optical detector elements, each detector element having a location in the array and being responsive to an image projected on the array by the imaging optics to generate data of a pixel representing a point of the image; and
the processing unit stores calibration data for relating the location of each optical detector element to an optical path;
wherein the processing unit is adapted to transform the image data into projected image data by:
analytically detecting intersections between the optical path of each optical detector element and the surface represented by the surface data and the panoramic surface represented by the panoramic surface data, respectively, based on the calibration data; and
storing each pixel value of the two-dimensional image to the detected intersection at the surface and the panoramic surface, respectively.

35. A method of providing survey data using a surveying instrument comprising the steps of:
generating image data pertaining to a two-dimensional image of an object to be surveyed;
producing distance data representing a distance between the surveying instrument and the object along a measuring direction of the surveying instrument for at least three different locations at the object together with corresponding orientation data representing an orientation of the surveying instrument about horizontal and vertical axes;
obtaining surface data representing a surface defined by the distance data and orientation data associated with the at least three different locations at the object; and transforming the image data into projected image data representing a projection of the image to the surface based on the surface data.

36. The method of claim 35 further comprising the steps of:
recognizing a user-selected point in the projection of the image represented by the projected image data; and
determining the position of the selected point at the object.

37. The method of claim 35, wherein
the telescope unit has imaging optics and an array of optical detector elements, each detector element having a location in the array and being responsive to an image projected on the array by the imaging optics to generate data of a pixel representing a point of the image, the allocation of each optical detector element to an optical path being stored in calibration data; and
the step of transforming the image data into projected image data is performed by:
analytically detecting intersections between an optical path of each optical detector element and the surface represented by the surface data and the panoramic surface represented by the panoramic surface data, respectively, based on the calibration data; and
storing each pixel value of the two-dimensional image to the detected intersection at the surface and the panoramic surface, respectively.

38. The method of claim 35, further comprising the steps of:
reading two positions selected by a user in the displayed projection of the image;
determining a distance between two locations at the object corresponding to the selected locations in the projection of the image; and
displaying the determined distance or a value calculated from the determined distance.

39. The method of claim 35, further comprising the steps of:
reading three positions in the displayed projection of the image selected by a user;
determining an angle between two lines defined by corresponding locations at the object; and
displaying the determined angle or a value calculated from the determined angle.

40. The method of claim 35, wherein the surveying instrument comprises:
a distance-measuring unit to produce distance data representing a distance between the distance-measuring unit and an object to be surveyed along a measuring direction of the distance measuring unit, the distance-measuring unit being mounted for rotation about a horizontal and a vertical axis;
orientation sensors to produce orientation data representing an orientation of the distance-measuring unit about the horizontal and vertical axes;
a telescope unit to generate image data pertaining to a two-dimensional image of the object, the telescope unit having a defined spatial relation with respect to the distance-measuring unit; and
a processing unit configured to:
control the telescope unit to produce image data;
control the distance-measuring unit to produce distance data for at least three different locations at the object, the distance data being received by the processing unit together with corresponding orientation data;
obtain surface data representing a surface defined by the distance data and orientation data associated with the at least three different locations at the object; and
transform the image data into projected image data representing a projection of the image to the surface based on the surface data.

41. A method of providing survey data using a surveying instrument comprising the steps of:
generating image data pertaining to a two-dimensional image of an object to be surveyed;
producing distance data representing a distance between the surveying instrument and the object along a measuring direction of the surveying instrument;
obtaining surface data representing a plane, by selecting a location of the plane based on the distance data and by selecting an orientation of the plane by image processing by identifying and analyzing at least one oval and lozenge element at the object in the two-dimensional image of the object; and
transforming the image data into projected image data representing a projection of the image to the plane based on the surface data.

42. A method of providing survey data using a surveying instrument comprising the steps of:
generating image data pertaining to a two-dimensional image of an object to be surveyed;
producing distance data representing a distance between the surveying instrument and the object along a measuring direction of the surveying instrument;
receiving three-dimensional-data of the object;
obtaining surface data representing a surface, by selecting a location of the surface based on the distance data and selecting a shape of the surface as defined in the three-dimensional-data; and
transforming the image data into projected image data representing a projection of the image to the surface based on the surface data.

43. The method of claim 42 further comprising the step of determining an orientation of the surface by image processing by identifying and analyzing at least one same characteristic element contained in both the three-dimensional-data and the image data.

44. The method of claim 42 further comprising the steps of:
producing distance data for at least three different locations at the object together with corresponding orientation data representing an orientation of the surveying instrument about horizontal and vertical axes; and
determining an orientation of the surface by using the distance data and orientation data associated with the at least three different locations at the object.

45. A method of providing survey data using a surveying instrument comprising the steps of:
determining directions in which partial image data each pertaining to a two-dimensional partial image of an object to be surveyed are to be obtained, the directions identifying plural two-dimensional partial images of a target region at the object so that the plural two-dimensional partial images cover the target region;
generating partial image data in each direction together with corresponding orientation data representing an orientation of the surveying instrument about horizontal and vertical axes;
obtaining panoramic surface data representing a panoramic surface, by selecting a shape of the panoramic surface from a group consisting of a cone, a cylinder and a sphere;
transforming the partial image data for each direction to a set of projected partial image data, each representing a projection of the respective partial image data to the panoramic surface; and generating panoramic image data representing a panoramic image of the target region projected to the panoramic surface based on the set of projected partial image data and the orientation data corresponding to the respective projected partial image data.

46. The method of claim 45 further comprising the steps of:
determining the directions such that the two-dimensional partial images overlap in an overlap region; and
adjusting the pixel data in at least one of the partial image data and the projected partial image data of at least one of the two-dimensional partial images in the overlap region by using the pixel data of the partial image data or the projected partial image data of the projected partial images in the overlap region, respectively.

47. The method of claim 45, wherein
the telescope unit has imaging optics and an array of optical detector elements, each detector element having a location in the array and being responsive to an image projected on the array by the imaging optics to generate data of a pixel representing a point of the image, the allocation of each optical detector element to an optical path being stored in calibration data; and
the step of transforming the image data into projected image data is performed by:
analytically detecting intersections between an optical path of each optical detector element and the surface represented by the surface data and the panoramic surface represented by the panoramic surface data, respectively, based on the calibration data; and
storing each pixel value of the two-dimensional image to the detected intersection at the surface and the panoramic surface, respectively.

48. A non-transitory computer readable storage medium embodying a software code, wherein a processing unit of a surveying instrument acts upon the software code which is adapted to implement the steps of:
generating image data pertaining to a two-dimensional image of an object to be surveyed;
producing distance data representing a distance between the surveying instrument and the object along a measuring direction of the surveying instrument for at least three different locations at the object together with corresponding orientation data representing an orientation of the surveying instrument about horizontal and vertical axes;
obtaining surface data representing a surface defined by the distance data and orientation data associated with the at least three different locations at the object; and
transforming the image data into projected image data representing a projection of the image to the surface based on the surface data.

49. A non-transitory computer readable storage medium embodying a software code, wherein a processing unit of a surveying instrument acts upon the software code which is adapted to implement the steps of:
determining directions in which partial image data each pertaining to a two-dimensional partial image of an object to be surveyed are to be obtained, the directions identifying plural two-dimensional partial images of a target region at the object so that the plural two-dimensional partial images cover the target region;
generating partial image data in each direction together with corresponding orientation data representing an orientation of the surveying instrument about horizontal and vertical axes;
obtaining panoramic surface data representing a panoramic surface, by selecting a shape of the panoramic surface from a group consisting of a cone, a cylinder and a sphere;
transforming the partial image data for each direction to a set of projected partial image data, each representing a projection of the respective partial image data to the panoramic surface; and
generating panoramic image data representing a panoramic image of the target region projected to the panoramic surface based on the set of projected partial image data and the orientation data corresponding to the respective projected partial image data.

* * * * *